United States Patent
Trim et al.

(10) Patent No.: US 12,530,392 B1
(45) Date of Patent: Jan. 20, 2026

(54) ONTOLOGY MANAGEMENT SYSTEM WITH EXPLAINABLE AI INTEGRATION

(71) Applicant: Bast, Inc., Denver, CO (US)

(72) Inventors: Craig Trim, Denver, CO (US); Janice Cha, Denver, CO (US); Mary Rudden, Denver, CO (US); Thanh Chi Lam, Denver, CO (US)

(73) Assignee: Bast, Inc., Denver, CO (US)

( * ) Notice: Subject to any disclaimer, the term of this patent is extended or adjusted under 35 U.S.C. 154(b) by 0 days.

(21) Appl. No.: 18/987,214

(22) Filed: Dec. 19, 2024

(51) Int. Cl.
*G06F 16/22* (2019.01)
*G06F 16/23* (2019.01)
*G06F 16/36* (2019.01)
*G06F 16/901* (2019.01)

(52) U.S. Cl.
CPC ........ *G06F 16/367* (2019.01); *G06F 16/2237* (2019.01); *G06F 16/2365* (2019.01); *G06F 16/9024* (2019.01)

(58) Field of Classification Search
CPC ............... G06F 16/367; G06F 16/2237; G06F 16/2365; G06F 16/9024
See application file for complete search history.

(56) References Cited

U.S. PATENT DOCUMENTS

| | | | |
|---|---|---|---|
| 11,442,963 B1* | 9/2022 | Lecue | G06F 16/906 |
| 11,520,830 B2* | 12/2022 | Soares | G06F 16/9024 |
| 2010/0145986 A1* | 6/2010 | Lim | G06F 16/24564 |
| | | | 707/769 |
| 2021/0150341 A1* | 5/2021 | Dalli | G06N 3/042 |
| 2022/0114417 A1* | 4/2022 | Dalli | G06N 3/042 |
| 2022/0398460 A1* | 12/2022 | Dalli | G06N 3/126 |
| 2023/0245651 A1* | 8/2023 | Wang | G06N 5/022 |
| | | | 704/275 |
| 2024/0104305 A1* | 3/2024 | Glesinger | G06V 10/421 |
| 2024/0160626 A1* | 5/2024 | Crabtree | G06F 16/9024 |
| 2024/0386015 A1* | 11/2024 | Crabtree | G06F 16/9024 |
| 2025/0147957 A1* | 5/2025 | Verkruyse | G06F 16/24522 |
| 2025/0259082 A1* | 8/2025 | Crabtree | G06N 3/047 |
| 2025/0259724 A1* | 8/2025 | Crabtree | G16H 50/50 |

* cited by examiner

*Primary Examiner* — Jorge A Casanova
(74) *Attorney, Agent, or Firm* — Morgan, Lewis & Bockius LLP

(57) ABSTRACT

A system and method are provided for generating explainable recommendations through an integrated approach combining ontology management and adaptive explanation frameworks. The system includes an ontology management module that maintains consistency while enabling cross-domain integration. The system also includes an explainable artificial intelligence (AI) framework that adapts explanation complexity to user expertise levels. The ontology management module employs semantic similarity algorithms to update and expand a multi-domain ontology, integrating knowledge across diverse domains. This unified ontological foundation supports the explainable AI framework in generating accurate recommendations with contextually appropriate explanations. The system advances the field of explainable AI by addressing the challenges of ontological consistency during updates while making AI recommendations more accessible through expertise-based explanation adaptation.

20 Claims, 41 Drawing Sheets

Relates to Error Handling System in Figures 6; Indicates how Cross-domain Interaction Results are Validated and any Issues are Routed Through the Error Handling System

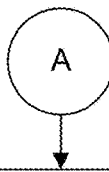

The ontology management module implements a hypergraph data structure where nodes represent concepts and hyperedges connect multiple nodes across domains, the hypergraph data structure enabling fixed-time lookups for connected nodes

1912

Each hyperedge maintains weight vectors representing relationship strengths across different domains, updated through gradient descent with configurable learning rates

1914

The semantic similarity algorithms calculate similarity scores using a multidimensional similarity matrix with dimensionality reduction preserving a minimum distance threshold between embedded concepts

1916

The ontology management module processes incoming data through sliding window analysis using predetermined time intervals and weighted averaging of data points

1918

The ontology management module implements asynchronous processing queues for handling ontology updates while maintaining system responsiveness

1920

The semantic similarity algorithms implement vector-based comparison methods with configurable similarity thresholds for relationship detection

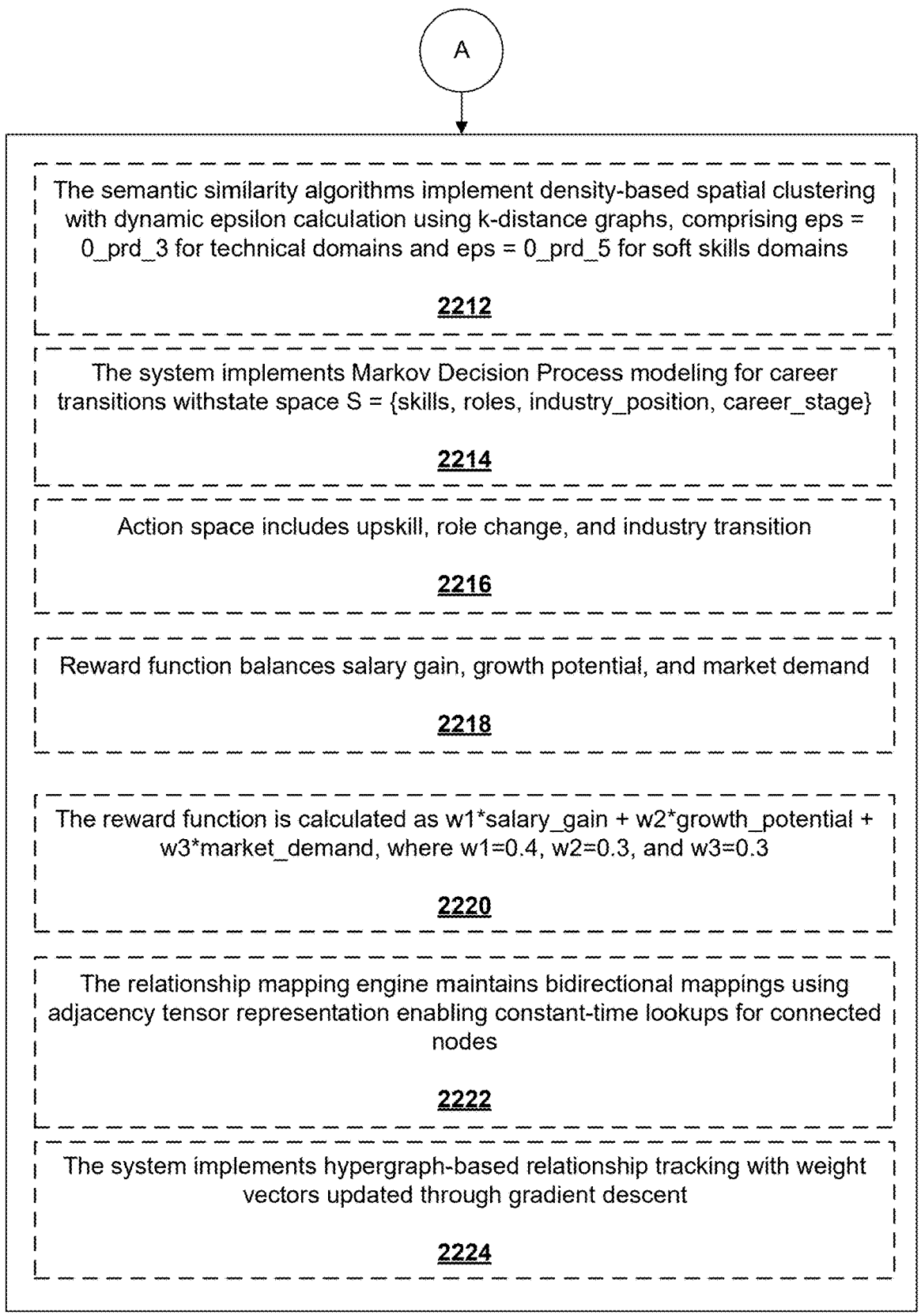

The semantic similarity algorithms implement density-based spatial clustering with dynamic epsilon calculation using k-distance graphs, comprising eps = 0_prd_3 for technical domains and eps = 0_prd_5 for soft skills domains

2212

The system implements Markov Decision Process modeling for career transitions with state space S = {skills, roles, industry_position, career_stage}

2214

Action space includes upskill, role change, and industry transition

2216

Reward function balances salary gain, growth potential, and market demand

2218

The reward function is calculated as w1*salary_gain + w2*growth_potential + w3*market_demand, where w1=0.4, w2=0.3, and w3=0.3

2220

The relationship mapping engine maintains bidirectional mappings using adjacency tensor representation enabling constant-time lookups for connected nodes

2222

The system implements hypergraph-based relationship tracking with weight vectors updated through gradient descent

2224

```
                                                    ┌─ 2300
```

At an orchestration layer, implement secure communication protocols between system components

2302

At an explainable AI framework, implement adjustment of explanation complexity

2304

At the orchestration layer, perform data validation across component boundaries

2306

At the orchestration layer, maintain synchronization between subsystems

2308

At the orchestration layer, enable secure transmission of explanation data and recommendation context

2310

At the orchestration layer, implement adaptive resource allocation based on component interaction patterns

2312

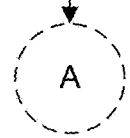
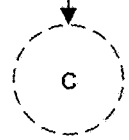

Figure 23A

ONTOLOGY MANAGEMENT SYSTEM WITH EXPLAINABLE AI INTEGRATION

BACKGROUND

Large-scale recommendation systems face several critical technical challenges. Integration and verification of conflicting information from diverse, unstructured data sources poses significant data quality and consistency problems. Ontology management across multiple domains requires complex real-time updates while maintaining logical consistency. Explainable artificial intelligence (AI) systems struggle to provide interpretable recommendations while adapting to varying user expertise levels. Additionally, processing high volumes of simultaneous application programming interface (API) requests while maintaining system responsiveness presents significant scalability challenges. These systems also face difficulties in detecting and incorporating emerging data before they become widely recognized, and ensuring stable recommendations amid rapid changes without introducing erratic behavior.

SUMMARY

Accordingly, there is a need for systems and methods that address at least some of the problems described above. The present disclosure describes systems and methods for a comprehensive explainable AI platform that processes unstructured data across multiple domains to provide personalized recommendations. The system implements a multi-tier verification protocol for resolving conflicting information, manages cross-domain ontologies with updates, and provides explainable recommendations through an adaptive AI framework that adjusts to user expertise levels. A secure API layer orchestrates these components while maintaining data privacy and enabling cross-platform synchronization.

The system achieves this through an integrated architecture comprising data verification, ontology management, explainable AI, and secure API components that communicate through standardized protocols. The architecture enables learning through feedback loops while maintaining recommendation stability through specialized filtering and weighting mechanisms.

In one aspect, a computer-implemented system provides explainable recommendations through an integrated architecture comprising a data verification subsystem, ontology management module, explainable AI framework, and orchestration layer. The data verification subsystem implements multi-tier consensus protocols for resolving conflicting information from multiple data sources. The ontology management module maintains ontological consistency during updates while integrating cross-domain relationships. The explainable AI framework implements adjustment of explanation complexity based on user expertise categories. The orchestration layer implements secure communication protocols between these components.

In another aspect, a computer-implemented system provides explainable AI-powered domain-specific recommendations through several subsystems. A data ingestion subsystem processes multi-domain unstructured data using context-aware NLP models, performs contextual entity identification using machine learning algorithms, and implements multi-tier verification processes to ensure data integrity and authenticity. An ontology management module updates and expands a multi-domain skill and domain-specific ontology using semantic similarity algorithms, integrates and reconciles ontologies across multiple industries, and provides updated ontological data to other system components. An explainable AI framework generates domain-specific recommendations using interpretable machine learning models including decision trees and Bayesian inference. The explainable AI framework also calculates feature importance using Shapley Additive explanations (SHAP) values to provide explainable rationales for suggestions, and utilizes ontological data for enhanced recommendation accuracy. A secure API layer orchestrates machine learning models for personalized domain-specific recommendations, implements multi-layered security protocols and role-based access control for data privacy compliance, facilitates cross-platform synchronization and user profile enrichment, and enables secure communication between system components and external platforms.

In some embodiments, the data ingestion subsystem provides cleaned and structured data to the ontology management layer, implements data categorization using NLP models specifically for ontology enrichment, and maintains data streams for ontology updates. In some embodiments, the data ingestion subsystem collects and processes unstructured data formats including job postings, certifications, and user profiles. In some embodiments, the context-aware NLP models understand context identified in the processed text for skills and certifications beyond keyword extraction. In some embodiments, the data ingestion subsystem includes a cross-domain data normalization process that standardizes data across diverse industries. In some embodiments, the data ingestion subsystem includes a customized relevance filtering process that categorizes and prioritizes incoming data sources based on factors including industry demand, geographic location, and job posting recency.

In some embodiments, the multi-tiered verification process cross-references incoming data against external databases and verified sources to identify potentially fraudulent or misleading data. In some embodiments, the data ingestion subsystem applies context-aware NLP extraction and data prioritization through statistical models. In some embodiments, the data ingestion subsystem transforms raw, unstructured data into structured insights that the AI models immediately utilize for accurate and personalized recommendations. In some embodiments, the data ingestion subsystem processes domain-specific unstructured data including career data, healthcare records, educational content, financial data, and e-commerce data, adapts NLP models to domain-specific vocabularies and contexts, and implements domain-specific data verification processes tailored to each industry's requirements. In some embodiments, the multi-tier verification process assigns confidence scores to data points based on source reliability, historical accuracy, and relevance, applies consensus algorithms including majority voting and weighted averaging to resolve data discrepancies, and flags unresolved conflicts for human review or machine learning-based reconciliation.

In some embodiments, the data ingestion subsystem implements weighted averaging of confidence scores for conflicting skill requirements across multiple job postings, prioritizes verified company websites over third-party data aggregators, and maintains an audit trail of conflict resolution decisions. In some embodiments, the ontology management module maps skills, certifications, job roles, and user profiles to the comprehensive, evolving ontology. In some embodiments, the semantic similarity algorithms identify and map relationships between seemingly unrelated skills and job roles. In some embodiments, the ontology management module further comprises a multi-domain ontology integration mechanism that merges and reconciles ontologies from multiple industries. In some embodiments, the ontology management module employs machine learning models to enrich and expand the ontology based on processed input data.

In some embodiments, the ontology management module includes a semantic analysis component that detects new relationships between skills and job roles, providing direct inputs to the explainable AI framework's decision trees and SHAP calculations for maintaining recommendation accuracy. In some embodiments, the ontology management module includes an adaptive learning mechanism that updates relationships between skills, job roles, and certifications based on job postings and labor market data changes. In some embodiments, the adaptive learning mechanism adjusts relationships between skills, job roles, and certifications based on incoming data and user interactions. In some embodiments, the ontology management module processes input data using machine learning models to enrich and expand the ontology, ensuring that career pathways and job recommendations align with the labor market trends.

In some embodiments, the ontology management module provides ontological updates to the explainable AI framework, enables recalibration of recommendation models based on ontology changes, and maintains traceable relationships between ontological elements and recommendation decisions. In some embodiments, the ontology management module concurrently maintains multiple domain-specific ontologies, establishes cross-domain relationships between different ontologies, extends existing ontologies to incorporate new domains, and adapts semantic similarity algorithms to different industry contexts. In some embodiments, the explainable AI framework provides explanations for each recommendation, detailing the reasoning behind suggestions for specific skills, jobs, or courses. In some embodiments, the explainable AI framework provides explanations for recommendations across multiple domains, adapts explanation formats to domain-specific requirements, maintains consistency in explanation methodology across different applications, and generates domain-appropriate visualization of decision processes.

In some embodiments, the explainable AI framework supports multiple recommendation types including career guidance, medical diagnostics, educational pathways, financial advice, and product recommendations, adapts feature importance calculations to domain-specific priorities, and implements domain-specific success metrics and evaluation criteria. In some embodiments, the decision trees generate interpretable recommendation processes that clearly show how different skills and experiences lead to a suggested job or course. In some embodiments, the SHAP values highlight the most significant factors contributing to a recommendation, providing users with a detailed breakdown of why the system made a specific suggestion. In some embodiments, the Bayesian inference models calculate the likelihood of success in specific job roles based on skill development. In some embodiments, the explainable AI framework adapts explanations based on user feedback and interactions.

In some embodiments, the explainable AI framework shows users how their skills, experiences, and preferences contributed to each recommendation decision. In some embodiments, the explainable AI framework adapts AI models to regional job markets and linguistic variations for providing multi-language domain-specific recommendations. In some embodiments, the explainable AI framework transmits recommendation data to the API layer, includes contextual metadata with each recommendation for API processing, and maintains communication channels with the API layer for updates. In some embodiments, the explainable AI framework packages recommendations with explainability data for API transmission, maintains recommendation consistency across multiple API endpoints, and enables recommendation updates through API channels. In some embodiments, the framework implements pre-processing data balancing techniques to ensure diverse representation, employs adversarial debiasing during model training, utilizes fairness indicators for bias monitoring, and applies post-processing corrections based on disparate impact analysis.

In some embodiments, the explainable AI framework implements model distillation to convert models into interpretable forms, maintains layered explainability across multiple decision-making stages, utilizes Local Interpretable Model-agnostic Explanations (LIME) for transparency, and generates hierarchical explanations that decompose decisions. In some embodiments, the system creates simplified interpretable models from larger ensemble models, maintains explanation consistency across different scales of operation, provides granular decision traces for each recommendation component, and implements progressive model complexity reduction techniques. In some embodiments, the explainable AI framework maintains user expertise profiles for explanation customization, generates multi-tiered explanations based on user technical proficiency, employs natural language generation tailored to user expertise levels, and adjusts explanation complexity based on user interaction patterns. In some embodiments, the system categorizes users into expertise tiers based on profile data and interactions, provides technical statistical insights for users, generates simplified explanations for non-technical users, and maintains consistent explanation quality across expertise levels.

In some embodiments, the explainable AI framework implements a multi-layered explanation system with expandable detail levels, generates initial high-level explanations with optional detailed expansions, integrates visual aids including decision trees and feature importance graphs, and maintains user-specific preferences for explanation detail levels. In some embodiments, the system provides interactive explanation interfaces with depth-on-demand capabilities, generates visual representations of decision processes, maintains consistent explanation structures across different recommendation types, and implements user-controlled explanation detail thresholds. In some embodiments, the secure API layer supports data ingestion and analysis, adjusting recommendations based on new job market data or updates to user profiles. In some embodiments, the multi-layered security protocols ensure compliance with data privacy regulations including GDPR. In some embodiments, the secure API layer integrates user data, job trends, and ontologies to provide contextually relevant domain-specific recommendations.

In some embodiments, the secure API layer further comprises a mechanism for integrating and synchronizing user data across multiple career platforms. In some embodiments, the secure API layer comprises an interface configured to receive and process user data, job market information, and skill ontologies. In some embodiments, the secure API layer processes incoming user profiles, job market data, and skill ontologies, orchestrating machine-learning models to generate tailored recommendations. In some embodiments, the secure API layer captures and routes user feedback directly to the data ingestion subsystem, maintains feedback streams for system refinement, and enables data synchronization between external platforms and the data ingestion subsystem. In some embodiments, the secure API layer comprises a feedback processing mechanism configured to prepare user interaction data for re-ingestion, data routing capabilities for maintaining learning loops, and data quality assessment for feedback validation.

In some embodiments, the secure API layer supports domain-specific data formats and protocols, implements industry-specific security requirements, maintains separate authentication and authorization mechanisms for different domains, and enables cross-domain data sharing with appropriate privacy controls. In some embodiments, the feedback loop refines domain-specific recommendations based on user feedback, ensuring personalized improvements over time. In some embodiments, the feedback loop refines domain-specific recommendations based on user feedback, maintains data flows between all system components, enables updates to recommendations based on new data, tracks impact measured by changes in recommendation accuracy, and adjusts component interactions based on performance metrics. In some embodiments, the feedback loop refines domain-specific recommendations based on user feedback, maintains separate feedback processing pipelines for different domains, enables cross-domain learning where applicable, adapts refinement mechanisms to domain-specific requirements, and tracks domain-specific performance metrics.

In some embodiments, the system further comprises a multi-language career recommendation engine configured to provide domain-specific recommendations in multiple languages, adapting AI models to regional job markets and linguistic variations. In some embodiments, the system further comprises a user profile enrichment mechanism configured to enrich user profiles by extracting and incorporating new skills and qualifications from external data sources. In some embodiments, the system adapts to emerging trends and provides recommendations that reflect current industry needs through learning and updating of its components. In some embodiments, the system facilitates career guidance across different domains and ensures versatility in skill applicability through its multi-domain ontology integration and cross-domain data normalization processes.

In some embodiments, the system further comprises a hybrid machine learning and statistical model configured to categorize and prioritize incoming data sources based on factors including industry demand, geographic location, and job posting recency. In some embodiments, the system provides domain-specific recommendations across multiple career platforms while ensuring updates and consistent recommendations. In some embodiments, the system performs data validation across component boundaries, synchronization between all subsystems, performance monitoring of component interactions, adjustment of inter-component communication patterns, and adaptive resource allocation based on component interaction patterns. In some embodiments, the system further comprises a domain configuration module configured to adapt system components to new domains, manage domain-specific settings and parameters, facilitate cross-domain integration where applicable, and maintain separate processing pipelines for different domains.

In some embodiments, the system further comprises a domain configuration module configured to configure the data ingestion subsystem for a specific domain, adapt the ontology management module to domain-specific requirements, customize the explainable AI framework for domain-appropriate explanations, implement domain-specific security and privacy controls, and establish domain-appropriate feedback mechanisms. In some embodiments, the feedback loop compares recommendation outcomes across different demographic groups, adjusts model weights when systematic bias is detected, implements bias correction mechanisms, and maintains bias monitoring metrics across all domains. In some embodiments, the feedback loop incorporates unsuccessful outcomes using reinforcement learning mechanisms, performs counterfactual analysis on negative recommendations, adjusts model weights based on user dissatisfaction, and maintains historical records of recommendation failures for improvement. In some embodiments, the system analyzes patterns in unsuccessful recommendations, implements model adjustments based on negative feedback, generates alternative recommendation paths through counterfactual analysis, and maintains separate unsuccessful outcome tracking.

In one aspect, a system provides explainable recommendations through an integrated ontology management and AI framework, according to some embodiments. An ontology management layer implements mechanisms for maintaining ontological consistency during updates while integrating cross-domain relationships. An explainable AI framework implements adjustment of explanation complexity based on predefined user expertise categories. The ontology management layer updates and expands a multi-domain ontology using semantic similarity algorithms within the cross-domain mapping, integrates and reconciles ontologies across multiple industries, and provides updated ontological data to the explainable AI framework for enhancing recommendation accuracy and explanation generation.

In some embodiments, the ontology management layer implements a hypergraph data structure where nodes represent concepts and hyperedges connect multiple nodes across domains, enabling fixed-time lookups for connected nodes. In some embodiments, each hyperedge maintains weight vectors representing relationship strengths across different domains, updating them through gradient descent with configurable learning rates. In some embodiments, the semantic similarity algorithms calculate similarity scores using a multidimensional similarity matrix with dimensionality reduction that preserves a minimum distance threshold between embedded concepts. In some embodiments, the ontology management layer processes incoming data through sliding window analysis using predetermined time intervals and weighted averaging of data points. In some embodiments, the ontology management layer implements asynchronous processing queues for handling ontology updates while maintaining system responsiveness. In some embodiments, the semantic similarity algorithms implement vector-based comparison methods with configurable similarity thresholds for relationship detection.

In some embodiments, the ontology management layer maintains version history for ontological changes with rollback capabilities. In some embodiments, the ontology management layer implements parallel processing for semantic similarity calculations across multiple domains. In some embodiments, the ontology management layer buffers ontology updates using a staged update mechanism with validation checks between stages. In some embodiments, the ontology management layer implements a conflict resolution protocol for handling contradictory relationships across domains. In some embodiments, the ontology management layer maintains separate processing queues for different update types with prioritization rules. In some embodiments, the ontology management layer implements checkpointing mechanisms for maintaining consistency during updates. In some embodiments, the management layer calculates relationship strengths using configurable weighting factors across different relationship types.

In some embodiments, the ontology management layer implements distributed processing for parallel ontology updates across multiple nodes. In some embodiments, the ontology management layer maintains an update log with timestamps and change metadata. In some embodiments, the ontology management layer implements batched processing for bulk ontology updates with consistency validation. In some embodiments, the semantic similarity algorithms maintain separate threshold values for different relationship types. In some embodiments, the ontology management layer implements incremental update mechanisms for processing changes to the ontology. In some embodiments, the ontology management layer maintains index structures for accelerating relationship queries across domains.

In some embodiments, the ontology management layer implements a hypergraph data structure where nodes represent concepts and hyperedges connect multiple nodes across domains, enabling O(1) lookup time for connected nodes. In some embodiments, each hyperedge maintains weight vectors representing relationship strengths across different domains, updating them through gradient descent with a learning rate of 0.01. In some embodiments, the semantic similarity algorithms calculate similarity scores using a multidimensional similarity matrix with dimensionality reduction preserving a minimum distance threshold of 0.85 in the reduced space. In some embodiments, the ontology management layer processes incoming data through sliding window analysis with exponential decay functions to prioritize recent market trends while maintaining historical stability. In some embodiments, the ontology management layer implements asynchronous processing queues with predictive resource allocation, achieving 30-40% reduction in processing latency while maintaining 20% lower CPU usage.

In another aspect, a system provides multi-tier data verification in an explainable AI system, according to some embodiments. A data verification subsystem implements a multi-tier consensus protocol for resolving conflicting information from external sources. An explainable AI framework implements adjustment of explanation complexity through SHAP analysis and decision trees. The data verification subsystem assigns confidence scores based on source reliability through a multi-tiered verification process. The system applies consensus algorithms through conflict resolution to resolve data discrepancies. The verified data flows to the explainable AI framework with confidence metrics, enabling the generation of reliability-aware explanations through recommendations and explanations.

In some embodiments, the data verification subsystem calculates confidence scores using a weighted combination of source reliability metrics, historical accuracy measurements, and relevance factors through the multi-tiered verification process. In some embodiments, the data verification subsystem applies decay functions to historical accuracy measurements using configurable time windows within the multi-tiered verification process. In some embodiments, the consensus algorithms within conflict resolution implement weighted averaging with source-specific weights determined by historical reliability scores. In some embodiments, the data verification subsystem implements anomaly detection using statistical models to identify outlier data points through the multi-tiered verification process. In some embodiments, the data verification subsystem maintains verification audit logs with decision metadata for each resolved conflict through the conflict resolution. In some embodiments, the data verification subsystem implements staged verification with validation checks between processing stages through the multi-tiered verification process. In some embodiments, the data verification subsystem maintains separate verification protocols for different data categories with category-specific thresholds.

In some embodiments, the data verification subsystem implements cross-referencing against verified data sources using configurable matching criteria through the multi-tiered verification process. In some embodiments, the data verification subsystem processes verification requests through prioritized queues based on data source categories. In some embodiments, the data verification subsystem implements incremental verification for sequential data updates with dependency tracking through the multi-tiered verification process. In some embodiments, the data verification subsystem maintains source reliability scores updated based on verification outcomes through the conflict resolution. In some embodiments, the data verification subsystem implements parallel verification processes for independent data sources through the multi-tiered verification process. In some embodiments, the data verification subsystem calculates aggregate confidence metrics using weighted combinations of individual source scores through the conflict resolution.

In some embodiments, the data verification subsystem implements fallback verification protocols when primary verification methods fail through the multi-tiered verification process. In some embodiments, the data verification subsystem maintains verification state history with rollback capabilities. In some embodiments, the data verification subsystem implements batched verification for bulk data processing with consistency checks through the multi-tiered verification process. In some embodiments, the data verification subsystem calculates confidence thresholds using statistical analysis of historical verification outcomes through the conflict resolution. In some embodiments, the data verification subsystem implements verification result caching with configurable invalidation rules. In some embodiments, the data verification subsystem maintains separate processing pipelines for different verification levels with defined promotion criteria through the multi-tiered verification process.

In another aspect, a system is provided for implementing an explainable AI framework with adaptive explanation complexity, according to some embodiments. An explainable AI framework generates domain-specific recommendations through interpretable machine learning models including decision trees and Bayesian inference. The system implements SHAP analysis to calculate feature importance, providing explainable rationales for each recommendation through the recommendations and explanations. The system utilizes enriched data from the ontology management layer to enhance recommendation accuracy. The explainable AI framework implements adjustment of explanation complexity based on predefined user expertise categories through multi-level explanation.

In some embodiments, the explainable AI framework implements model distillation through the model integration layer with integrated Local Interpretable Model-agnostic Explanations (LIME) while maintaining layered explainability across decision-making stages. In some embodiments, the explainable AI framework combines LIME-based local interpretability with ontology-based relationship mapping through the cross-domain mapping to generate cross-domain explanations. In some embodiments, the explainable AI framework integrates LIME and SHAP analyses through SHAP analysis to provide combined local and global feature importance explanations across expertise levels. In some embodiments, the explainable AI framework implements LIME within a recursive model refinement process through the model refinement engine that adapts based on user interaction patterns. In some embodiments, the explainable AI framework combines LIME-based explanations with expertise-based complexity adjustment through complexity adjustment while maintaining explanation consistency across domains. In some embodiments, the decision trees implement cost-complexity pruning with configurable depth constraints for different recommendation types. In some embodiments, the Bayesian inference models within the model integration layer calculate recommendation probabilities using weighted combinations of evidence factors.

In some embodiments, the SHAP analysis implements a combined predictive and fairness calculation using weighted objectives. In some embodiments, the explainable AI framework generates hierarchical explanations with configurable detail levels through the multi-level explanation engine. In some embodiments, the explainable AI framework implements model distillation techniques through the model integration layer to generate interpretable versions of complex models. In some embodiments, the explainable AI framework maintains separate explanation templates for different user expertise levels through the user profile manager. In some embodiments, the explainable AI framework implements feature attribution calculations with configurable importance thresholds through SHAP analysis. In some embodiments, the explainable AI framework generates explanation chains linking input features to recommendations through decision paths using decision trees.

In some embodiments, the explainable AI framework calculates confidence scores for generated explanations using validation metrics through the confidence engine. In some embodiments, the explainable AI framework generates counterfactual explanations showing how different inputs affect recommendations through the explanation generator. In some embodiments, the explainable AI framework calculates feature interactions using pairwise importance scores through SHAP analysis. In some embodiments, the explainable AI framework implements staged generation of explanations with complexity progression through the visualization adaptation system. In some embodiments, the explainable AI framework maintains explanation consistency while adapting to different user expertise levels through the multi-level explanation engine. In some embodiments, the explainable AI framework generates domain-specific explanation templates based on ontological relationships through the explanation generator.

In another aspect, a system is provided for cross-domain ontology integration in explainable AI environments, according to some embodiments. An ontology integration layer maintains concurrent domain-specific knowledge bases through the core ontology framework. The system implements cross-domain relationships using semantic similarity algorithms within a hypergraph data structure where nodes represent concepts and hyperedges connect multiple nodes across domains. The system maps skills, certifications, and domain concepts across industry boundaries. A relationship mapping engine within the domain mapping component identifies semantic similarities between concepts across different domain ontologies. A domain extension mechanism within the core ontology framework detects emerging domains through the feedback loop and establishes initial cross-domain mappings.

In some embodiments, the semantic similarity algorithms implement density-based spatial clustering (DBSCAN) with epsilon calculation based on k-distance graphs, using eps=0.3 for technical domains and eps=0.5 for soft skills domains. In some embodiments, the system implements Markov Decision Process modeling for career transitions with state space S={skills, roles, industry position, career stage}, with action space A={upskill, role change, industry transition}. The reward function balances salary gain, growth potential, and market demand. In some embodiments, the reward function is calculated using $R(s, a)=w1*salary\ gain+w2*growth\ potential+w3*market\ demand$, where $w1=0.4$, $w2=0.3$, and $w3=0.3$. In some embodiments, the relationship mapping engine within the domain mapping component maintains bidirectional mappings between domain concepts using an adjacency tensor representation, enabling $O(1)$ lookup time for connected nodes. In some embodiments, the system implements hypergraph-based relationship tracking through cross-domain relationships, with weight vectors updated through gradient descent.

In some embodiments, the system applies dimensionality reduction techniques with a minimum distance preservation constraint of 0.85 in the reduced space for relationship mapping. In some embodiments, the system implements hierarchical clustering with boundary adjustment through the domain mapping component for emerging skill clusters. In some embodiments, the system calculates composite relationship scores using weighted combinations of semantic similarity and usage patterns through the cross-domain relationships. In some embodiments, the system implements recursive relationship validation with configurable consistency thresholds through the consistency check. In some embodiments, the system maintains temporal vectors through the state management system for tracking relationship evolution across domains. In some embodiments, the system implements conflict resolution using Conflict-Free Replicated Data Types (CRDTs) through the domain mapping component for updates.

In some embodiments, the system calculates transitivity scores for indirect relationships across domain boundaries through cross-domain relationships. In some embodiments, the system implements parallel processing for relationship discovery across multiple domains through the domain mapping component. In some embodiments, the system maintains separate confidence metrics for different relationship types through cross-domain relationships. In some embodiments, the system generates relationship evidence chains for cross-domain mappings through the explanation generator. In some embodiments, the system implements staged relationship validation with incremental confidence updates through the consistency check. In some embodiments, the system maintains domain-specific verification protocols with configurable thresholds through knowledge bases.

In some embodiments, the system implements relationship weighting based on usage patterns through cross-domain relationships. In some embodiments, the system generates cross-domain transition paths with confidence scoring through the visualization adaptation system. In some embodiments, the system maintains relationship provenance with version tracking and validation history through the state management system. In some embodiments, the system applies spectral clustering overlay with normalized graph Laplacian and adaptive kernel bandwidth calculated as $\sigma=median\ distance*scaling\ factor$, where scaling factor adapts between 0.1 and 0.3 based on cluster density.

In another aspect, a system is provided for orchestrating secure inter-component communication and synchronization in an explainable AI system, according to some embodiments. An orchestration layer, implemented through a secure API layer, manages secure communication protocols between all system components. This layer ensures interaction between the data verification subsystem, ontology management layer, and explainable AI framework while maintaining data privacy and system security. The system performs data validation across component boundaries through the integration hub. A communication protocol layer employs protocol buffers for data serialization and transmission, thereby maintaining synchronization between subsystems. The system enables secure transmission of explanation data and recommendation context through multi-layered security protocols. The system implements adaptive resource allocation based on component interaction patterns through the analysis engine.

In some embodiments, the secure API layer implements asynchronous processing queues with backpressure management through the message broker, using partitioned topics for different request types. In some embodiments, the communication protocol layer implements distributed lock management using Conflict-Free Replicated Data Types (CRDTs), achieving bounded convergence times. In some embodiments, the secure API layer implements consistent hashing for session persistence, maintaining a maximum load imbalance factor across nodes. In some embodiments, the secure API layer implements circuit breaker patterns with configurable error thresholds and reset timeouts through cross-platform synchronization. In some embodiments, the communication protocol layer maintains version vectors with dotted version vectors for causality tracking through the message broker. In some embodiments, the secure API layer implements partition reassignment based on skew detection through cross-platform synchronization. In some embodiments, the layer implements predictive resource allocation using historical usage patterns through the analysis engine.

In some embodiments, the secure API layer maintains separate authentication mechanisms through the authentication system, using JSON Web Token (JWT) with configurable expiration. In some embodiments, the secure API layer implements staged data processing with validation checkpoints through cross-platform synchronization. In some embodiments, the secure API layer manages asynchronous feedback loops with guaranteed message delivery through the message broker. In some embodiments, the secure API layer implements rolling update mechanisms with state preservation through the state management system. In some embodiments, the secure API layer maintains component health metrics with failover through cross-platform synchronization. In some embodiments, the secure API layer implements queue management with priority levels through the message broker.

In some embodiments, the secure API layer maintains cross-component transaction consistency through the integration hub. In some embodiments, the secure API layer implements adaptive batch processing based on system load through cross-platform synchronization. In some embodiments, the secure API layer maintains component state synchronization with conflict resolution through the state management system. In some embodiments, the secure API layer implements resource pooling with allocation through cross-platform synchronization. In some embodiments, the secure API layer maintains distributed tracing across component boundaries through the integration hub. In some embodiments, the secure API layer implements component isolation with controlled interaction patterns through cross-platform synchronization.

In another aspect, a computer system includes one or more processors, memory, and one or more programs stored in the memory. The programs are configured for execution by the one or more processors. The programs include instructions for performing any of the methods and/or steps of the systems described herein.

In another aspect, a non-transitory computer readable storage medium stores one or more programs configured for execution by one or more processors of a computer system. The programs include instructions for performing any of the steps of the systems described herein.

BRIEF DESCRIPTION OF THE DRAWINGS

FIGS. 19A-19E show a flowchart of an example method for providing explainable recommendations through an integrated ontology management and AI framework, according to some embodiments.

FIGS. 22A-22E show a flowchart of an example method for cross-domain ontology integration in explainable AI environments, according to some embodiments.

FIGS. 23A-23D show a flowchart of an example method for orchestrating secure inter-component communication and synchronization in an explainable AI system, according to some embodiments.

Like reference numerals refer to corresponding parts throughout the drawings.

DESCRIPTION OF IMPLEMENTATIONS

Figure 1:
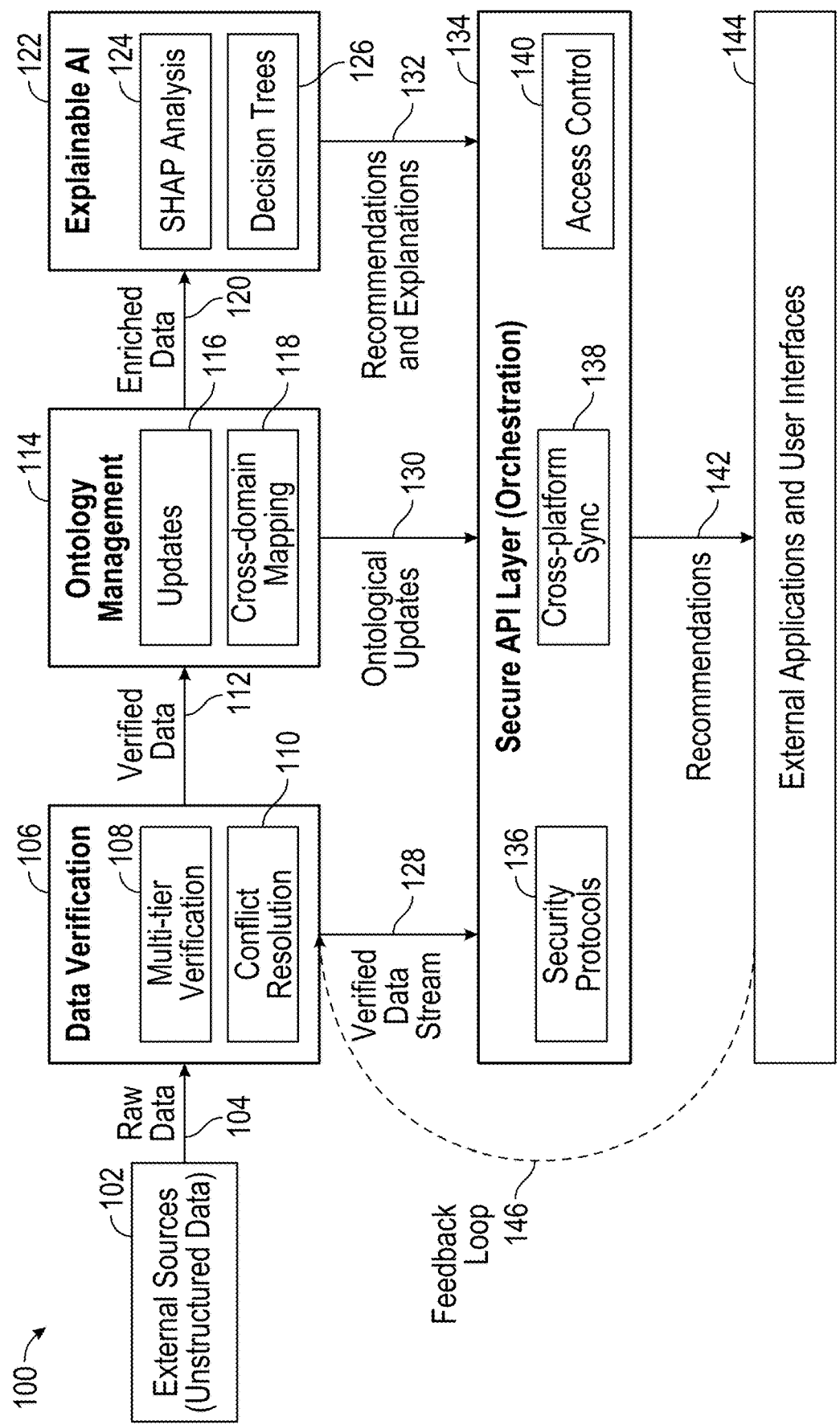
FIG. 1 is a schematic diagram of an example system for processing and analyzing data using data verification, ontology management, explainable AI, and secure API components, according to some embodiments.

Reference will now be made to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

The present disclosure describes a comprehensive system using explainable AI (XAI) with ontology management for multi-domain applications. The platform processes and validates diverse, unstructured data while ensuring transparency, personalization, and data privacy across different sectors. As described above in the Background section, large-scale recommendation systems currently face several major technical challenges. Systems struggle to integrate and verify conflicting information from diverse data sources effectively. Managing ontologies across multiple domains requires complex updates while maintaining logical consistency. Traditional AI systems lack transparency and interpretability in their recommendations and cannot adapt to varying user expertise levels. Processing high volumes of simultaneous API requests while maintaining system responsiveness presents significant scalability issues. These systems also have difficulty detecting emerging patterns before they become widely recognized and ensuring stable recommendations amid rapid changes.

This disclosure presents a configurable platform that processes unstructured data across multiple domains to provide transparent, and personalized recommendations. The system processes data through multi-tier verification protocols that resolve conflicting information. It manages cross-domain ontologies with updates and provides explainable recommendations through an adaptive AI framework that adjusts to user expertise levels. A secure API layer orchestrates these components while maintaining data privacy and enabling cross-platform synchronization. The platform resolves several key technical challenges through its integrated approach. The system processes and validates data from diverse sources through multi-tier verification protocols. The system provides explainable recommendations through interpretable AI models, clearly showing users the reasoning behind each suggestion. The ontology management maintains relationships and consistency across multiple domains. The secure API architecture implements privacy-preserving protocols and resource management for scalability. The architecture enables learning through feedback loops while maintaining recommendation stability through specialized filtering and weighting mechanisms. These techniques can be applied across various domains and industries, providing a flexible framework for developing personalized recommendation systems that can scale effectively while maintaining data security and user privacy. Systems, methods and devices implementing the techniques in accordance with some embodiments are illustrated in FIGS. 1-18.

FIG. 1 is a schematic diagram of an example system 100 for processing and analyzing data (e.g., career related data) to generate explainable recommendations, according to some embodiments. The system 100 implements an pipeline designed to handle complex, unstructured data 104 (sometimes referred to as raw data) from external sources 102, through a data verification subsystem 106 (sometimes referred to as the data ingestion subsystem or the data verification component). In some embodiments, the system 100 implements a multi-stage data processing pipeline with both parallel and sequential flows. In the primary data flow, external sources 102 generate unstructured data 104, which the data verification subsystem 106 processes through the multi-tiered verification process 108, conflict resolution 110, and generates verified data 112. This verified data then flows to the ontology management layer 114 and the secure API layer 134 as a verified data stream 128. The ontology management layer 114 performs updates 116, executes cross-domain mapping 118, and generates enriched data 120. This enriched data flows to the explainable AI 122, which generates recommendations and explanations 132. The secure API layer 134 processes multiple data streams simultaneously, for example: the verified data stream 128 from data verification, ontological updates 130 from ontology management, and/or recommendations and explanations 132 from explainable AI. External applications and user interfaces 144 consume these processed outputs, while user feedback flows back through feedback loop 146 to the data verification subsystem. This architecture enables both sequential processing for data verification and parallel processing for updates and recommendations, while maintaining data consistency through the secure API layer 134.

The data verification component 106 employs a multi-tiered verification process 108 (e.g., using probabilistic models) to assign confidence scores based on source reliability, historical accuracy, and/or relevance. The verification subsystem 106 implements conflict resolution 110 to process the external unstructured data sources into verified data 112. When conflicts arise, the system applies consensus algorithms (e.g., majority voting or weighted averaging) to resolve discrepancies, prioritizing verified company websites over third-party aggregators. In some embodiments, the data verification subsystem 106 processes the external unstructured data 104 through an pipeline designed for complex data formats. The subsystem processes and structures this data, enabling AI-powered recommendations 142 through a secure API layer 134. In some embodiments, the verification subsystem 106 implements context-aware NLP models that understand specific context for skills and certifications beyond simple keyword extraction. For example, when processing technical skills, the NLP models identify expertise levels and relevant domains through semantic analysis, enhancing matching accuracy between verified data 112 and user profiles.

In some embodiments, the data verification component 106 implements a cross-domain normalization process within the multi-tiered verification process 108. This process standardizes terminology across diverse domains/industries, assigning normalized confidence scores based on source reliability, historical accuracy, and relevance. The normalization enables the conflict resolution 110 to process standardized data consistently across domains. In some embodiments, the verification subsystem 106 employs hybrid machine learning and statistical models within the multi-tiered verification process 108. These models categorize and prioritize incoming data sources, calculating confidence scores based on industry demand, geographic relevance, and data freshness. The prioritization ensures high-quality data flows through the verified data stream 112 to the ontology management 114. In some embodiments, the multi-tiered verification process 108 maintains data integrity by cross-referencing incoming data against external databases and verified sources. The process identifies potentially fraudulent or misleading data through probabilistic models, ensuring only authentic information passes through to the verified data 112 for further processing by the ontology management layer 114.

The verified data flows 112 through the ontology management layer 114 implementing updates 116 and cross-domain mapping 118. The ontology management layer 114 differs from conventional platforms by ingesting and processing data, ensuring data always reflects the latest industry trends and skills. This layer maps information (e.g., skills, certifications, job roles, and user profiles) to a comprehensive, evolving ontology that adapts based on data (e.g., data from job postings), industry developments, and/or user interactions. In some embodiments, the ontology management layer 114 implements an adaptive learning mechanism through updates 116. This mechanism adjusts relationships between data points based on incoming verified data streams 112, enabling the system to maintain current industry alignments through cross-domain mapping 118. In some embodiments, the ontology management layer 114 processes the enriched data 120 through machine learning models to expand and refine the ontology. These models analyze patterns in the verified data streams 112 to maintain current market alignment through updates 116. The system evaluates job postings, industry developments, and user interactions to adapt ontological relationships. In some embodiments, the cross-domain mapping 118 implements semantic similarity algorithms to identify and map relationships between skills and job roles that share less than 20% semantic similarity based on cosine distance. This capability enables the ontology management layer 114 to discover non-obvious connections and provide more nuanced recommendations through an explainable AI 122.

In some embodiments, the ontology management layer 114 implements a multi-domain integration mechanism within the cross-domain mapping 118. This mechanism merges and reconciles ontologies across various industries, maintaining separate confidence scores for each domain while enabling cross-domain career guidance. The integration ensures that enriched data 120 reflects comprehensive skill applicability across different sectors. In some embodiments, the updates 116 component processes incoming verified data 112 to adjust ontological relationships. In some embodiments, the system implements sliding window analysis with exponential decay functions to prioritize recent market trends while maintaining historical stability. These updates ensure that the enriched data 120 flowing to the explainable AI 122 reflects current market conditions.

In some embodiments, the secure API layer (orchestration) 134 manages cross-platform synchronization 138 and security protocols 136, generating recommendations and explanations 142 based on verified data stream 128, ontological updates 130 from the ontology management 114, and/or recommendations and explanations 132 from the explainable AI 122. In some embodiments, the secure API layer 134 processes incoming data streams to generate recommendations and explanations 142. The layer orchestrates communication between the verified data stream 128, ontological updates 130, and recommendations and explanations 132 from the explainable AI 122 to provide personalized outputs. In some embodiments, the cross-platform synchronization 138 component processes user data, job market information, and ontological updates. The system implements asynchronous processing queues with predictive resource allocation, achieving 30-40% reduction in processing latency compared to conventional architectures while maintaining 20% lower CPU usage, in some instances.

In some embodiments, the security protocols 136 implement multi-layered protection mechanisms including encryption at rest and in transit. The system uses AES-256-GCM for data at rest and TLS 1.3 with perfect forward secrecy for data in transit, with 90-day key rotation. Role-based access control manages secure API usage across different platforms while ensuring GDPR compliance. In some embodiments, the secure API layer 134 implements JWT token management with configurable expiration (default: 1 hour) and refresh tokens (14-day validity). The system maintains separate authentication and authorization mechanisms for different domains, enabling cross-domain data sharing while preserving privacy controls. The API layer tracks historical accuracy using a moving window average over 30-day periods, with recursive Bayesian estimation refining metrics as new data points are verified.

In some embodiments, the explainable AI 122 includes SHAP analysis 124 and/or decision trees 126 for generating the recommendations and explanations 132. The explainable AI analysis component 128 processes the enriched data 120 from the ontology management 114 using a combination of decision trees, Bayesian inference, and/or SHAP values to generate recommendations 142, via the secure API layer 134. The recommendations 142 are consumed by external applications and user interfaces 144. In some embodiments, a feedback loop 146 enables system refinement through reinforcement learning mechanisms that optimize recommendation accuracy over time.

In some embodiments, the explainable AI 122 generates interpretable recommendations 132 by implementing a combination of decision trees 126 and SHAP analysis 124. The framework processes enriched data 120 to explain how specific user skills, experiences, and preferences contribute to each recommendation decision. In some embodiments, the decision trees 126 generate interpretable recommendation paths that show users how different combinations of skills and experiences lead to specific suggestions. The system implements cost-complexity pruning with predetermined depth constraints to maintain interpretability while preserving recommendation accuracy. For example, skill trees maintain a maximum depth of 8 levels, while career path trees extend to 12 levels for complex relationships.

In some embodiments, the SHAP analysis 124 calculates feature importance scores to highlight the most significant factors contributing to each recommendation. The system implements a multi-objective SHAP approach that combines predictive importance and fairness metrics through a weighted combination: SHAP combined=w1*SHAP predictive+w2*SHAP fairness, where w1 (e.g., 0.7) and w2 (e.g., 0.3) balance accuracy and fairness objectives. In some embodiments, the explainable AI 122 implements Bayesian models to calculate success probabilities for specific recommendations. These models process the enriched data 120 using recursive Bayesian estimation with sliding windows to maintain current market alignment while incorporating historical success patterns. The system updates probability calculations as new verified data 112 becomes available through the ontology management 114.

In some embodiments, the feedback loop 146 implements a reinforcement learning mechanism using Q-learning with an ε-greedy policy (ε=0.1) for exploration. The system maintains a state-action value matrix Q(s, a) updated through the Bellman equation with a learning rate $\alpha$=0.05 and discount factor $\gamma$=0.95. The reward function incorporates user acceptance rates, recommendation relevance scores, and long-term career progression metrics.

In some embodiments, the feedback loop 146 specifically processes unsuccessful outcomes to improve system performance. When users report dissatisfaction or reject recommendations, the system captures these negative outcomes through reinforcement learning mechanisms, treating them as negative rewards in the Q-learning framework. The system performs counterfactual analysis on these cases, examining alternative decision paths that might have led to better outcomes. This analysis informs model adjustments, with the system modifying weights and decision boundaries to avoid similar unsuccessful recommendations in the future. The system maintains historical records of these adjustments, enabling it to track patterns in unsuccessful recommendations and validate the effectiveness of corrective actions across different domains and user segments.

According to some embodiments, inter-component communication between the components shown in FIG. 1 achieves a 30-40% reduction in processing latency through asynchronous processing queues. The system maintains a 20% lower CPU usage compared to conventional architectures by implementing predictive resource allocation. The configuration reduces idle resource consumption by 25% through scaling.

In some embodiments, the verified data 112 flows from the data verification subsystem 106 directly into the ontology management layer 114, ensuring enrichment of the ontology. The system processes unstructured data 104 through the multi-tiered verification process 108 using advanced NLP models before feeding it to the ontology management 114, where semantic similarity algorithms expand relationships between entities through updates 116. In some embodiments, the enriched data 120 from the ontology management 114 provides input to the explainable AI 122. As the ontology adapts through updates 116, the explainable AI 122 recalibrates its decision trees 126 and SHAP analysis 124 to maintain current market alignment. This interaction ensures recommendations and explanations 132 reflect the latest verified data 112 and ontological relationships.

In some embodiments, the recommendations and explanations 132 from the explainable AI 122 flow through the secure API layer 134, which manages their delivery to external applications and user interfaces 144. The API layer implements cross-platform synchronization 138 to handle transmission of recommendations while maintaining security protocols 136. This ensures that external platforms receive current, contextually relevant recommendations based on the latest ontological updates 130. In some embodiments, the feedback loop 146 connects external applications 144 back to the data verification subsystem 106 through the secure API layer 134. The system captures user interactions and feedback from external applications 144, processes them through security protocols 136, and routes them back to the verification subsystem 106 as unstructured data 104. This creates a learning cycle that enables system-wide refinement through reinforcement learning mechanisms.

Figure 2:
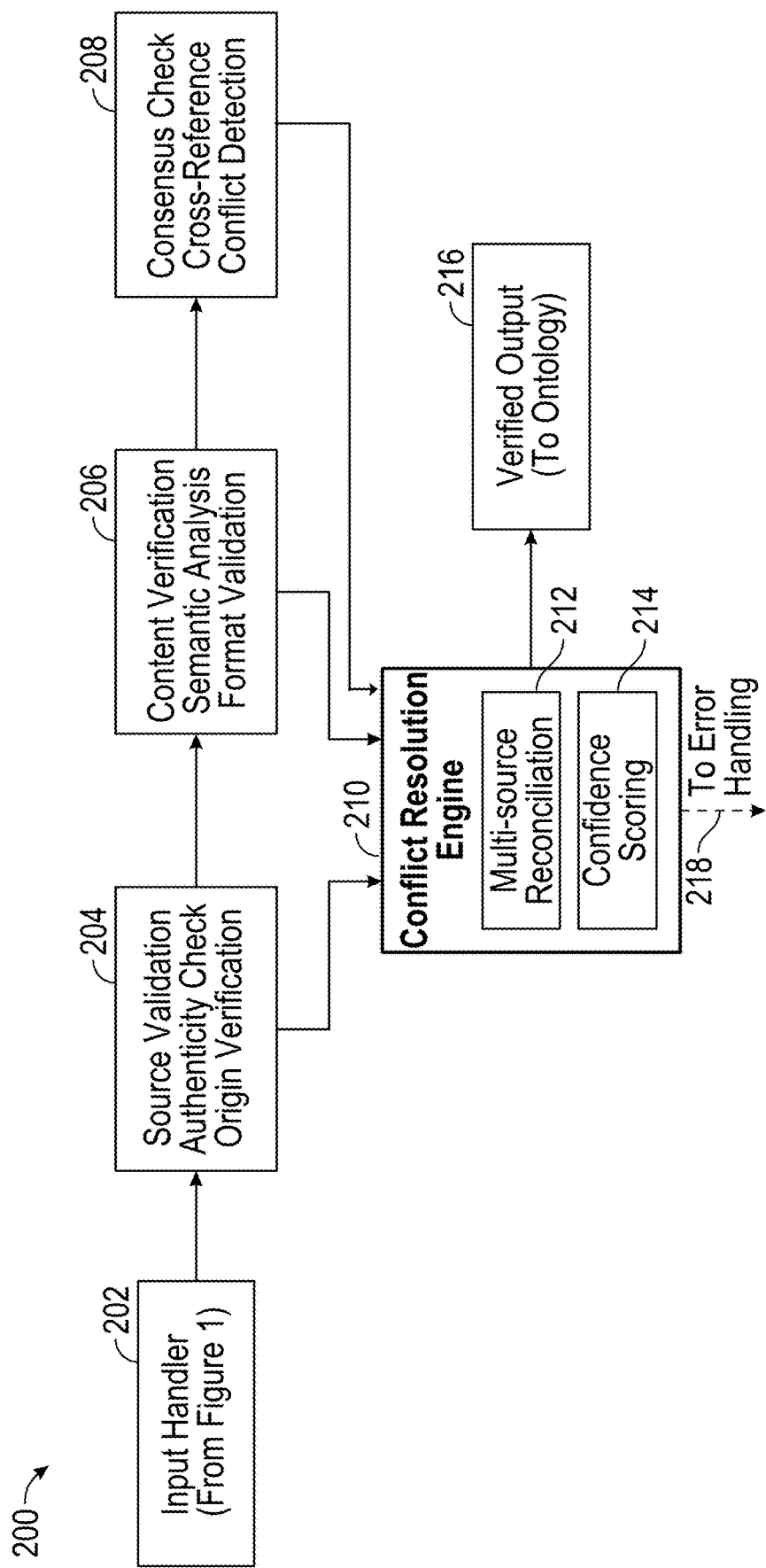
FIG. 2 is a schematic diagram of an example data verification process implementing input handling, source validation, content verification, and conflict resolution for generating verified output, according to some embodiments.

FIG. 2 is a schematic diagram of an example data verification process 200, according to some embodiments. An input handler 202 processes incoming data (e.g., the raw data 104, sometimes referred to as unstructured data) through multiple verification stages. The source validation 204 performs authenticity checks and/or origin verification (e.g., using a Bayesian weighting model that adjusts weights based on observed patterns). Content verification 206 implements semantic analysis and/or format validation. A conflict resolution engine 210 implements multi-source reconciliation 212 and/or confidence scoring 214 to generate verified output 216. The conflict resolution engine 210 can include consensus algorithms, weighted averaging, calculation of confidence scores (e.g., scores ranging from 0-1) based on source reliability, historical accuracy, and/or relevance. In some embodiments, the system applies exponential decay functions to reduce scores over time for potentially outdated sources.

When processing job postings with conflicting skill requirements, for example, the conflict resolution engine 210 performs consensus checks using weighted averages of confidence scores. For example, when processing conflicting skill requirements across multiple job postings, the system determines the final skill set by applying weighted averages of the confidence scores, with higher weights assigned to verified company websites compared to third-party aggregators. The resulting skill set represents a consensus view based on the most reliable sources. For cases with high discrepancies, the system leverages Dempster-Shafer theory to manage uncertainty probabilistically. The system tracks historical accuracy using a moving window average (e.g., average over 30-day periods), with recursive Bayesian estimation refining metrics as new data points are verified. When discrepancies exceed predefined thresholds (e.g., over 5%), the system flags data for manual review or machine learning-based reconciliation using anomaly detection algorithms, such as unsupervised machine learning algorithms for anomaly/outlier detection (e.g., Isolation Forest, one-class support vector machine (SVM)).

In some embodiments, the confidence scoring mechanism in the conflict resolution engine 216 implements a linear combination R=αF+βI, where F represents activation frequency, I represents intensity, and α=0.6 and β=0.4 serve as weighting coefficients. The system applies exponential decay to historical data using a half-life of 30 days, ensuring recent data receives proportionally higher weight in confidence calculations. In some embodiments, the recursive Bayesian estimation process for historical accuracy implements a sliding window of 30 days, with accuracy scores A(t) calculated as: A(t)=A(t-1)*w+(1-w)*new score, where w=0.7 represents the historical weight factor. The system maintains separate accuracy metrics for different data categories, applying category-specific thresholds (e.g., ranging from 0.75 to 0.95) for acceptance.

Figure 3:
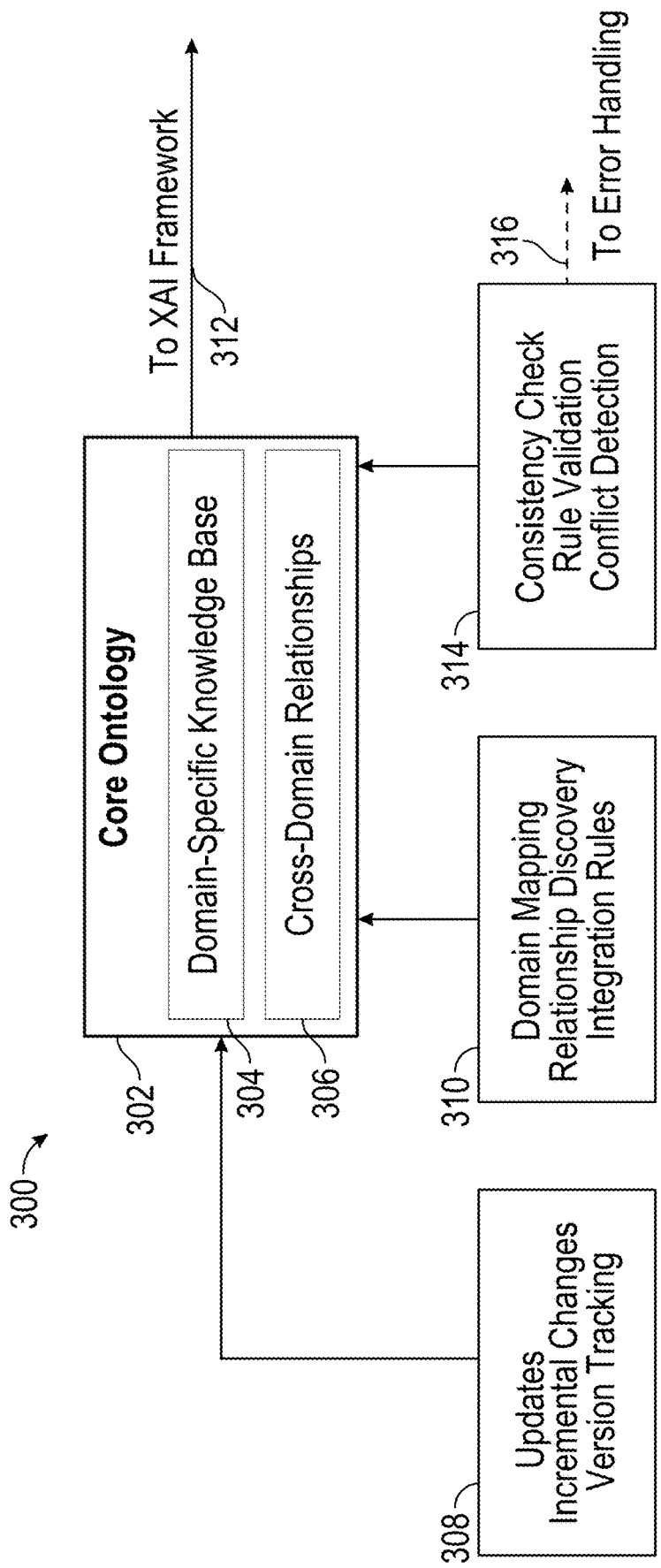
FIG. 3 is a schematic diagram of an example ontology management system implementing a core ontology framework with knowledge bases, cross-domain relationships, and updates, according to some embodiments.

FIG. 3 is a schematic diagram of an example ontology management system 300, according to some embodiments. The ontology management system 300 (sometimes referred to as the ontology management layer or the ontology management module) implements updates through a hypergraph data structure where nodes represent concepts and hyperedges connect multiple nodes across domains. The system includes a core ontology framework 302, which maintains domain-specific knowledge bases 304 and manages cross-domain relationships 306 through updates 308, which may include incremental changes and/or version tracking. In some embodiments, the system uses semantic similarity algorithms that calculate scores for attribute pairs (e.g., skill and role pairs) across domains, storing these in a multidimensional similarity matrix. The system then applies dimensionality reduction techniques, such as Principal Component Analysis (PCA) or t-distributed Stochastic Neighbor Embedding (t-SNE), to compress the matrix while retaining key relationships.

In some embodiments, a domain mapping component 312 implements relationship discovery and/or integration rules using hierarchical clustering algorithms that group similar attributes (e.g., skills, roles), and domains. Some embodiments perform consistency check 314, which can include rule validation and/or conflict detection, validate clusters at different levels (e.g., entry-level and advanced skills), creating a consistent multi-level structure that incorporates cross-domain paths. For example, when programming skills from one domain align with data analysis roles in another domain, the system identifies and maps these relationships through cluster analysis. This approach enables efficient multi-domain queries without duplicating data or flattening ontological hierarchies. The consistency check may identify errors 316 handled by error handling. The output 312 of the core ontology is input to the explainable AI framework.

In some embodiments, a hypergraph data structure implements domain-specific knowledge bases 304, uses an adjacency tensor representation, enabling O(1) lookup time for connected nodes. Each hyperedge maintains weight vectors representing relationship strengths across different domains, updated through gradient descent with a learning rate of 0.01, which may be chosen empirically to balance convergence speed and stability. In some embodiments, the gradient descent learning rate is configured to 0.01, which provides optimal convergence while maintaining stability. The minimum distance threshold between embedded concepts is set to 0.85 in the reduced space to preserve semantic relationships while enabling efficient processing. In some embodiments, the dimensionality reduction process applies PCA with an explained variance ratio threshold of 0.95, followed by t-SNE with perplexity=30 for visualization. In some embodiments, the system 300 preserves local structure through a minimum distance preservation constraint of 0.85 in the reduced space.

Figure 4:
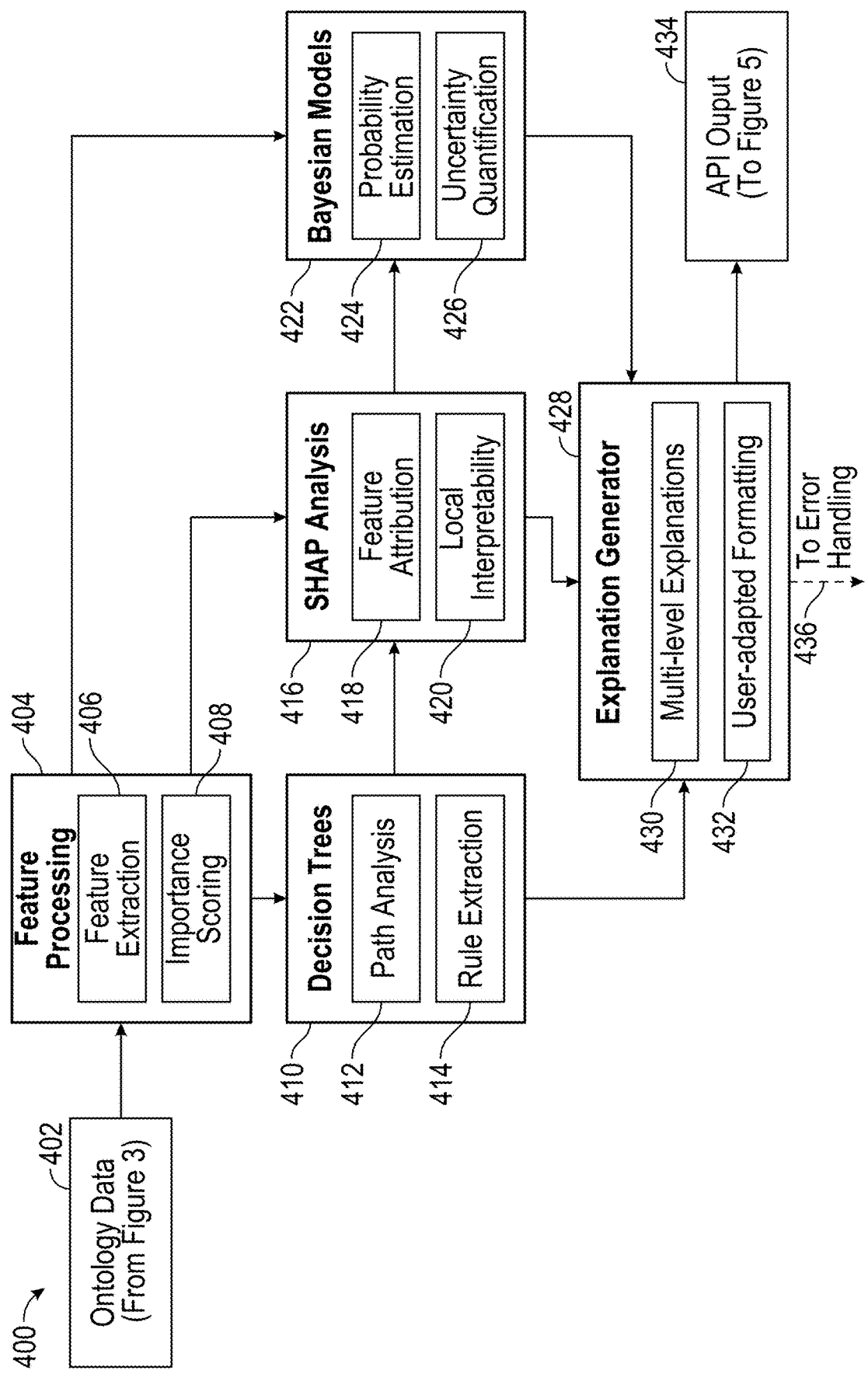
FIG. 4 is a schematic diagram of an example explainable AI framework processing ontology data through feature processing, analysis methods, and explanation generation, according to some embodiments.

FIG. 4 is a schematic diagram of an example explainable AI framework 400, according to some embodiments. The framework 400 processes ontology data 402 (e.g., the output 312) through feature processing 404, which includes features extraction 406 and/or importance scoring 408. In some embodiments, the framework 400 implements analysis methods, such as Bayesian models 422 with probability estimation 424 and uncertainty quantification 426, decision trees 410 with path analysis 412 and rule extraction 414, and/or SHAP analysis 416 with feature attribution 418 and/or local interpretability 420. In some embodiments, the framework 400 implements context-aware adversarial debiasing that applies bias correction based on user demographics, industry, and/or skill level. An explanation generator 428 produces multi-level explanations 430 and/or user-adapted formatting 432. The output of the explanation generator 428 is routed to error handling 436 or API output 434 (if no errors are detected).

In some embodiments, the system evaluates feature importance and/or fairness impact across multiple metrics using an extended, multi-objective SHAP approach. The framework implements layered model distillation with fairness constraints, creating intermediate distillation layers that gradually simplify the model while maintaining balanced fairness indicators. A reinforcement learning-driven fairness indicator adjustment learns from user interaction data to optimize bias thresholds. In some embodiments, the system monitors recommendations by comparing outcomes across different demographic groups and adjusts model weights when it detects systematic bias in favor of or against particular groups. The multi-objective SHAP analysis 416 extends traditional SHAP values through a weighted combination of predictive importance and fairness metrics: SHAP combined=w1*SHAP predictive+w2*SHAP fairness, where w1 (e.g., 0.7) and w2 (e.g., 0.3) balance accuracy and fairness objectives, respectively. In some embodiments, the layered model distillation process creates intermediate models with progressively reduced complexity, maintaining a minimum accuracy threshold (e.g., 95%) relative to the full model. Each layer implements fairness constraints ensuring demographic parity deviation remains below a threshold (e.g., 0.1).

In some embodiments, when scaling the system to handle increased complexity, the layered model distillation process creates simplified, interpretable models from larger ensembles. Each layer maintains granular decision traces and implements progressive complexity reduction techniques while preserving a minimum accuracy threshold relative to the full model. The system provides interpretability at each decision point by generating SHAP values that allow users to trace the complete reasoning chain from input features to final recommendations. This architecture ensures that even as the system scales to handle more complex scenarios, users can still understand how specific skills, experiences, and other factors contribute to each recommendation.

Figure 5:
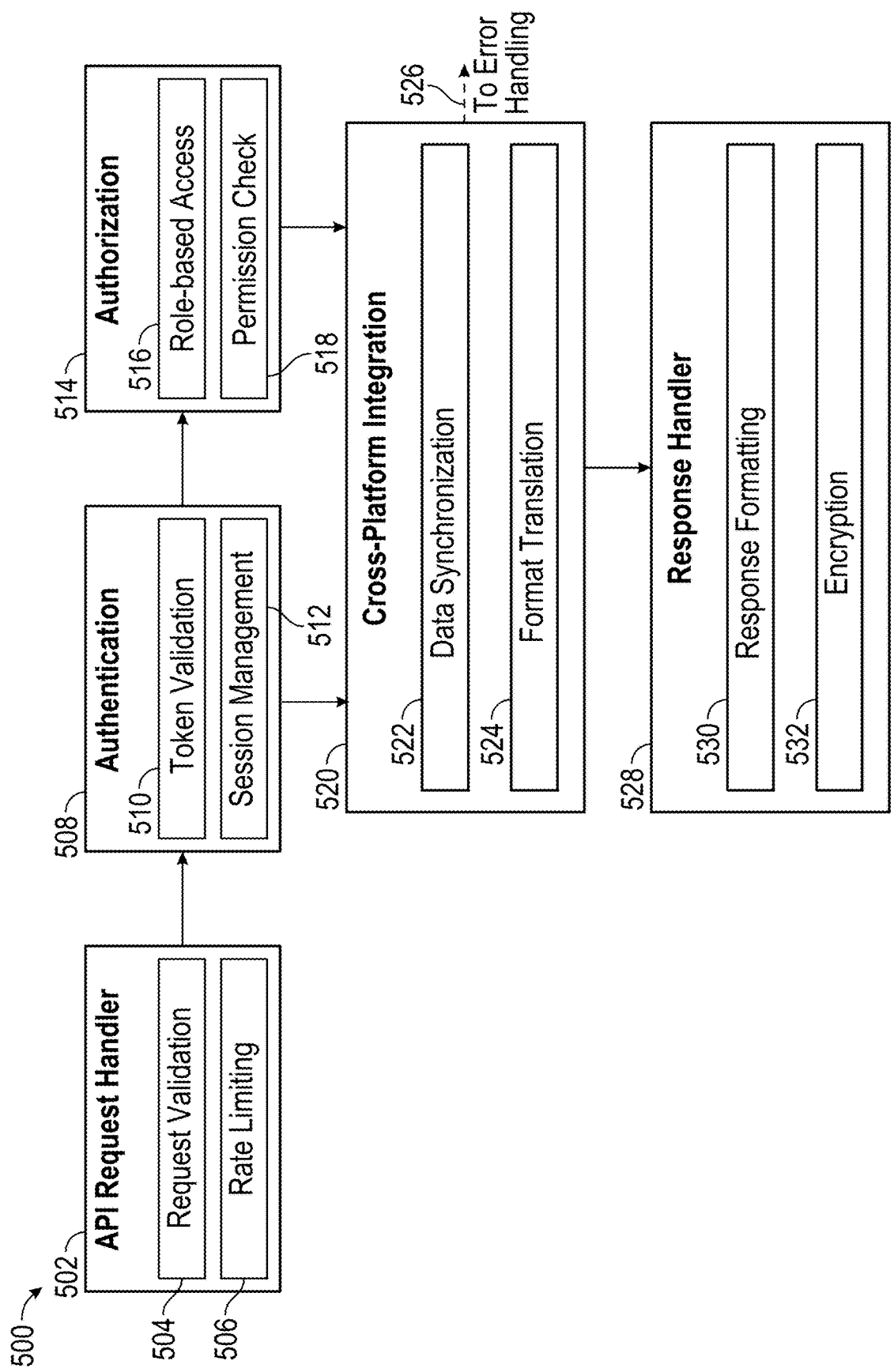
FIG. 5 is a schematic diagram of an example API layer implementing request handling, authentication, authorization, cross-platform integration, and response handling, according to some embodiments.

FIG. 5 is a schematic diagram of an example API layer 500, according to some embodiments. The API layer includes an API request handler 502, which implements load balancing with adaptive routing through request validation 504 and rate limiting 506 of the API output 434 (FIG. 4). The architecture also includes authentication 508, which performs token validation 510 and session management 512 using consistent hashing for session persistence. Authenticated requests from the authentication 508 are subject to authorization 514, which can include role-based access 516 and/or permission checks 514. The authenticated and/or authorized API requests are routed to cross-platform integration 520, which includes data synchronization 522 and/or format translation 524. Any error 526 is routed to error handling. The API requests are subsequently sent to a response handler 528, which includes response formatting 530 and/or encryption 532.

In some embodiments, the data synchronization 522 is implemented using sidecar proxies that track latency, error rates, and/or response times. In some embodiments, the proxies feed data to a central controller that recalibrates node weights every few seconds. Some embodiments manage asynchronous processing queues with backpressure management. In some embodiments, the system uses Apache Kafka to handle traffic spikes, implementing partitioned topics for different request types and priority levels. In some embodiments, the rate limiting 506 enforces constraints per partition (e.g., different API request types, domains, time limits), allowing critical requests to bypass less urgent ones during loads. In some embodiments, the response formatting 530 uses context-aware caching that identifies patterns in requests and caches outputs for standard user profiles. In some embodiments, service meshes (e.g., Istio) provide adaptive and/or traffic control and health checks. Some embodiments use circuit breakers (e.g., with 60% threshold for consecutive errors, 10-second timeout periods). In some embodiments, load balancing utilizes consistent hashing with bounded loads (e.g., maintaining a maximum load imbalance factor of 1.25 across nodes). In some embodiments, a distributed message broker (e.g., Kafka) partitions topics, implements partition reassignment (e.g., with a rebalance threshold of 85% partition skew). In some embodiments, consumer lag monitoring triggers scaling (e.g., when lag exceeds 1000 messages or 5 seconds), implementing scale-up (e.g., a scaling factor of 1.5) with a cool-down period (e.g., 300 seconds).

Figure 6:
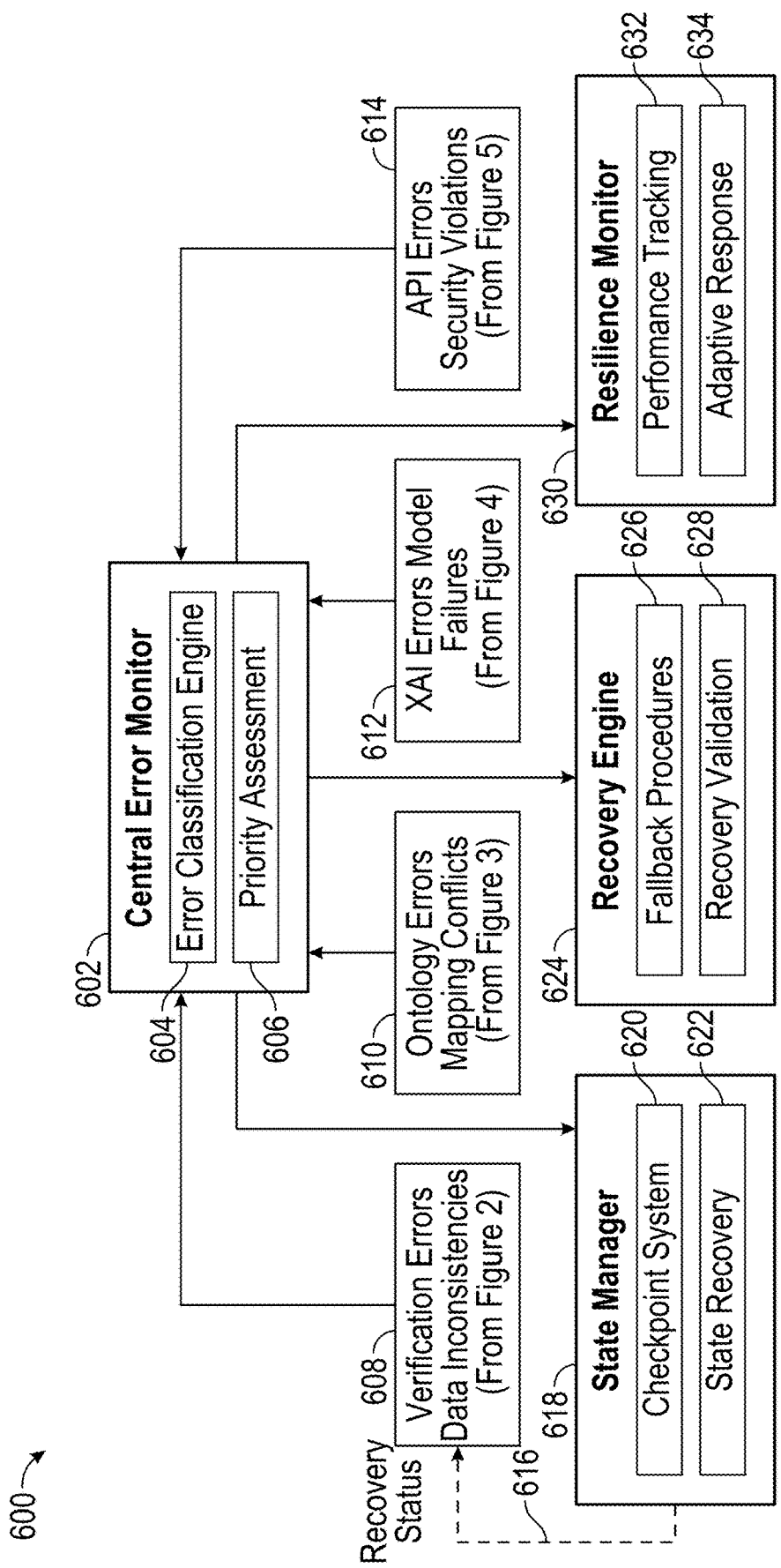
FIG. 6 is a schematic diagram of an example error handling and recovery system implementing error monitoring, state management, recovery procedures, and resilience monitoring, according to some embodiments.

FIG. 6 is a schematic diagram of an example error handling and recovery system 600, according to some embodiments. A central error monitor 602 includes an error classification engine 604 and priority assessment 606. The system processes verification errors and/or data inconsistencies 608 (from FIG. 2), ontology errors and/or mapping conflicts 610 (from FIG. 6), XAI errors and/or model failures 612 (from FIG. 4), and/or API errors and/or security violations 614 (from FIG. 5). The system includes a state manager 618, which in turn includes a checkpoint system 620 and/or state recovery 622. In some embodiments, recovery status 616 from the state manager 618 is fed back to the central error monitor (e.g., via the verification errors 608) in a loop for improving the system. A recovery engine 624 includes fallback procedures 626 and/or recovery validation 628 for implementing the state recovery. A resilience monitor 630 implements performance tracking 632 and/or adaptive response 634. In some embodiments, the checkpoint system 620 and/or the state recovery 622 uses distributed lock management with Conflict-Free Replicated Data Types (CRDTs).

In some embodiments, the recovery engine 624 implements rollback through checkpointing and/or snapshotting at regular intervals. In some embodiments, the resilience monitor 628 uses temporal vector clocks to maintain event ordering across components. Each component assigns vector clocks to outgoing events, capturing event sequences and detecting causal dependencies to ensure consistent state updates during recovery operations. Some embodiments use a circuit breaker pattern that implements a multi-state model (e.g., CLOSED, HALF-OPEN, OPEN) with configurable thresholds. For example, error threshold: 50% of requests in 10-second window, reset timeout: 30 seconds in OPEN state, and success threshold: 5 consecutive successful requests in HALF-OPEN state. CRDT convergence mechanisms utilize version vectors with dotted version vectors for causality tracking. Some embodiments implement state-based CRDTs for counters and sets, and operation-based CRDTs for collaborative editing, with bounded space complexity of O(n), where n represents the number of replica nodes (e.g., distributed copies of data/services operating across multiple servers).

Figure 7:
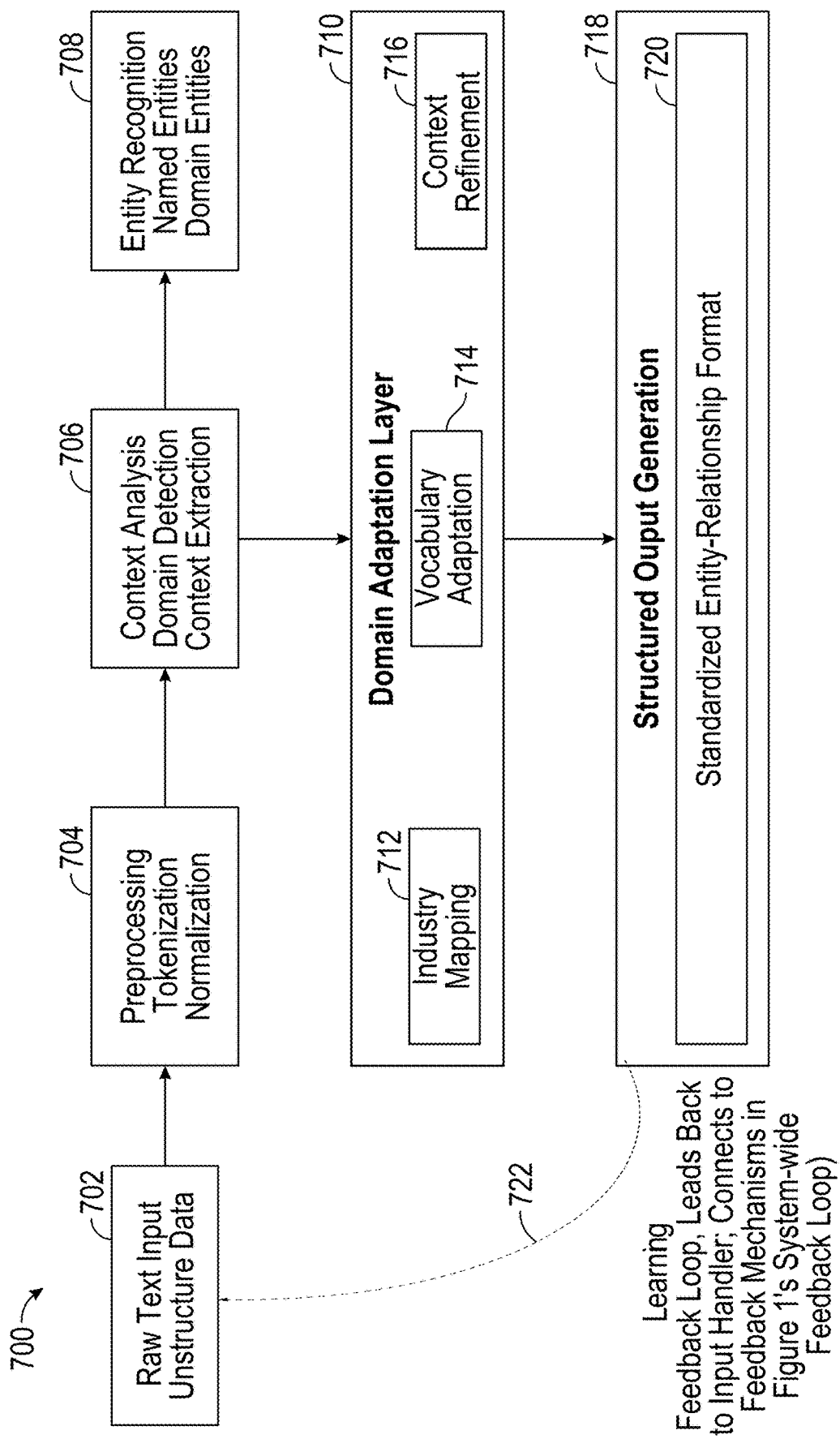
FIG. 7 is a schematic diagram of an example data processing pipeline implementing preprocessing, context analysis, entity recognition, and domain adaptation, according to some embodiments.

FIG. 7 is a schematic diagram of an example data processing pipeline 700, according to some embodiments. Raw text input 702 (e.g., unstructured data 102) flow through preprocessing 704 including tokenization and/or normalization. In some embodiments, the pipeline implements data mining from nontraditional sources, scanning industry blogs, academic journals, professional forums, and/or online course catalogs, to identify emerging attributes and/or data (e.g., skills and qualifications). Context analysis 706 performs domain detection and/or context extraction, for example using trained transformers (e.g., BERT or GPT models), which are fine-tuned on industry-specific datasets. Entity recognition 708 processes named entities and domain entities, for example, using a two-stage disambiguation process that uses cosine similarity in embedding space. A domain adaptation layer 712 handles industry mapping 714, vocabulary adaptation 716, and/or context refinement 716. In some embodiments, the domain adaptation layer 712 includes density-based spatial clustering (DBSCAN) for flexible cluster formation around emerging data/attributes (e.g., skills). The system generates structured output 718, for example, using term frequency-inverse document frequency (TF-IDF) to assign weights to emerging terms based on rarity and industry specificity. The structured data can use a standardized entity-relationship format 720. In some embodiments, trained transformer models implement domain-specific vocabularies with 50,000 tokens, fine-tuned on 10 million industry-specific documents. The two-stage disambiguation process includes a primary stage (e.g., Bi-encoder BERT with cosine similarity threshold 0.85), and a secondary stage (e.g., cross-encoder RoBERTa for fine-grained matching with accuracy threshold 0.92). TF-IDF weighting for emerging skills applies sublinear scaling (e.g., 1+log(tf)) with smooth IDF weighting, normalized by document length. In some embodiments, the system implements aging factors for term frequency: weight(term, doc)=tf-idf (term, doc)*exp(−Δt), where λ=0.1 represents the decay factor and t is the term's age in months. Learning feedback loop 722 leads back to input handler, connects to feedback mechanisms in the system 100 (e.g., FIG. 1's system-wide feedback loop 146).

Figure 8:
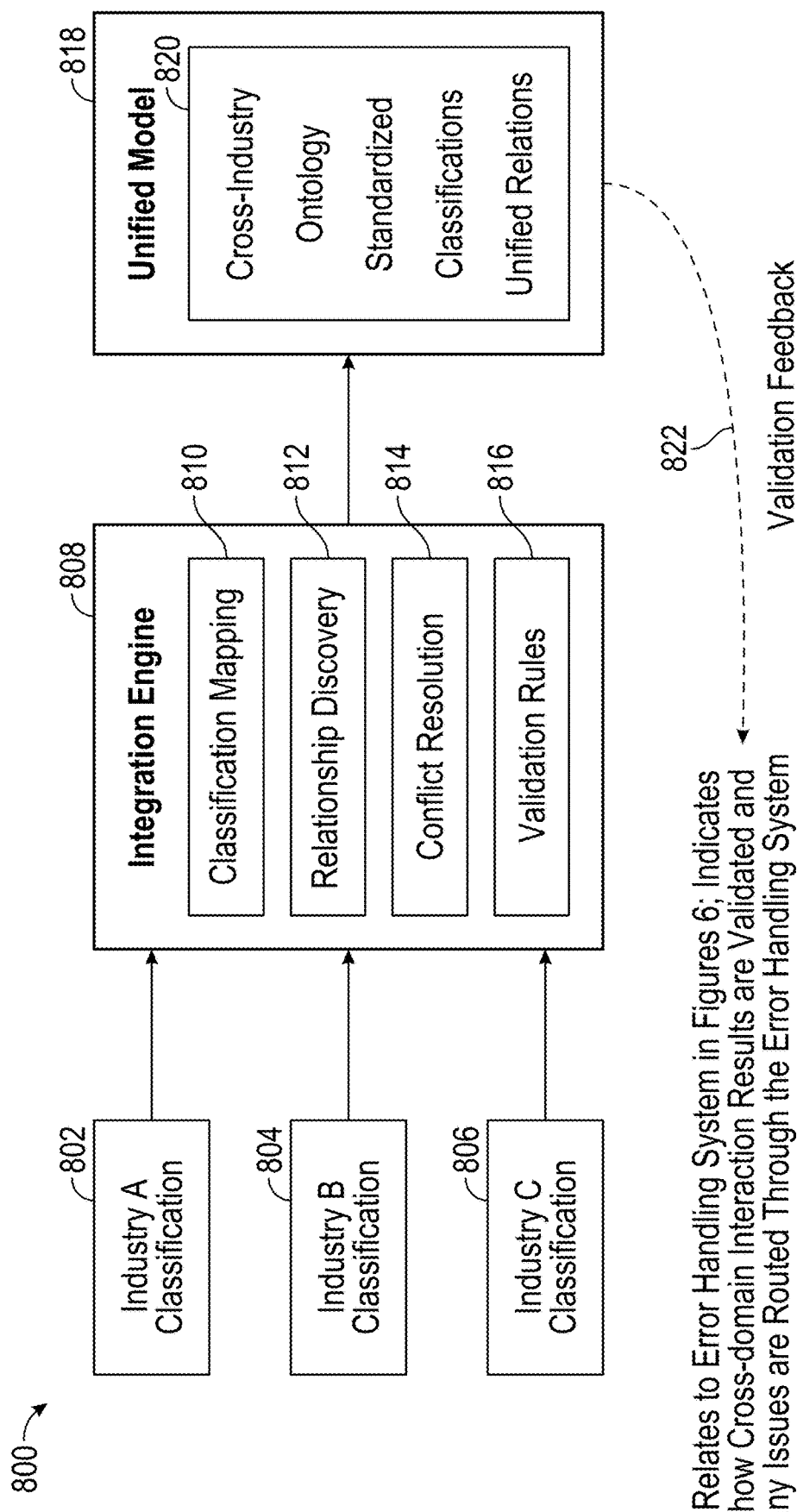
FIG. 8 is a schematic diagram of an example system for cross-domain integration implementing classification mapping, relationship discovery, and conflict resolution, according to some embodiments.

FIG. 8 is a schematic diagram of an example system 800 for cross-domain integration, according to some embodiments. The system includes an integration engine 808 for cross-domain (e.g., cross-industry) integration and/or classification. Classification mapping 810 manages multiple industry classifications (e.g., industry A 802, industry B 804, and industry C 806). Relationship discovery 812 identifies relationships across domains or industries. Conflict resolution 814 resolves conflicts across domains. Validation rules 816 are used to validate cross-domain integration. In some embodiments, the system 800 implements trend detection using semantic similarity algorithms (e.g., Word2Vec, BERT embeddings) to compare terms with existing attributes (e.g., skills). Relationship discovery 810 employs unsupervised clustering techniques to group related attributes (e.g., skills and qualifications) based on industry, domain, and/or context. The system maintains a unified model 818 comprising a cross-domain ontology, standardized classifications, and/or unified relations 820.

In some embodiments, a spectral clustering overlay refines cluster boundaries based on skill embeddings, aligning clusters with contextual shifts in language usage. In some embodiments, validation feedback 822 connects to the error handling system. In some embodiments, a time series analysis monitors cluster density, calculates growth rates (e.g., for emerging skill clusters), and/or flags those attributes with growth rates above a predetermined threshold (e.g., growth above 80% is tagged as a priority skill). In some embodiments, DBSCAN clustering implements epsilon calculation based on k-distance graphs (e.g., with minPoints=5 and eps determined through the knee-point detection algorithm). The system adapts epsilon values per domain (e.g., technical domains: eps=0.3 (tighter clustering), soft skills domains: eps=0.5 (looser clustering)). Spectral clustering overlay applies normalized graph Laplacian with adaptive kernel bandwidth: $\sigma$=median distance*scaling factor, where scaling factor adapts between 0.1 and 0.3 based on cluster density. In some embodiments, time series analysis applies exponential smoothing ($\alpha$=0.3) for trend detection with periodic (e.g., weekly) seasonality adjustment.

Figure 9:
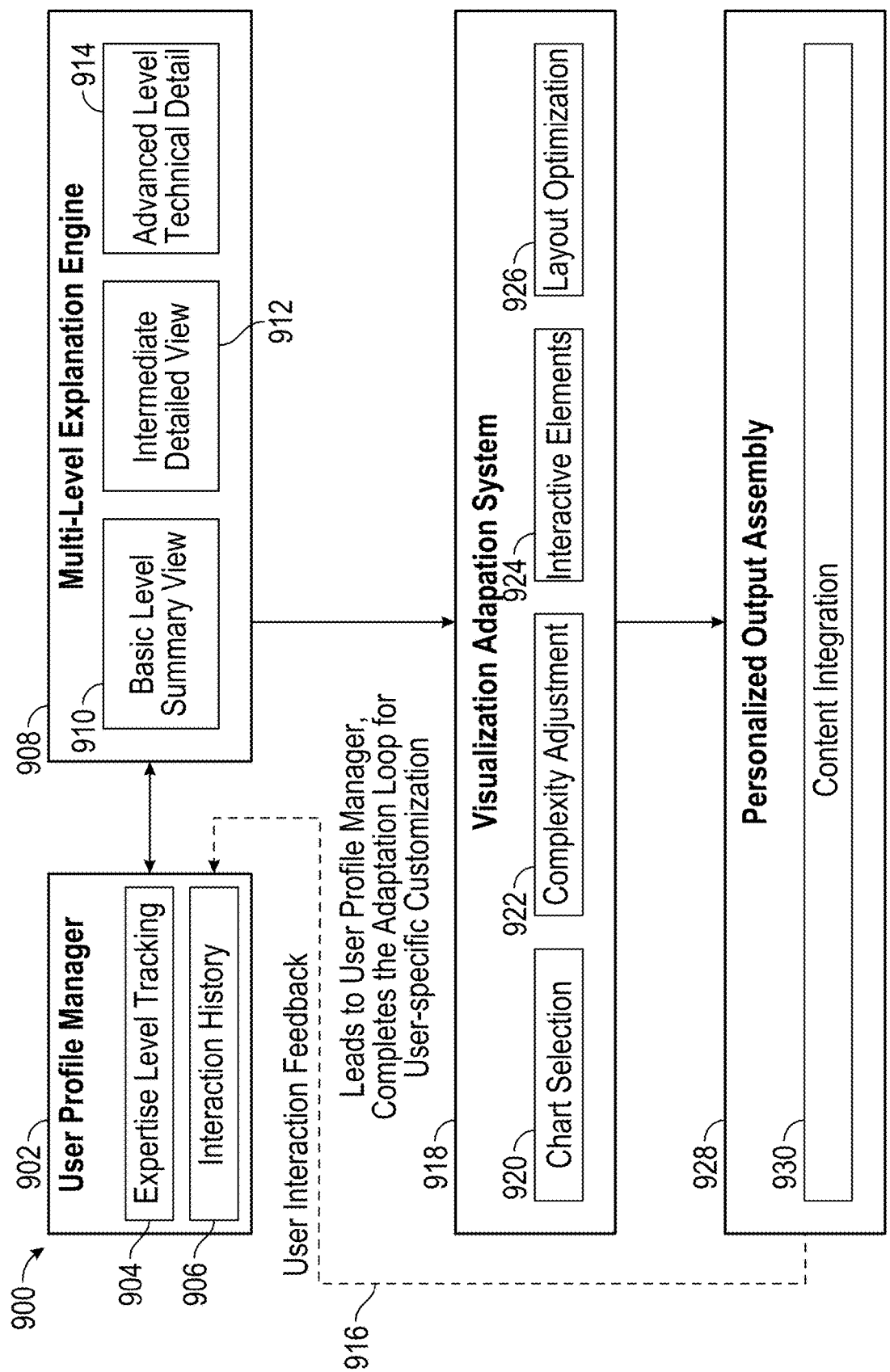
FIG. 9 is a schematic diagram of an example user-adaptive explanation system implementing profile management, multi-level explanation, and visualization adaptation, according to some embodiments.

FIG. 9 is a schematic diagram of an example user-adaptive explanation system 900, according to some embodiments. The system 900 includes a user profile manager 902, which includes expertise level tracking 904 and/or interaction history 906. The system also includes a multi-level explanation engine 908, which provides multiple views (e.g., basic level summary view 910 for entry-level users, intermediate detailed view 912 for proficient users, and advanced level technical detail 914 for expert users). In some embodiments, the multi-level explanation engine implements multi-level classification. For example, the system implements distinct levels with quantifiable metrics: basic (Level 1): less than 2 years of experience, or less than 5 domain-specific skills; intermediate (Level 2): 2-5 years of experience, 5-15 domain-specific skills; and advanced (Level 3): greater than 5 years of experience, greater than 15 domain-specific skills. In some embodiments, natural language generation employs template-based generation with complexity adjustment, for example: basic: Flesch-Kincaid Grade Level≤8; intermediate: Flesch-Kincaid Grade Level 9-12, and advanced: Flesch-Kincaid Grade Level≥13. Each level implements domain-specific terminology density thresholds (e.g., 10%, 25%, and 40%).

In some embodiments, the explanation engine adjusts its output based on the user's expertise profile. For entry-level users, the system generates simplified explanations focusing on fundamental skills and market trends, while for expert users, it provides detailed statistical insights and model-specific outputs including feature importance scores and confidence intervals. The system employs natural language generation tailored to each expertise level, implementing template-based generation with complexity adjustment. For example, basic level explanations maintain a Flesch-Kincaid Grade Level≤8 with technical terminology density below 10%, while advanced explanations can reach Flesch-Kincaid Grade Level≥13 with technical term density up to 40%.

A visualization adaptation system 918 handles chart selection 920, complexity adjustment 922, interactive elements 924, and/or layout optimization 926, implementing domain-specific (e.g., career-specific) visualization techniques including multi-branch decision trees for illustrating pathways (e.g., career pathways) spanning multiple domains (e.g., multiple industries). In some embodiments, the visualization adaptation system 918 implements a depth-on-demand approach, initially presenting users with high-level explanations that can be progressively expanded for more detail. The system generates concise initial explanations (e.g., ""This job is recommended based on your Python and data analysis skills"") accompanied by interactive visual elements. Users can then explore deeper levels of explanation through expandable sections, each enriched with visual aids such as decision trees showing skill relationships or feature importance graphs quantifying the impact of each qualification. The complexity adjustment 922 ensures that each layer of detail maintains an appropriate balance between comprehensiveness and accessibility, with interactive elements 924 enabling users to control their exploration of the explanation hierarchy.

The visualization adaptation can include personalized output assembly 928, which personalizes output based on user profiles and/or interactions. In some embodiments, the assembly 928 includes content integration 930. The output can include, for example, career timeline graphs with milestone markers showing promotions, certifications, and/or lateral shifts). In some embodiments, the system annotates markers with projected benefits, expected salary ranges, and skill growth potential. In some embodiments, the system also provides a skill transferability heatmap, color-coding skills based on applicability across different industries. For example, Python proficiency might show high transferability across finance and healthcare sectors, while domain-specific knowledge displays lower transferability scores. In some embodiments, user interaction feedback 916 based on interaction with the visualization adaptation system 918 and/or the personalized output assembly 928 is input to the user profile manager 902, completing the adaptation loop for user-specific customization.

Figure 10:
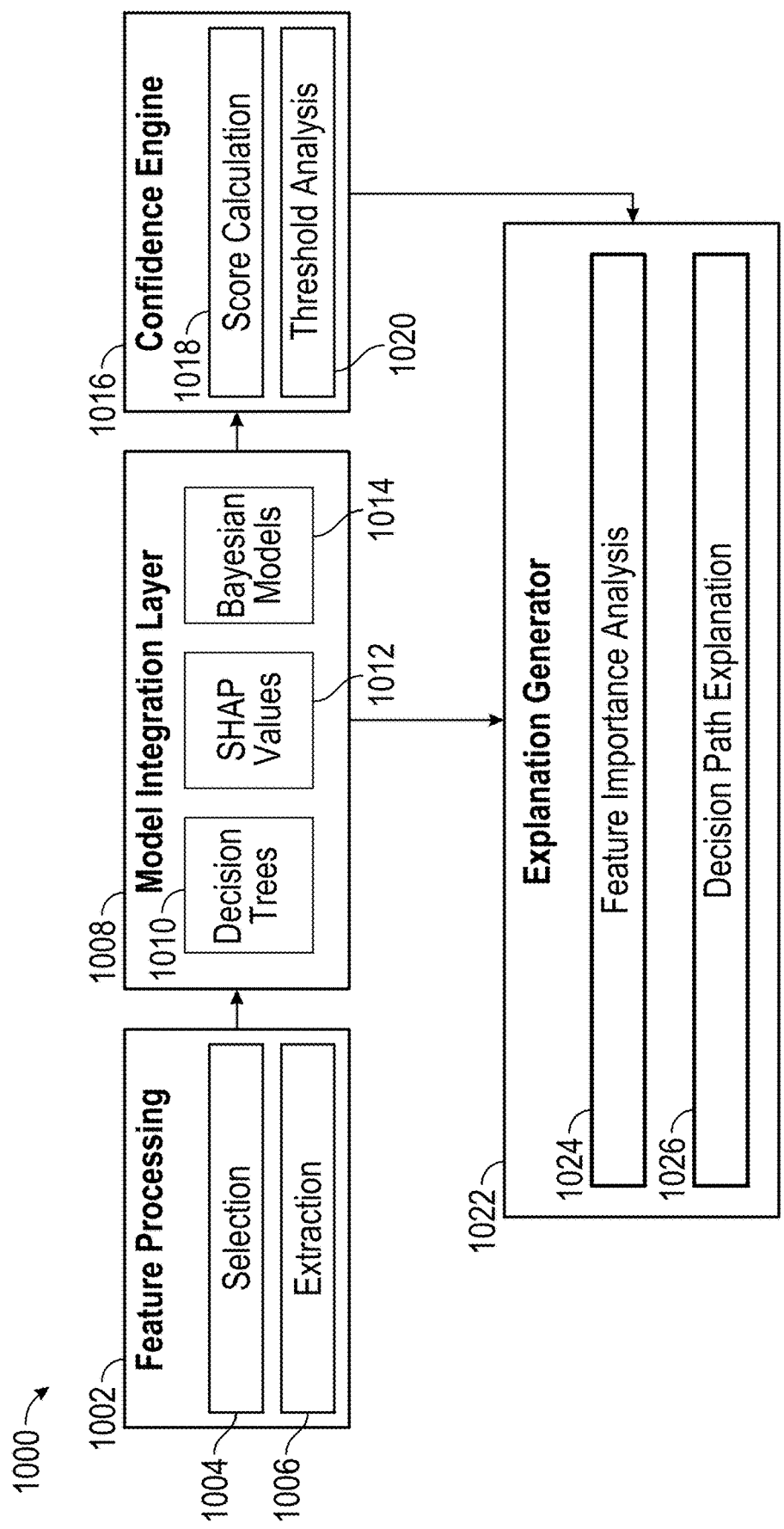
FIG. 10 is a schematic diagram of an example model integration and explanation framework implementing feature processing, model integration, confidence analysis, and explanation generation, according to some embodiments.

FIG. 10 is schematic diagram of an example model integration and explanation framework 1000, according to some embodiments. The system includes feature processing 1002, which includes components for selection 1004 and extraction 1006. Features from the feature processing 1002 are input to a model integration layer 1008, which integrates output and/or decisions from decision trees 1010, SHAP values 1012, and/or Bayesian models 1014. A confidence engine 1016 performs score calculation 1018 and threshold analysis 1020, leading to decision path explanation 1024. An explanation generator 1022 processes feature importance analysis 1024 based on output of the model integration layer 1008. In some embodiments, decision tree optimization implements cost-complexity pruning with $\alpha$=0.02 and maximum depth constraints, for example: skill trees: max depth=8, career path trees: max depth=12, and cross-domain trees: max depth=15. In some embodiments, the confidence engine 1018 calculates composite scores using the equation: confidence score=w1*model confidence+w2*data freshness+w3*domain relevance. Example weights include w1=0.5, w2=0.3, and w3=0.2, which can be adjusted based on historical accuracy.

Figure 11:
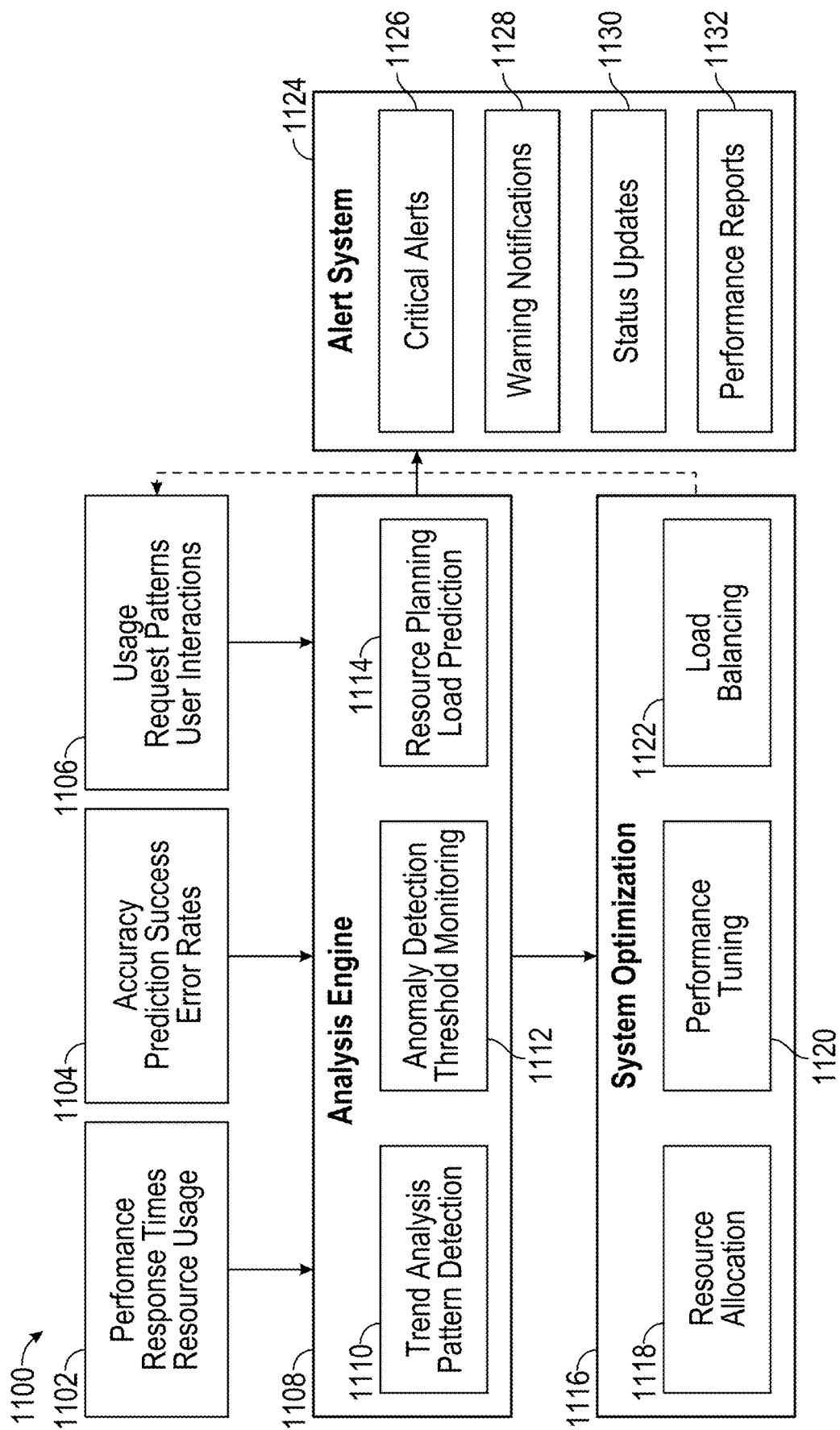
FIG. 11 is a schematic diagram of an example performance monitoring system implementing performance metrics, analysis, and system optimization, according to some embodiments.

FIG. 11 is a schematic diagram of an example performance monitoring system 1100, according to some embodiments. The system tracks metrics across performance 1102 (e.g., response times, resource usage), accuracy 1104 (e.g., prediction success, error rates), and usage 1106 (e.g., request patterns, user interactions). A analysis engine 1108 perform trend analysis and pattern detection 1110, detects anomalies and monitors thresholds 1112, and plans resource and predicts load 1114. Based on the analysis, a system optimization 1116 performs resource allocation 11118, performance tuning 1120, and/or load balancing 1122. In some embodiments, the system optimization 1116 uses a multi-tiered trend weighting mechanism. In some embodiments, the system categorizes data by time intervals (e.g., daily, weekly, quarterly) and applies recency-weighted scoring to ensure longer-term trends have more significant influence than brief fluctuations. An alert system 1124 implements stability filters that limit the influence of short-term data fluctuations using exponential moving averages (EMA) on incoming market data. Critical alerts 1126 trigger when the system detects significant deviations from established patterns. Stability filters implement exponential moving averages with varying smoothing factors, for example: short-term trends: $\alpha=0.3$ (3-day window); medium-term trends: $\alpha=0.1$ (14-day window); long-term trends: $\alpha=0.05$ (30-day window). In some embodiments, the system applies threshold-based damping when rate of change exceeds 20 of historical variance. In some embodiments, the multi-tiered trend weighting mechanism applies Bayesian temporal smoothing: weight(t)=base weight*exp($-\lambda\Delta t$)*confidence factor where $\lambda$ varies by trend type: market trends: $2=0.1$; skill relevance: $\lambda=0.05$; and career transitions: $\lambda=0.02$. The alert system 1124 also generates warning notifications 1128, status updates 11340, and/or performance reports 1132 based on the output of the analysis engine 1108.

Figure 12:
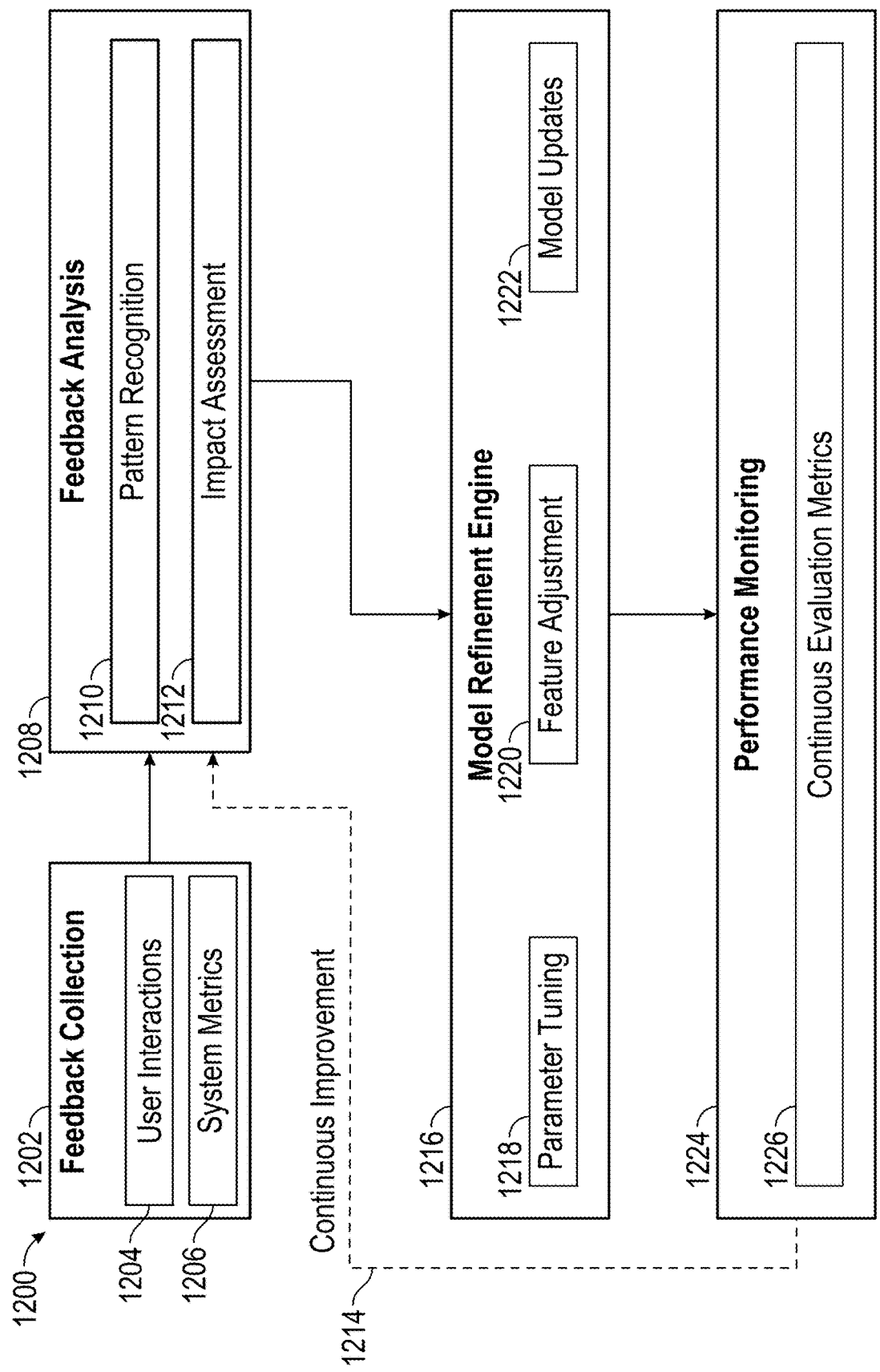
FIG. 12 is a schematic diagram of an example learning subsystem implementing feedback collection, feedback analysis, and model refinement, according to some embodiments.
Figure 13:
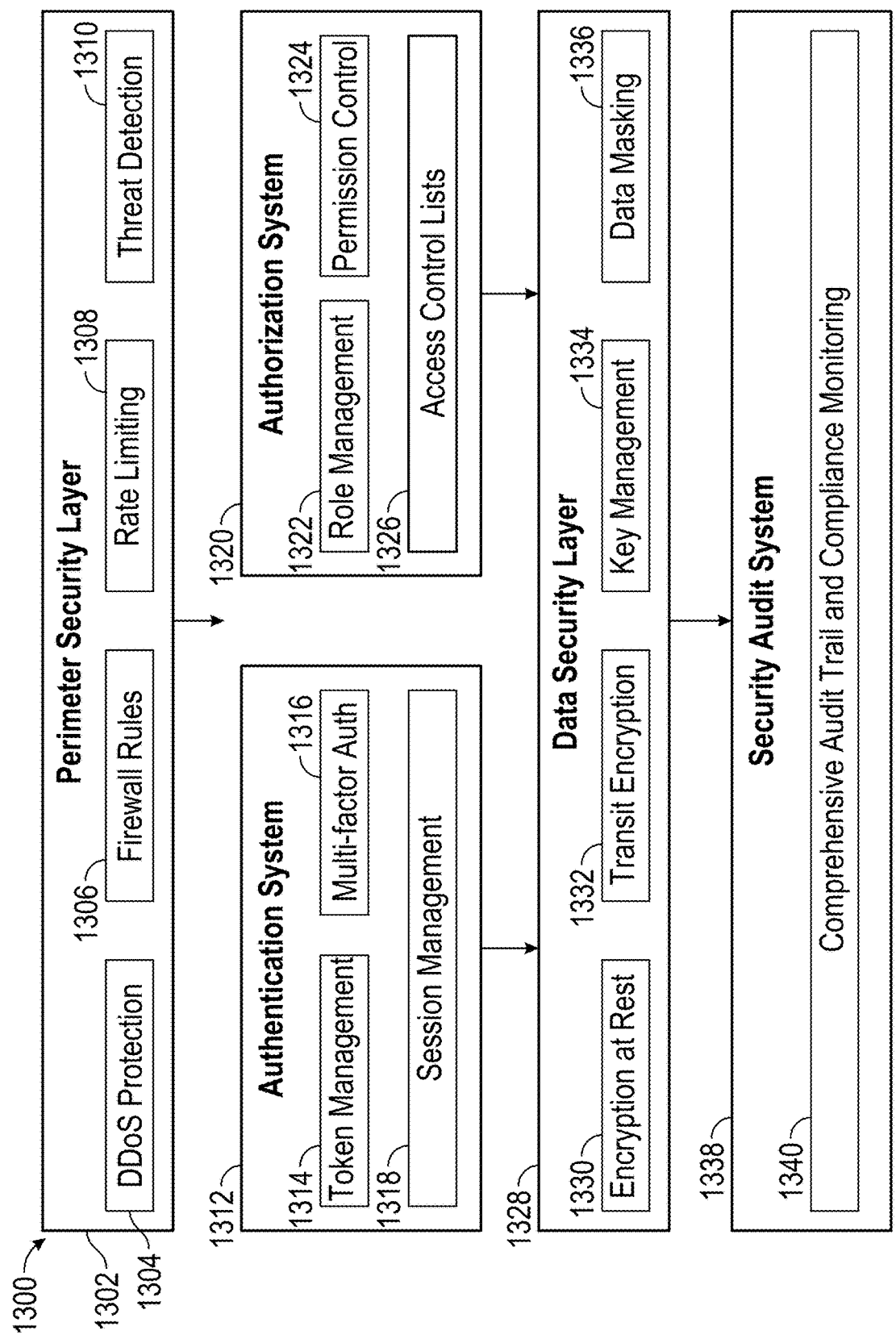
FIG. 13 is a schematic diagram of an example security architecture implementing perimeter security, authentication, authorization, and data security, according to some embodiments.

FIG. 12 is a schematic diagram of a learning subsystem 1200, according to some embodiments. Feedback collected 1202 includes user interactions 1204 and system metrics 1206. Feedback analysis 1208 includes pattern recognition 1210 and impact assessment 1212, which can use LSTM networks for long-term trends and SARIMA models for short-term fluctuations. A model refinement engine 1216 manages parameter tuning 1218, feature adjustment 1220, and model updates 1222, using reinforcement learning that optimizes recommendation success rates. Performance monitoring 1224 tracks evaluation metrics 1226, for example, using a Career Velocity Index (CVI) that measures progression rates based on skills acquisition, role transitions, and/or industry shifts. The system implements improvement 1214 through feedback collection 1202 and iteration, for example, using dynamic time warping (DTW) algorithms to compare individual CVI scores against similar user trajectories. In some embodiments, stability filters implement exponential moving averages with varying smoothing factors, for example: short-term trends: $\alpha=0.3$ (3-day window); medium-term trends: $\alpha=0.1$ (14-day window); and long-term trends: $\alpha=0.05$ (30-day window). In some embodiments, the system applies threshold-based damping when rate of change exceeds 26 of historical variance. Some embodiments use a multi-tiered trend weighting mechanism, which applies Bayesian temporal smoothing: weight(t)=base weight*exp($-\lambda\Delta t$)*confidence factor where $\lambda$ varies by trend type: market trends: $\lambda=0.1$; skill relevance: $\lambda=0.05$; and career transitions: $\lambda=0.02$ FIG. 13 is a schematic diagram of an example security architecture 1300, according to some embodiments. A perimeter security layer 1302 includes DDOS protection 1304, firewall rules 1306, rate limiting 1308, and threat detection 1310. An authentication system 1312 implements multi-factor authentication 1316, token management 1314, and session management 1318. An authorization system 1320 controls access through permission control 1324, role management 1322, and access control lists 1326. A data security layer 1328 manages encryption at rest 1330, transit encryption 1332, key management 1334, and data masking 1336. A security audit system 1338 maintains comprehensive audit trails and compliance monitoring 1340. Encryption protocols implemented can include, for example: data at rest: AES-256-GCM; data in transit: TLS 1.3 with perfect forward secrecy; and key rotation: 90-day rotation. In some embodiments, token management 1314 uses JWT with configurable expiration (default: 1 hour) and refresh tokens (14-day validity).

Figure 14:
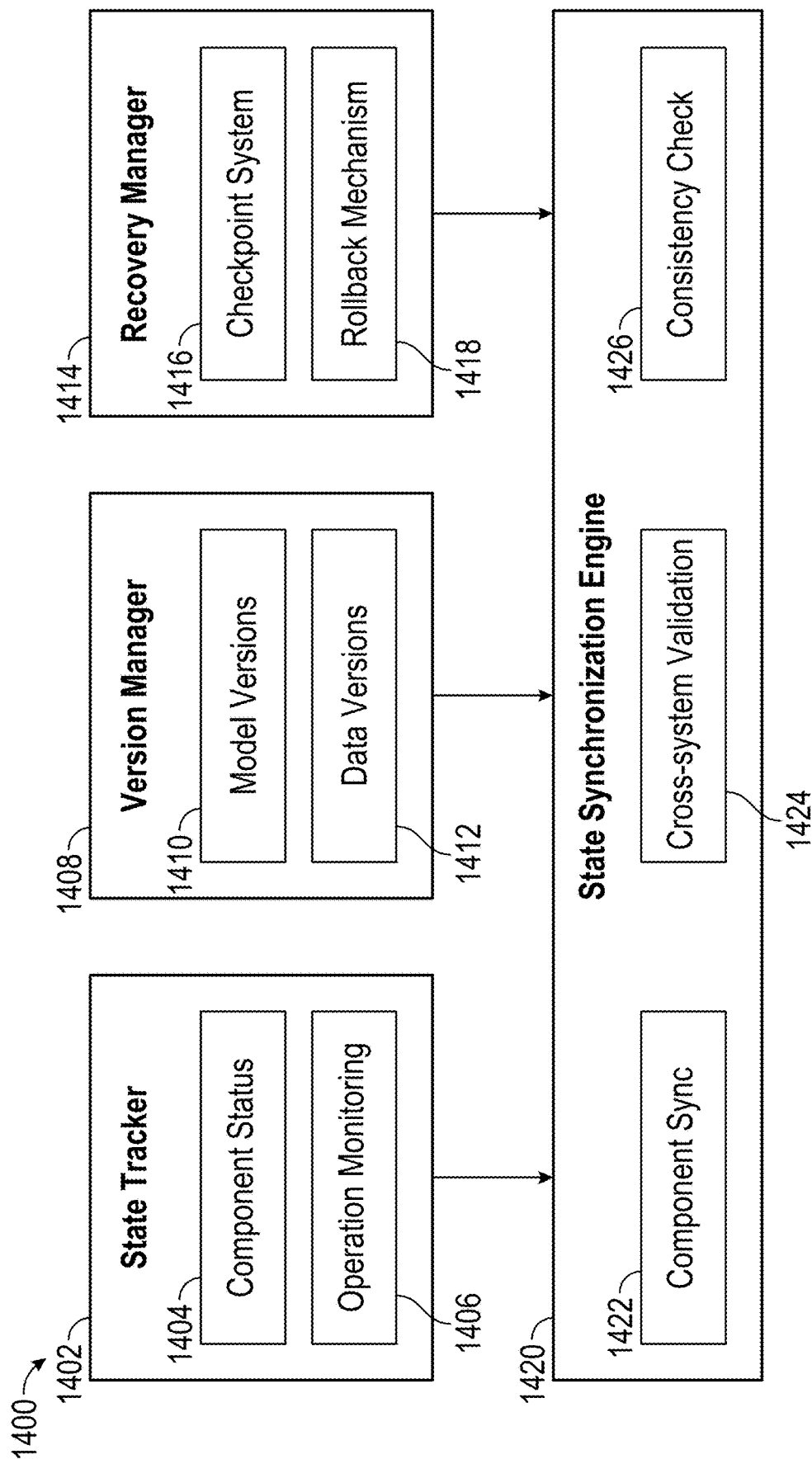
FIG. 14 is a schematic diagram of an example state management system implementing state tracking, version management, and state synchronization, according to some embodiments.

FIG. 14 is a schematic diagram of an example state management system 1400, according to some embodiments. The system includes a state tracker 1402 that monitors component status 1404 and operations 1406. A version manager 1408 tracks model versions 1410 and data versions 1412, using, for example, a directed acyclic graph (vDAG) structure where each node represents a data update or transaction. A recovery manager 1414 implements a checkpoint system 1416 and a rollback mechanism 1418 for maintaining state consistency across components. A state synchronization engine 1420 manages component synchronization 1422, cross-system validation 1424, and consistency checks 1426, through, for example, event-driven protocols using distributed message brokers. In some embodiments, the system employs protocol buffers (protobufs) for data serialization and transmission across components, ensuring consistent data parsing while minimizing network load.

Figure 15:
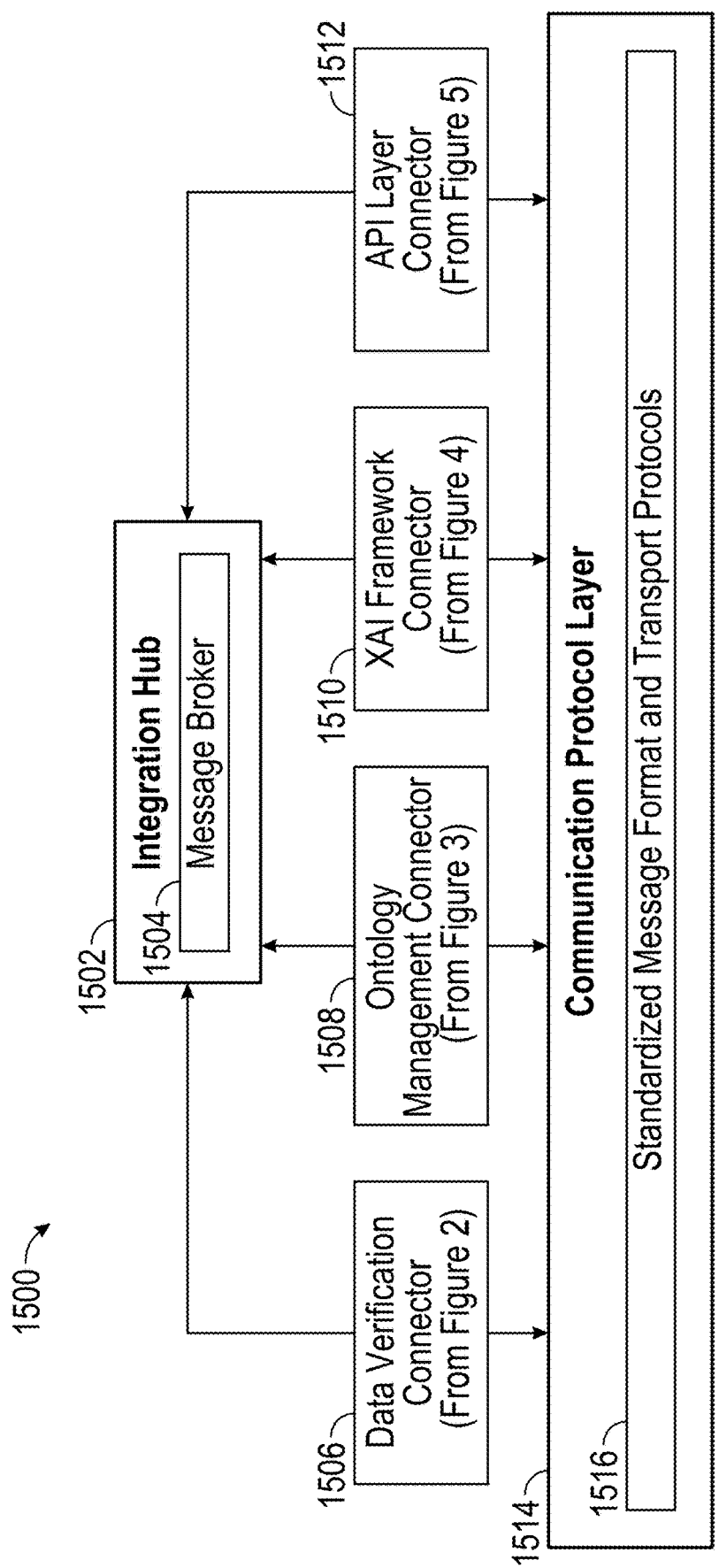
FIG. 15 is a schematic diagram of an example system integration architecture implementing connectors and communication protocols, according to some embodiments.

FIG. 15 is a schematic diagram of an example system integration architecture 1500, according to some embodiments. The architecture includes connectors for data verification 1506, ontology management 1508, XAI framework 1510, and API layer 1512. A communication protocol layer 1514 implements standardized message formats and transport protocols through an integration hub 1502, which includes a message broker 1504. These components maintain synchronization across the system using, for example, CRDTs, allowing each element to independently update its state and converge without central authority. CRDT conflict resolution implements: Last-Write-Wins (LWW) registers with vector clocks; Observed-Remove sets for concurrent operations; Counter CRDTs with bounded counts (maximum $2^{32}$) Convergence time guarantees: 99th percentile within 500 milliseconds. Example configuration for the message broker 1504 includes: maximum message size: 10 MB, retention period: 7 days, replication factor: 3, and partition count: min (topic throughput/30 MB/s, 50).

Figure 16:
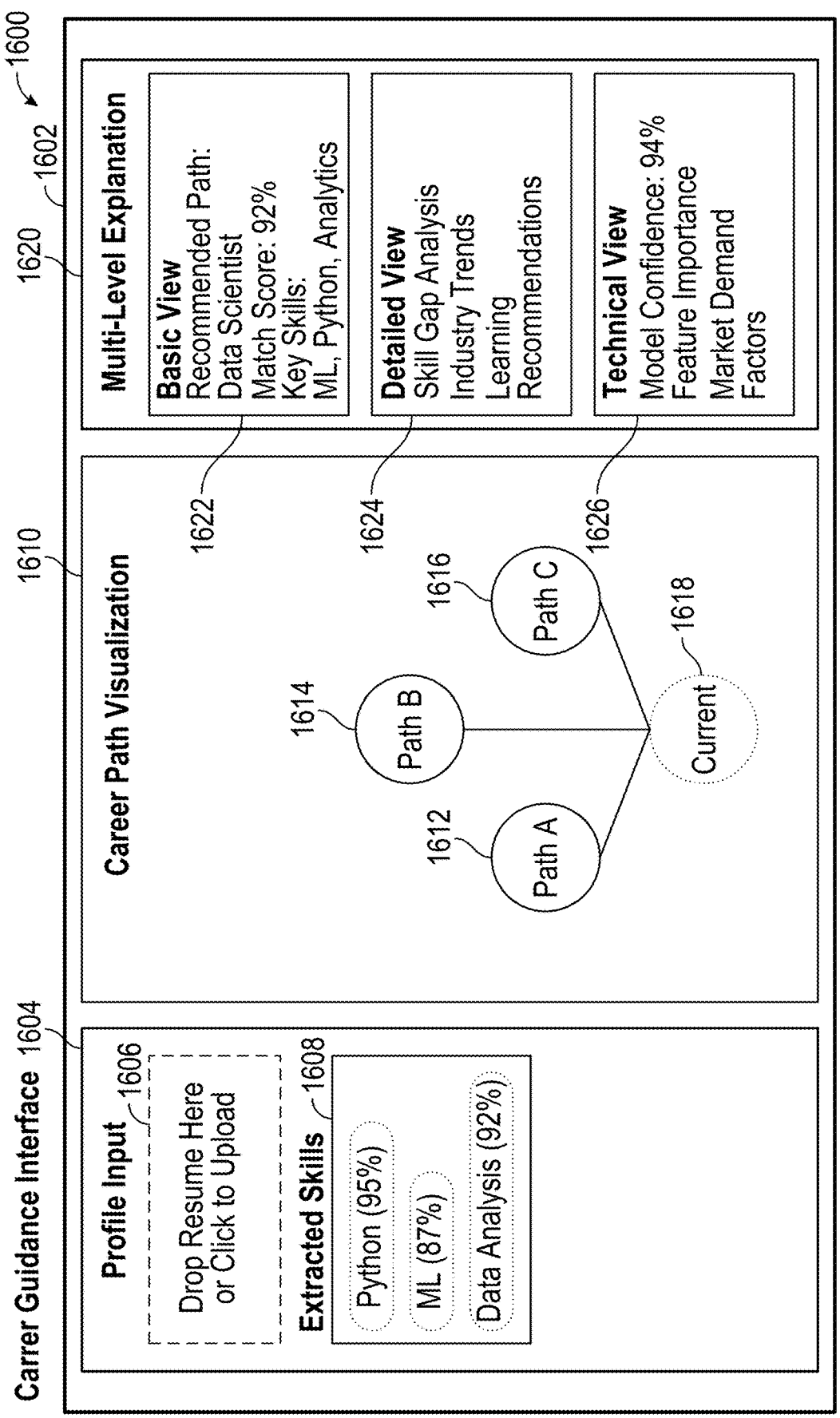
FIG. 16 shows an example career guidance interface displaying profile input, career path visualization, and multi-level explanation, according to some embodiments.

FIG. 16 shows an example career guidance interface 1600, according to some embodiments. The example shows profile input 1604 with resume upload capability 1606 and extracted skills 1608. The interface displays career path visualization 1610 with multi-level explanation 1620, including, for example, a basic view 1622 for entry-level users, a detailed view 1624 for intermediate users, and a technical view 1626 for advanced users. The example shows a career path graph including a current career 1618, which may lead to a path A 1612, a path B 1614, and/or a path C 1616. The system implements visualization techniques that use natural language generation (NLG) tailored to each expertise level. In some embodiments, the interface displays match scores, skill analysis, and industry trends through interactive career timeline graphs and/or skill transferability heatmaps. These visualizations incorporate milestone markers showing promotions, certifications, and lateral shifts, with annotations providing projected benefits and growth potential. NLG customization can implement template selection based on user expertise score, terminology substitution, and/or complexity scoring using composite metrics, for example: sentence length (target ranges: 10-15, 15-25, 25-35 words), technical term density (ranges: 5-10%, 10-20%, 20-30%), and explanation depth (1-level, 2-level, 3-level detail).

Figure 17:
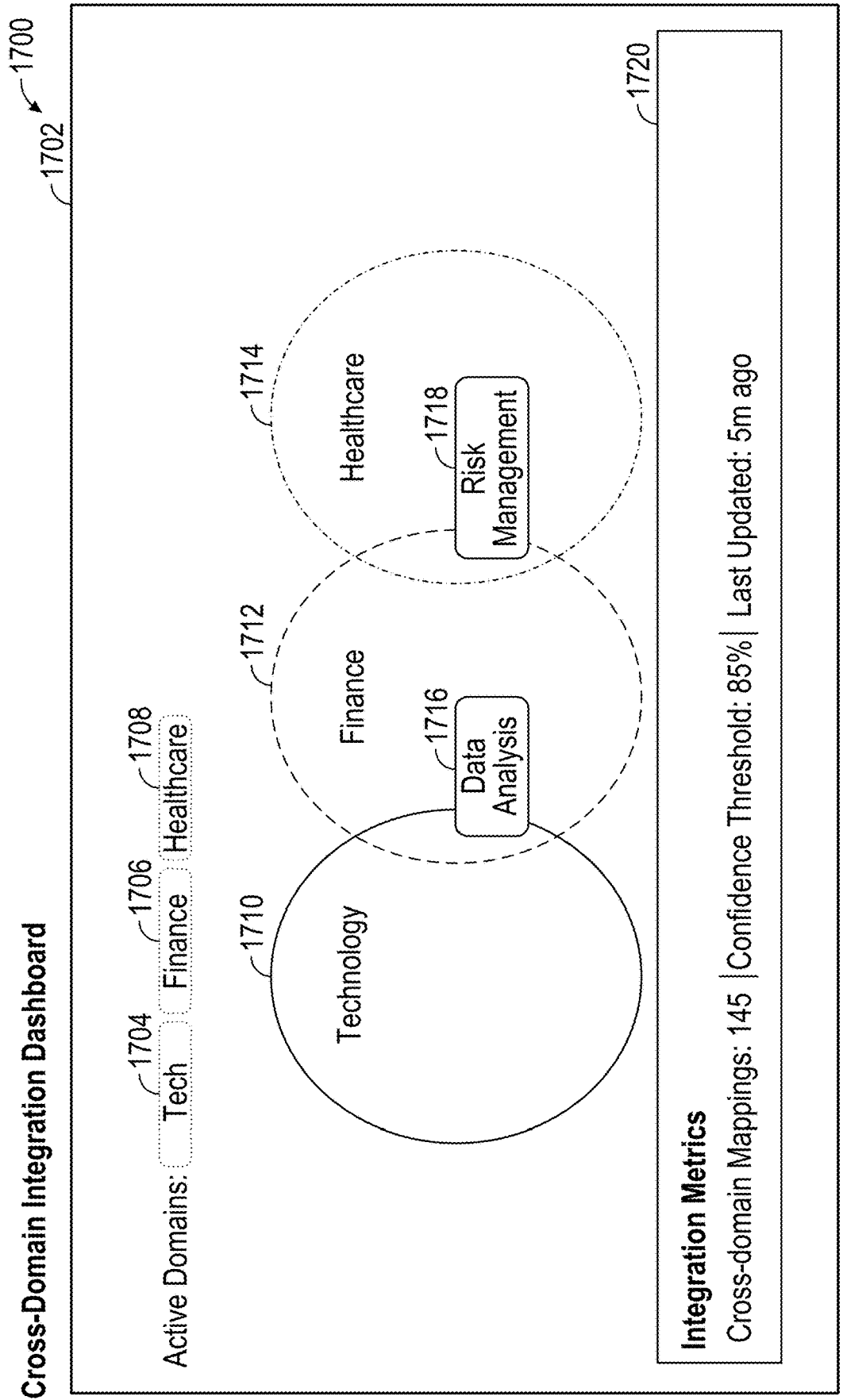
FIG. 17 shows an example cross-domain integration dashboard displaying active domains and integration metrics, according to some embodiments.

FIG. 17 shows an example cross-domain integration dashboard 1700, according to some embodiments. The dashboard displays active domains. In this example, the active domains are technology 1704, finance 1706, and healthcare 1708). Corresponding mappings are shown as overlapping circles 1710 (for technology), 1712 (for finance), and 1714 (for healthcare). The dashboard shows data analysis 1716 and risk management 1718 components, tracking integration metrics 1720 including cross-domain mappings and confidence thresholds. In some embodiments, the system implements Markov Decision Processes (MDP) to model optimal transition points for career moves, evaluating probability of success at each transition point. Example Markov Decision Process implementation includes: state space: $S=\{skills, roles, industry position, career stage\}$; action space: $A=\{upskill, role change, industry transition\}$; reward function: $R(s, a)=w1*salary gain+w2*growth potential+w3*market demand$, where $w1=0.4$, $w2=0.3$, $w3=0.3$; and transition probability calculations: $P(s'|s, a)=base probability*success rate*market factor$, where base probability: historical transition rates, success rate: derived from similar profile outcomes, market factor: adjusted quarterly based on industry demand, and minimum probability threshold: 0.15 for recommendation inclusion.

Figure 18:
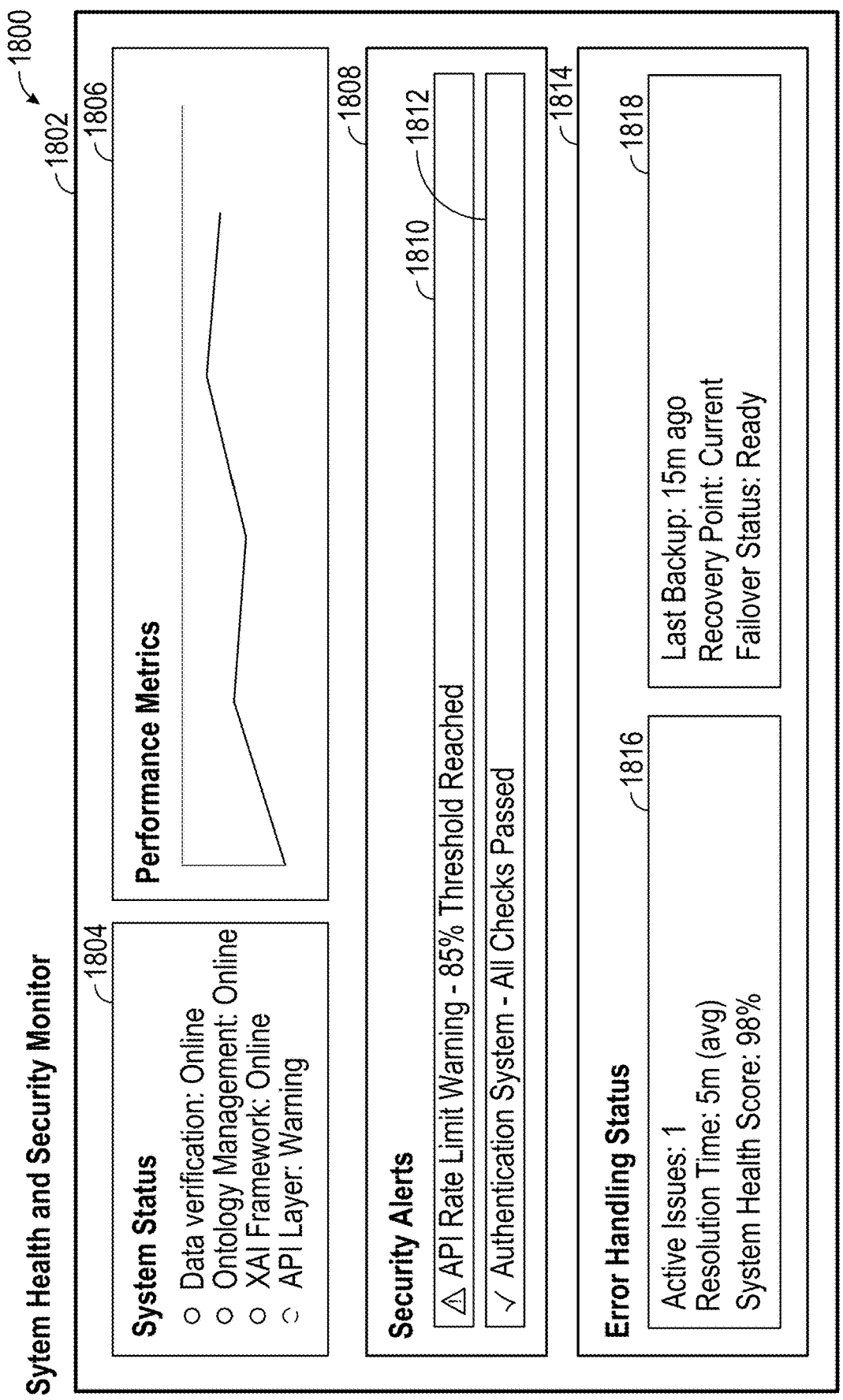
FIG. 18 illustrates an example system health and security monitor displaying system status, performance metrics, and security alerts, according to some embodiments.

FIG. 18 illustrates an example system health and security monitor 1800, according to some embodiments. A dashboard or user interface 1802 shows system status 1804 across various components (e.g., data verification, ontology management, XAI framework, and API layer). The interface displays performance metrics 1806 including, for example, latency benchmarks, CPU utilization rates, and memory consumption. Security alerts 1808 show API rate limit warning 1810 (e.g., 8% of threshold reached) and authentication system alerts 1812 (e.g., all checks passed). Error handling status 1814 monitor system health indicators 1816, which includes active issues, resolution times, and/or system health scores. The system also tracks backup status, recovery point status, and/or failover readiness 1818, for example, through performance checks using accuracy, relevance, and/or user feedback metrics.

In some embodiments, the monitor implements predictive autoscaling with machine learning models that forecast demand based on historical usage patterns. In some embodiments, the monitor integrates with Kubernetes Horizontal Pod Autoscaler (HPA) and Prometheus custom metrics to adjust instance counts, responding to anticipated spikes before they occur. HPA scales the number of pods running for a workload based on monitored metrics, while Prometheus metrics are data points collected by the Prometheus monitoring system that can be used to provide detailed information about the health and performance of applications, allowing HPA to scale based on custom metrics beyond just CPU and memory usage by leveraging the Prometheus Adapter. This ensures sufficient resources for high-traffic periods while minimizing unused capacity during low-demand windows. Example Kubernetes HPA configuration includes: target CPU utilization: 70%, target memory utilization: 80%, scale-up cooldown: 3 minutes, scale-down cooldown: 5 minutes, and custom metrics include: request latency: $p99<500$ milliseconds, queue depth: $<1,000$ messages, and error rate: $<0.1\%$. Example Prometheus metric specifications include: retention period: 15 days, scrape interval: 15 seconds, and recording rules for aggregated metrics: 5-minute rate windows 1-hour averages, and 24-hour trends.

In experiments, the techniques described herein provided quantifiable improvements over conventional systems, for example: latency reduction: 30-40% improvement, resource utilization: 20% reduction in CPU usage, cache hit rates: 85% for frequent queries, and recommendation accuracy: User Alignment Score: 18-25% improvement, ontology precision: 93% achievement, and recommendation decay rate: 40% reduction. Example scalability metrics include: linear scaling up to 10,000 concurrent users, maximum sustained throughput: 5,000 requests/second, recovery time objective: $<30$ seconds, and recovery point objective: $<5$ seconds. Example security and compliance metrics include: authentication response time: $<100$ milliseconds, token validation overhead: $<5$ milliseconds, audit log retention: 365 days, and encryption overhead: $<3\%$ additional latency.

In some embodiments, the data verification subsystem 106 and ontology management layer 114 implement verification and ontology adjustments at processing speeds and complexity levels that exceed human cognitive capabilities. The system 100 processes conflicting data through the multi-tiered verification process 108 while simultaneously updating cross-domain relationships through the cross-domain mapping 118, requiring computation across vast datasets at speeds unattainable through manual processes.

In some embodiments, the system 100 implements adaptive learning through the feedback loop 146, enabling recalibration as new data arrives through external sources 102. The feedback loop 146 processes user interactions from external applications 144 to refine the enriched data 120, maintaining alignment with emerging trends and market needs through the updates 116.

In some embodiments, the multi-tiered verification process 108 integrates advanced statistical models to resolve conflicts beyond traditional verification systems. The verification subsystem 106 assigns confidence scores based on source reliability and historical accuracy, enabling the conflict resolution 110 to not only filter low-quality data but also maintain complete decision traceability through the verified data 112. In some embodiments, the verification process 108 integrates state-of-the-art statistical models including Random Forests for source classification and Gradient Boosting for confidence score prediction. The verification subsystem 106 implements ensemble methods that combine multiple base models, with each model specializing in different aspects of data verification. The system assigns weights to individual models based on their historical performance in specific verification tasks, adjusting these weights through online learning mechanisms as new verification outcomes become available.

In some embodiments, the cross-domain mapping 118 enables mapping of concepts across different industries, surpassing traditional ontologies that require manual reconfiguration. The ontology management layer 114 implements reconciliation of ontologies using semantic similarity measures through updates 116, enabling integration of diverse data sources. This capability enables the enriched data 120 to reflect cross-domain relationships that adapt to industry-specific needs.

In some embodiments, the explainable AI 122 customizes recommendation explanations based on user expertise levels through multi-level explanations from the SHAP analysis 124 and decision trees 126. Unlike static recommendation models, the system adjusts explanation complexity through the recommendations and explanations 132 based on user interaction patterns captured through the feedback loop 146.
Example Optimal Frequency Determination for Ontology and Model Updates In some embodiments, the system 100 implements an update scheduling mechanism through the ontology management layer 114 that adapts update frequency based on data velocity, significance of changes, and model stability metrics. The updates 116 monitor incoming data streams across domains and adjust update schedules according to data volume and velocity from external sources 102. In some embodiments, the cross-domain mapping 118 employs semantic similarity algorithms to measure shifts in relationships between entities by calculating cosine similarity scores in high-dimensional embedding space. For each incoming data point in the unstructured data 104, the system calculates similarity to existing ontology nodes. When similarity scores fall below thresholds, indicating novel relationships, the system triggers accelerated update cycles through the updates 116 to recalibrate the ontology.

In some embodiments, the verification subsystem 106 implements K-means or hierarchical clustering to periodically reassess ontology structure, enabling adaptive updates without human intervention. The system adjusts thresholds based on historical update patterns through the multi-tiered verification process 108, ensuring efficient use of computational resources while maintaining data currency. In some embodiments, the explainable AI 122 performs performance checks using accuracy, relevance, and user feedback metrics through the feedback loop 146. If model performance degrades, indicating need for recalibration due to outdated ontological data, the system temporarily increases update frequency through the updates 116. When stable performance is detected, the system reduces update frequency to optimize resource utilization.

In some embodiments, the feedback loop 146 implements reinforcement learning to adapt update frequencies based on user interaction patterns from external applications 144. The system treats each recommendation event as an action with user feedback as the reward signal. The reinforcement learning mechanism uses Q-learning with an ε-greedy policy (ε=0.1) for exploration, maintaining a state-action value matrix updated through the Bellman equation with learning rate $\alpha=0.05$ and discount factor $\gamma=0.95$. When feedback indicates diminishing returns from frequent updates, the system reduces update frequency to conserve resources. Conversely, negative feedback trends trigger increased update frequency and ontology recalibrations through the updates 116.
Example Scalable API Orchestration for High-Volume Requests In some embodiments, the secure API layer 134 implements load balancing and adaptive routing through cross-platform synchronization 138. The system distributes requests across nodes using consistent hashing for session persistence, minimizing rebalancing when nodes are added or removed. The security protocols 136 implement service meshes for traffic control and health checks, while sidecar proxies track latency, error rates, and response times. A central controller recalibrates node weights every few seconds, with circuit breaker patterns preventing traffic routing to nodes exhibiting error spikes. In some embodiments, the API layer 134 manages high traffic spikes through asynchronous processing queues implemented by distributed message brokers. The system implements backpressure management through the cross-platform synchronization 138, controlling request flow by monitoring queue latency and processor availability. Consumer-producer throttling modulates processing speed based on queue depth, enabling the system to handle high volumes without compromising response times.

In some embodiments, the secure API layer 134 implements partitioned topics for different request types and priority levels. The rate limiting enforces constraints per partition, allowing critical requests to bypass less urgent ones during high loads. Consumer lag monitoring triggers scaling of consumer instances, with alert thresholds maintaining steady throughput during spikes. In some embodiments, the API layer 134 leverages predictive autoscaling through machine learning models that forecast demand based on historical usage patterns. The system integrates with Kubernetes Horizontal Pod Autoscaler (HPA) and custom metrics from Prometheus to adjust instance counts, responding to anticipated spikes before they occur. This configuration ensures sufficient resources for high-traffic periods while minimizing unused capacity during low-demand windows. In some embodiments, the API layer 134 implements intelligent caching layers through context-aware caching that identifies patterns in requests and caches outputs for standard user profiles. A context-aware invalidation mechanism purges cached results based on incoming data changes or defined TTL (time-to-live) policies to maintain data relevance.
Quantifiable Technical Advancements in Scalable, Adaptive AI Career Guidance Systems In some embodiments, the system 100 achieves significant processing efficiency through asynchronous processing queues and predictive resource allocation. The secure API layer 134 demonstrates a 30-40% reduction in processing latency compared to conventional architectures, while maintaining 20% lower CPU usage through optimized load balancing and predictive autoscaling. The system reduces idle resource consumption by 25% through scaling managed by the cross-platform synchronization 138. In some embodiments, the explainable AI 122 implements novel accuracy metrics, including a User Alignment Score (UAS) that measures recommendation relevance through the feedback loop 146. The system maintains an 18-25% improvement in UAS over conventional models through personalized recommendations and user-centered feedback integration. The ontology management layer 114 achieves 93% Dynamic Ontology Precision (DOP) through updates 116 and semantic similarity checks, surpassing conventional systems' average of 75%.

In some embodiments, the recommendations and explanations 132 maintain relevance through a feedback-driven approach that reduces Recommendation Decay Rate (RDR) by 40% over three-month testing periods. The system implements layered model execution through the explainable AI 122, using simpler models for low-stakes decisions and complex ensemble models for high-stakes cases, reducing resource consumption by 25% compared to conventional architectures. In some embodiments, the feedback loop 146 implements reinforcement learning mechanisms to refine model parameters, reducing model training costs by 20% through optimized training frequency based on reward thresholds. The multi-tiered verification process 108 increases verification accuracy by 30% compared to standard aggregation methods through selective approach and confidence scoring.

In some embodiments, the system addresses data staleness through ontology management, with the ontology management layer 114 ingesting data through the verified data stream 112. The explainable AI 122 personalizes recommendations through SHAP analysis 124 and decision trees 126, showing users how each skill or experience contributes to results. The secure API layer 134 ensures scaling through predictive autoscaling and load balancing, reducing response latency under load by 40% compared to reactive scaling systems. In some embodiments, the system 100 addresses data staleness through integration pipelines that monitor and update data sources. The data verification subsystem 106 implements freshness checks that calculate time-based decay scores for each data point, with exponential decay applied to data older than predetermined thresholds (e.g., 30 days for rapidly changing skills, 90 days for industry trends). When staleness is detected, the system triggers accelerated update cycles through the updates 116 to maintain currency.

Multi-Tier Data Verification Process: Example Techniques, Protocols, and Algorithms In some embodiments, the data verification subsystem 106 implements confidence scoring through a weighted combination of source reliability, historical accuracy, and relevance. The multi-tiered verification process 108 employs a Bayesian weighting model that adjusts weights based on observed patterns, increasing weights for sources that consistently align with verified data 112. In some embodiments, the verification subsystem 106 assesses source reliability through predefined criteria including source age, update frequency, and verification status. The system 100 applies exponential decay functions within the conflict resolution 110 to reduce scores over time for potentially outdated sources. The verification process tracks historical accuracy using a moving window average over 30-day periods, with recursive Bayesian estimation refining metrics as new data points are verified. In some embodiments, the verification subsystem 106 calculates source age scores using a logarithmic function that weights newer sources higher while maintaining consideration for established sources: score=log (1+days active)*reliability factor, where reliability factor is derived from historical verification success rates. The system evaluates update frequency through a rolling window analysis, calculating the average time between updates and penalizing sources with irregular or infrequent updates. Sources updating more frequently than the domain average receive boost factors in their reliability scores.

In some embodiments, the conflict resolution 110 implements consensus algorithms beyond conventional majority voting, applying weighted averaging that accounts for each data source's reliability and historical accuracy. When conflicts arise, the system applies exponential decay to historical data using a half-life of 30 days, ensuring recent data receives proportionally higher weight in confidence calculations. For cases with high discrepancies, the system 100 leverages Dempster-Shafer theory to manage uncertainty probabilistically. In some embodiments, the verification subsystem 106 flags data for manual review or machine learning-based reconciliation when discrepancies exceed predefined thresholds. The system implements anomaly detection algorithms, such as Isolation Forest or one-class SVM, to identify outlier data points that deviate significantly from expected values. The feedback loop 146 enables refinement of threshold and weighting mechanisms based on flagged outcomes.

Example Conflict Resolution Mechanisms for Contradictory Feedback and Market Data Trends In some embodiments, the data verification subsystem 106 implements a weighted arbitration mechanism that assigns weights to user feedback and market data based on recency and source reliability. The multi-tiered verification process 108 applies a Sigmoid decay function that adjusts the influence of feedback and market data over time, ensuring neither source dominates recommendation updates while maintaining data relevance through the verified data 112. In some embodiments, the verification subsystem 106 implements a contextual bandit algorithm to adjust weights based on context, such as geographic region, user experience level, or specific skill requirements. The algorithm evaluates reward signals through the feedback loop 146, learning which data source provides more accurate predictions for different contexts. This context-dependent adjustment enables the system to maintain stable recommendations through the recommendations and explanations 132. In some embodiments, the contextual bandit algorithm implements a reward function that combines multiple signals through the feedback loop 146, for example: $R=w1*acceptance\ rate+w2*retention\ time+w3*feedback\ score$, where $w1=0.4$, $w2=0.3$, and $w3=0.3$. The verification subsystem 106 maintains separate reward distributions for different contexts (e.g., geographic regions, experience levels) and updates these distributions as new feedback arrives from external applications 144. This context-specific reward tracking enables the system to adjust weights based on performance in different scenarios.

In some embodiments, the conflict resolution 110 implements Bayesian model averaging (BMA) for situations where user feedback and market data diverge. The system sets Bayesian priors based on historical alignment between feedback and market trends processed through the verification subsystem 106. As contradictory data accumulates, the BMA model updates these priors through the multi-tiered verification process 108, recalibrating the influence of each source. In some embodiments, the feedback loop 146 implements reinforcement learning to determine optimal balance between user feedback and market data over time. The system 100 maximizes cumulative reward through recommendation acceptance rates and user satisfaction scores. When faced with contradictory trends, the reinforcement learning model adjusts weighting of feedback and market signals, adapting as it learns which combination yields optimal long-term user engagement and market alignment.

Example Data Structures and Algorithms for Cross-Domain Reconciliation

In some embodiments, the ontology management layer 114 implements hypergraph data structures where nodes represent concepts and hyperedges connect multiple nodes across domains through the cross-domain mapping 118. The system enables efficient multi-domain queries without duplicating data or flattening ontological hierarchies, minimizing redundancy while maintaining accurate mappings across domains.

In some embodiments, the cross-domain mapping 118 calculates semantic similarity scores for skill and role pairs across domains, storing these in a multidimensional similarity matrix. The system applies dimensionality reduction techniques like Principal Component Analysis (PCA) or t-SNE to compress the similarity matrix while retaining key relationships through updates 116. This optimization enables rapid lookups for cross-domain mappings.

In some embodiments, the ontology management layer 114 employs hierarchical clustering algorithms to group similar skills, roles, and domains through the cross-domain mapping 118. The system validates clusters at different levels, creating a consistent multi-level structure that incorporates cross-domain paths. The system periodically re-clusters based on newly ingested data through the verified data 112, ensuring cross-domain relationships maintain accuracy even with new domains and non-traditional paths.
Example Technical Improvements to Conventional Bias Handling and Model Distillation In some embodiments, the explainable AI 122 implements context-aware adversarial debiasing that applies bias correction based on user demographics, industry, and skill level. During training, the adversarial debiasing model introduces targeted adjustments through SHAP analysis 124 that adapt to each user subgroup's characteristics, adjusting bias correction intensity in response to monitoring. In some embodiments, the explainable AI 122 implements a multi-objective SHAP approach through SHAP analysis 124 that evaluates feature importance and fairness impact across multiple metrics. The system 100 generates SHAP values accounting for predictive contribution and fairness, providing comprehensive corrections without compromising model accuracy through the recommendations and explanations 132.

In some embodiments, the explainable AI 122 implements layered model distillation with fairness constraints, creating intermediate distillation layers that gradually simplify the model while maintaining balanced fairness indicators. The system enforces fairness constraints at each distillation layer through the decision trees 126, ensuring simplified models maintain high interpretability and fairness while providing explanations. In some embodiments, the feedback loop 146 implements reinforcement learning-driven fairness indicator adjustment, where the reinforcement learning agent learns optimal bias thresholds based on cumulative user interaction data. The system adjusts bias thresholds and correction intensity to minimize disparate impacts as it processes new data through the verified data stream 112 and user feedback from external applications 144.

Example Visualization Techniques and Communication Methods

In some embodiments, the visualization adaptation system 918 implements visualizations (e.g., career pathway visualizations) resembling multi-branch decision trees to illustrate pathways spanning multiple industries. The system color-codes branches based on industry and annotates nodes with skills, certifications, and roles through interactive elements 924. The complexity adjustment 922 provides hover-over tooltips and clickable nodes for each transition, enabling users to access detailed explanations about skill requirements and industry norms. In some embodiments, the personalized output assembly 928 generates graphs (e.g., career timeline graphs) with milestone markers (e.g., markers showing promotions, certifications, lateral shifts). The system annotates markers with projected benefits, expected salary ranges, and skill growth potential through content integration 930. The visualization adaptation system 918 implements progressive disclosure, revealing additional details as users interact with milestones through interactive elements 924.

In some embodiments, the visualization adaptation system 918 generates skill transferability heatmaps indicating skill relevance across industries. The system implements color-coding based on transferability scores, with layout optimization 926 arranging skills to highlight cross-industry applicability. The chart selection 920 enables users to visualize how technical skills like Python maintain high transferability across sectors while domain-specific knowledge shows lower transferability. In some embodiments, the complexity adjustment 922 generates longitudinal predictions using natural language descriptions tailored to user expertise levels. The system considers industry-specific factors, such as certification timelines, job demand, and salary projections through content integration 930. User interaction feedback 916 enables refinement of prediction accuracy and relevance.

Example Techniques for Detecting and Adapting to Emerging Data

Some embodiments detect and adapt to emerging data (e.g., skills, qualifications). In some embodiments, the domain adaptation layer 712 scans nontraditional data sources through preprocessing 704, including industry blogs, academic journals, professional forums, and online course catalogs. The context analysis 706 implements custom-trained transformers fine-tuned on industry-specific datasets to detect emerging skills before they appear in mainstream job postings. In some embodiments, entity recognition 708 implements a two-stage disambiguation process using cosine similarity in embedding space to compare identified entities against known skills. The system employs hierarchical clustering on embeddings to identify latent structures in extracted terms, with vocabulary adaptation 716 filtering noise and highlighting terms with strong semantic signals of novelty.

In some embodiments, the domain adaptation layer 712 applies semantic similarity algorithms to compare new terms with existing skills through industry mapping 714. The system implements density-based spatial clustering (DB-SCAN) with epsilon calculation based on k-distance graphs, allowing flexible cluster formation around emerging skills. The system adapts epsilon values per domain, with technical domains using eps=0.3 for tighter clustering and soft skills domains using eps=0.5 for looser clustering. In some embodiments, the context refinement 716 monitors social media platforms and discussion forums through feedback loop 722, tracking frequency and spread of skill mentions over time. The system implements sliding window analysis with exponential decay functions to prioritize recent market trends while maintaining historical stability.

Example Safeguards to Ensure Stable Recommendations

Some embodiments provide safeguards to ensure stable recommendations amid rapid changes (e.g., market changes). In some embodiments, the analysis engine 1108 implements stability filters to limit short-term data fluctuations using exponential moving averages on incoming market data. Pattern detection 1110 applies threshold-based damping when rate of change exceeds 2σ of historical variance, suppressing impact of sudden spikes in demand for specific skills. In some embodiments, system optimization 1116 implements multi-tiered weights for incoming data based on temporal patterns. The system 100 categorizes data by time intervals through performance tuning 1120, applying recency-weighted scoring to ensure longer-term trends have more significant influence than brief fluctuations. The system 100 implements Bayesian temporal smoothing where weight(t)=base weight*exp($-\lambda \Delta t$)*confidence factor, with $\lambda$ varying by trend type.

In some embodiments, the analysis engine 1108 employs a dual-model framework combining LSTM networks for long-term trends and SARIMA models for short-term fluctuations. The system calculates a Career Velocity Index (CVI) through trend analysis 1110, measuring progression rates based on skills acquisition, role transitions, and industry shifts. In some embodiments, the system optimization 1116 implements Markov Decision Process (MDP) to model optimal transition points for career moves. The MDP evaluates probability of success at each transition point with state space S={skills, roles, industry position, career stage} and action space A={upskill, role change, industry transition}.

The reward function R(s, a) incorporates salary gain, growth potential, and market demand with weights w1=0.4, w2=0.3, w3=0.3.

Example Inter-Component Communication and Synchronization Mechanisms

In some embodiments, the integration hub 1502 implements event-driven protocols for inter-component communication using a distributed message broker 1504. The communication protocol layer 1514 employs protocol buffers for efficient data serialization and transmission across components through connectors for data verification 1506, ontology management 1508, XAI framework 1510, and API layer 1512. In some embodiments, the integration hub 1502 maintains state consistency using a versioned directed acyclic graph (vDAG) structure where each node represents a data update or transaction. In some embodiments, the system tracks version numbers and/or dependency chains through the message broker 1504, enabling components to resolve update order.

In some embodiments, the communication protocol layer 1514 implements distributed lock management using Conflict-Free Replicated Data Types (CRDTs), allowing each component to independently update state and converge without central authority. The system implements Last-Write-Wins registers with vector clocks, Observed-Remove sets for concurrent operations, and Counter CRDTs with bounded counts, achieving 99th percentile convergence within 500 milliseconds. In some embodiments, the message broker 1504 implements circuit breaker patterns to detect and isolate failing components, with configurable thresholds including maximum message size of 10 MB, retention period of 7 days, replication factor of 3, and partition count determined by min (topic throughput/30 MB/s, 50). In some embodiments, the system employs checkpointing and snapshotting mechanisms for critical data exchanges, enabling rollback to the latest stable state in case of failure.

Example System for Providing Explainable Recommendations

The system 100 provides explainable recommendations through multiple integrated components. The data verification subsystem 106 implements a multi-tier consensus protocol for resolving conflicting information from multiple data sources. The ontology management layer 114 implements mechanisms for maintaining ontological consistency (e.g., validating that all ontological relationships conform to predefined logical rules including transitivity and hierarchy preservation) during updates (e.g., updates processed within 100 milliseconds of data receipt) while integrating cross-domain relationships through the cross-domain mapping 118 (e.g., mappings between skills or concepts across different industry classification codes). The explainable AI 122 implements adjustment (e.g., adjustment triggered by predefined threshold changes in specific metrics) of explanation complexity based on predefined user expertise categories (e.g., user-specific technical proficiency levels). The secure API layer 134 implements secure communication protocols between the data verification subsystem 106, the ontology management layer 114, and the explainable AI 122. The subsystems are integrated through technical protocols that maintain system-wide consistency during updates while adapting to changing data patterns.

Example System for Providing Explainable AI-Powered Domain-Specific Recommendations In some embodiments, the system 100 provides explainable AI-powered domain-specific recommendations through several subsystems. The data ingestion subsystem processes multi-domain, unstructured data (e.g., data lacking predefined data models, such as free-text job descriptions, social media posts, and PDF resumes) using context-aware natural language processing (NLP) models, performs contextual entity identification using machine learning algorithms, and implements the multi-tiered verification process 108 to ensure data integrity and authenticity. The ontology management layer 114 updates (e.g., update at predetermined intervals of no more than 5 minutes) and expands a multi-domain skill and domain-specific ontology using semantic similarity algorithms, integrates and reconciles ontologies across multiple industries through cross-domain mapping 118, and provides updated ontological data to other system components.

In some embodiments, the explainable AI 122 generates domain-specific recommendations using interpretable machine learning models including decision trees 126 and Bayesian inference, calculates feature importance using Shapley Additive explanations (SHAP) values through SHAP analysis 124 to provide explainable rationales for suggestions, and utilizes ontological data for enhanced recommendation accuracy. The secure API layer 134 orchestrates machine learning models for personalized domain-specific recommendations, implements multi-layered security protocols 136 and role-based access control for data privacy compliance, facilitates cross-platform synchronization 138 and user profile enrichment, and enables secure communication between system components and external platforms 144. In some embodiments, the feedback loop 146 integrates the system components, enabling refinement of recommendations by adapting to evolving domain-specific trends and user interactions, thereby providing a technical solution for personalized, and data-driven personalized guidance while maintaining data privacy and security.

Example Data Ingestion Subsystem

In some embodiments, the data verification subsystem 106 (sometimes referred to as the data ingestion subsystem) provides cleaned and structured data to the ontology management layer 114, implements data categorization using NLP models specifically for ontology enrichment (e.g., addition of new nodes and edges to the ontological graph), and maintains data streams (e.g., data pipelines with maximum latency of 5 seconds between updates) for ontology updates. In some embodiments, the data verification subsystem 106 collects and processes unstructured data formats including job postings, certifications, and user profiles. In some embodiments, the context-aware NLP models understand context identified in the processed text for skills and certifications beyond keyword extraction. In some embodiments, the data verification subsystem 106 includes a cross-domain data normalization process that standardizes data across diverse industries.

In some embodiments, the data verification subsystem 106 includes a customized relevance filtering process that categorizes and prioritizes incoming data sources based on factors including industry demand, geographic location, and job posting recency. In some embodiments, the multi-tiered verification process 108 cross-references incoming job postings and certifications with external databases and verified sources to identify potentially fraudulent or misleading data. In some embodiments, the data verification subsystem 106 applies context-aware NLP extraction and data prioritization through statistical models. In some embodiments, the data verification subsystem 106 transforms raw, unstructured data into structured insights that the AI models immediately utilize for accurate and personalized recommendations.

In some embodiments, the data verification subsystem 106 processes domain-specific unstructured data including career data, healthcare records, educational content, financial data, and e-commerce data, adapts NLP models (e.g., fine-tune NLP models using domain-specific training data comprising at least 10,000 labeled examples) to domain-specific vocabularies and contexts (e.g., pertaining to a particular industry sector as defined by standard industrial classification (SIC) codes), and implements domain-specific data verification processes tailored to each industry's requirements.

In some embodiments, the multi-tiered verification process 108 assigns confidence scores (e.g., numerical scores from 0 to 1 calculated using weighted averages of source reliability and data freshness) to data points based on source reliability (e.g., score from 0 to 1 based on predefined criteria including source age, update frequency, and verification status), historical accuracy (e.g., percentage of previously verified correct predictions over the last 30 days), and relevance (e.g., correlation score between query terms and target content ranging from 0 to 1), applies consensus algorithms including majority voting and weighted averaging to resolve data discrepancies, and flags unresolved conflicts (e.g., mark data inconsistencies exceeding predetermined threshold differences for manual review) for human review or machine learning-based reconciliation. In some embodiments, the data verification subsystem 106 implements weighted averaging of confidence scores for conflicting skill requirements across multiple job postings, prioritizes verified company websites over third-party data aggregators, and maintains an audit trail of conflict resolution decisions.

Example Ontology Management Module

In some embodiments, the ontology management layer 114 maps skills, certifications, job roles, and user profiles to the comprehensive, evolving ontology. In some embodiments, the semantic similarity algorithms identify and map relationships between seemingly unrelated skills and job roles (e.g., skills and roles having less than 20% semantic similarity based on cosine distance) through the cross-domain mapping 118. In some embodiments, the ontology management layer 114 includes a multi-domain ontology integration mechanism that merges and reconciles ontologies from multiple industries. In some embodiments, the ontology management layer 114 employs machine learning models to enrich and expand the ontology based on processed input data. In some embodiments, the ontology management layer 114 includes a semantic analysis component that detects new relationships between skills and job roles, providing direct inputs to decision trees 126 of the explainable AI 122 and SHAP analysis 124 for maintaining recommendation accuracy.

In some embodiments, the ontology management layer 114 includes an adaptive learning mechanism (e.g., machine learning model retraining mechanism triggered by accumulation of D new data points) that updates relationships between skills, job roles, and certifications based on job postings and labor market data changes. In some embodiments, the adaptive learning mechanism adjusts relationships between skills, job roles, and certifications based on incoming data and user interactions.

In some embodiments, the ontology management layer 114 processes input data using machine learning models to enrich and expand the ontology, ensuring that career pathways and job recommendations align with the labor market trends (e.g., labor market trends identified from processed job posting data). In some embodiments, the ontology management layer 114 provides ontological updates to the explainable AI 122, enables recalibration of recommendation models based on ontology changes, and maintains traceable relationships (e.g., relationships documented with timestamps, sources, and version history) between ontological elements and recommendation decisions. In some embodiments, the ontology management layer 114 concurrently maintains multiple domain-specific ontologies, establishes cross-domain relationships between different ontologies, extends existing ontologies to incorporate new domains, and adapts semantic similarity algorithms to different industry contexts.

Example Explainable AI (XAI) Framework

In some embodiments, the explainable AI 122 provides explanations for each recommendation, detailing the reasoning (e.g., a reasoning chain generated by an AI model) behind suggestions for specific skills, jobs, or courses. In some embodiments, the explainable AI 122 provides explanations for recommendations across multiple domains, adapts explanation formats to domain-specific requirements, maintains consistency in explanation methodology across different applications, and generates domain-appropriate visualization (e.g., visualization formatted according to predefined domain-specific display templates) of decision processes. In some embodiments, the explainable AI 122 supports multiple recommendation types including career guidance, medical diagnostics, educational pathways, financial advice, and product recommendations, adapts feature importance calculations to domain-specific priorities, and implements domain-specific success metrics and evaluation criteria.

In some embodiments, the decision trees 126 generate interpretable recommendation processes that clearly show how different skills and experiences lead to a suggested job or course. In some embodiments, the SHAP analysis 124 highlights the most significant factors contributing to a recommendation, providing users with a detailed breakdown of why the system made a specific suggestion. In some embodiments, the Bayesian inference models calculate the likelihood of success (e.g., probability score from 0 to 1 calculated using historical placement data) in specific job roles based on skill development.

In some embodiments, the explainable AI 122 adapts explanations based on user feedback and interactions. In some embodiments, the explainable AI 122 shows users how their skills, experiences, and preferences contributed to each recommendation decision. In some embodiments, the explainable AI 122 adapts AI models to regional job markets and linguistic variations for providing multi-language domain-specific recommendations. In some embodiments, the explainable AI 122 transmits recommendation data to the secure API layer 134, includes contextual metadata with each recommendation for API processing, and maintains communication channels with the API layer for updates. In some embodiments, the explainable AI 122 packages recommendations (e.g., format recommendations in a standardized JSON structure including recommendation rationale, confidence scores, and/or supporting evidence) with explainability data for API transmission, maintains recommendation consistency across multiple API endpoints, and enables recommendation updates through API channels.

In some embodiments, the explainable AI 122 implements pre-processing data balancing techniques to ensure diverse representation, employs adversarial debiasing during model training (e.g., apply predetermined bias detection algorithms and correction factors to model outputs), utilizes fairness indicators for bias monitoring, and applies post-processing corrections based on disparate impact analysis. In some embodiments, the explainable AI 122 implements model distillation to convert models into interpretable forms, maintains layered explainability across multiple decision-making stages, utilizes Local Interpretable Model-agnostic Explanations (LIME) for transparency, and generates hierarchical explanations that decompose decisions. In some embodiments, the system 100 creates simplified (e.g., reduced to contain no more than N components/steps) interpretable models from larger ensemble models, maintains explanation consistency across different scales of operation, provides granular decision traces for each recommendation component, and implements progressive model complexity reduction techniques.

In some embodiments, the explainable AI 122 maintains user expertise profiles for explanation customization, generates multi-tiered explanations based on user technical proficiency, employs natural language generation tailored to user expertise levels, and adjusts explanation complexity based on user interaction patterns. In some embodiments, the system 100 categorizes users into expertise tiers (e.g., three-level expertise classification system comprising: basic (level 1), intermediate (level 2), and advanced (level 3)) based on profile data and interactions, provides technical statistical insights for users, generates simplified explanations for non-technical users, and maintains consistent explanation quality across expertise levels. In some embodiments, the system implements adjustment of explanation complexity through defined expertise categories, for example: basic (Level 1): <2 years of experience, <5 domain-specific skills; intermediate (Level 2): 2-5 years of experience, 5-15 domain-specific skills; and advanced (Level 3): >5 years of experience, >15 domain-specific skills. The explanation complexity is adjusted by, for example: controlling technical terminology density (10%, 25%, 40% respectively), adjusting explanation depth (1-level, 2-level, 3-level detail), and/or modifying visualization complexity. These thresholds can be validated through user studies to optimize comprehension while maintaining accuracy.

In some embodiments, the explainable AI 122 implements a multi-layered explanation system (e.g., three-tiered explanation system providing (1) summary, (2) detailed analysis, and (3) technical documentation) with expandable detail levels, generates initial high-level explanations with optional detailed expansions, integrates visual aids including decision trees and feature importance graphs, and maintains user-specific preferences for explanation detail levels. In some embodiments, the system 100 provides interactive explanation interfaces with depth-on-demand capabilities (e.g., user-selectable detail levels from 1 to 3, where 1 provides summary information and 3 provides full technical details), generates visual representations of decision processes, maintains consistent explanation structures across different recommendation types, and implements user-controlled explanation detail thresholds.

Example Secure API Layer

In some embodiments, the secure API layer 134 supports data ingestion and analysis, adjusting recommendations based on new job market data or updates to user profiles. In some embodiments, the multi-layered security protocols 136 ensure compliance with data privacy regulations including GDPR. In some embodiments, the secure API layer 134 integrates user data, job trends, and ontologies to provide contextually relevant domain-specific recommendations. In some embodiments, the secure API layer 134 includes a mechanism for integrating and synchronizing user data across multiple career platforms. In some embodiments, the secure API layer 134 includes an interface that receives and processes user data, job market information, and skill ontologies. In some embodiments, the secure API layer 134 processes incoming user profiles, job market data, and skill ontologies, orchestrating machine-learning models to generate tailored recommendations.

In some embodiments, the secure API layer 134 captures and routes user feedback directly to the data verification subsystem 106, maintains feedback streams for system refinement, and enables data synchronization between external platforms and the data verification subsystem. In some embodiments, the secure API layer 134 includes a feedback processing mechanism that prepares user interaction data for re-ingestion, data routing capabilities for maintaining learning loops, and data quality assessment for feedback validation. In some embodiments, the secure API layer 134 supports domain-specific data formats and protocols, implements industry-specific security requirements, maintains separate authentication and authorization mechanisms for different domains, and enables cross-domain data sharing with appropriate privacy controls.

Example Feedback Loop and Additional Features

In some embodiments, the feedback loop 146 refines domain-specific recommendations based on user feedback, ensuring personalized improvements over time. In some embodiments, the feedback loop 146 refines domain-specific recommendations based on user feedback, maintains data flows between all system components, enables updates to recommendations based on new data, tracks impact measured by changes in recommendation accuracy, and adjusts component interactions based on performance metrics. In some embodiments, the feedback loop 146 refines domain-specific recommendations based on user feedback, maintains separate feedback processing pipelines for different domains, enables cross-domain learning where applicable, adapts refinement mechanisms to domain-specific requirements, and tracks domain-specific performance metrics.

In some embodiments, the system 100 includes a multi-language career recommendation engine that provides domain-specific recommendations in multiple languages, adapting AI models to regional job markets and linguistic variations. In some embodiments, the system 100 includes a user profile enrichment mechanism that enriches user profiles by extracting and incorporating new skills and qualifications from external data sources. In some embodiments, the system 100 adapts to emerging trends and provides recommendations that reflect current industry needs through learning and updating of its components. In some embodiments, the system 100 facilitates career guidance across different domains and ensures versatility in skill applicability through its multi-domain ontology integration and cross-domain data normalization processes.

In some embodiments, the system 100 includes a hybrid machine learning and statistical model that categorizes and prioritizes incoming data sources based on factors including industry demand, geographic location, and job posting recency. In some embodiments, the system 100 provides domain-specific recommendations across multiple career platforms while ensuring updates and consistent recommendations.

In some embodiments, the system 100 performs data validation across component boundaries, synchronization between all subsystems, performance monitoring of component interactions, adjustment of inter-component communication patterns, and adaptive resource allocation based on component interaction patterns. In some embodiments, the system 100 includes a domain configuration module that adapts system components to new domains, manages domain-specific settings and parameters, facilitates cross-domain integration where applicable, and maintains separate processing pipelines for different domains.

In some embodiments, the system 100 includes a domain configuration module that configures the data verification subsystem 106 for a specific domain, adapts the ontology management layer 114 to domain-specific requirements, customizes the explainable AI 122 for domain-appropriate explanations, implements domain-specific security and privacy controls, and establishes domain-appropriate feedback mechanisms. In some embodiments, the feedback loop 146 compares recommendation outcomes across different demographic groups, adjusts model weights when systematic bias is detected, implements bias correction mechanisms, and maintains bias monitoring metrics across all domains.

In some embodiments, the feedback loop 146 incorporates unsuccessful outcomes (e.g., recommendations resulting in user rejection or negative feedback) using reinforcement learning mechanisms, performs counterfactual analysis on negative recommendations, adjusts model weights based on reported user dissatisfaction, and maintains historical records of recommendation failures for improvement. In some embodiments, the system 100 analyzes patterns in unsuccessful recommendations, implements model adjustments based on negative feedback, generates alternative recommendation paths through counterfactual analysis, and maintains separate unsuccessful outcome tracking for each domain.

Example Ontology Management System with Explainable AI Integration

In some embodiments, the system 100 provides explainable recommendations through an integrated ontology management and AI framework. The ontology management layer 114 implements specific mechanisms for maintaining ontological consistency during updates 116 while integrating cross-domain relationships through cross-domain mapping 118. The system processes verified data 112 through validation protocols that ensure logical consistency of relationships between nodes in the ontological structure. The explainable AI 122 implements adjustment of explanation complexity based on predefined user expertise categories, using SHAP analysis 124 and decision trees 126 to generate appropriate-level explanations through recommendations and explanations 132. The system adapts the complexity and detail of explanations based on user profile data and interaction patterns. The ontology management layer 114 updates and expands the multi-domain ontology using semantic similarity algorithms within the cross-domain mapping 118. These algorithms identify and map relationships between concepts, maintaining semantic similarity scores that enable discovery of non-obvious connections. The system implements sliding window analysis with exponential decay functions to prioritize recent market trends while maintaining stability.

In some embodiments, the system 100 integrates and reconciles ontologies across multiple industries through the ontology management layer 114. The cross-domain mapping 118 merges and reconciles ontologies using semantic similarity measures and reconciliation processes. This enables integration of diverse data sources while maintaining logical consistency across domains. The enriched data 120 from the ontology management layer 114 provides input to the explainable AI 122, enhancing both recommendation accuracy and explanation generation. As the ontology adapts through updates 116, the explainable AI 122 recalibrates its decision trees 126 and SHAP analysis 124 to maintain current market alignment. This interaction ensures recommendations and explanations 132 reflect the latest verified data 112 and ontological relationships.

In some embodiments, the ontology management layer 114 maps skills, certifications, job roles, and user profiles to a comprehensive, evolving ontology. The system updates these mappings through updates 116 as new data is processed through the verified data stream 112. In some embodiments, the semantic similarity algorithms within the cross-domain mapping 118 identify and map relationships between seemingly unrelated skills and job roles that share less than 20% semantic similarity based on cosine distance. This capability enables discovery of non-obvious connections, enhancing the system's ability to provide novel career path recommendations.

In some embodiments, the ontology management layer 114 implements a multi-domain ontology integration mechanism within the cross-domain mapping 118. This mechanism merges and reconciles ontologies from various industries, maintaining separate confidence scores for each domain while enabling cross-domain career guidance. In some embodiments, the ontology management layer 114 employs machine learning models to expand and refine the ontology. These models analyze patterns in the verified data streams 112 to maintain current market alignment through updates 116. In some embodiments, the ontology management layer 114 includes a semantic analysis component that detects new relationships between skills and job roles through semantic similarity algorithms. The system implements density-based spatial clustering for flexible cluster formation around emerging relationships.

In some embodiments, the adaptive learning mechanism within updates 116 processes incoming verified data 112 to adjust ontological relationships. The system implements sliding window analysis with exponential decay functions to prioritize recent market trends while maintaining historical stability. In some embodiments, the adaptive learning mechanism adjusts relationships between skills, job roles, and certifications based on incoming verified data 112 and user interactions captured through the feedback loop 146. In some embodiments, the ontology management layer 114 processes input data using machine learning models to enrich the ontology, ensuring career pathways and recommendations align with labor market trends identified from processed job posting data. In some embodiments, the ontology management layer 114 provides ontological updates 130 to the explainable AI 122, enables recalibration of recommendation models based on ontology changes, and maintains traceable relationships between ontological elements and recommendation decisions.

In some embodiments, the ontology management layer 114 concurrently maintains multiple domain-specific ontologies, establishes cross-domain relationships through the cross-domain mapping 118, extends existing ontologies to incorporate new domains, and adapts semantic similarity algorithms to different industry contexts. In some embodiments, the system facilitates career guidance across different domains through multi-domain ontology integration, utilizing the cross-domain mapping 118 to ensure consistent relationships across industries. In some embodiments, the system adapts to emerging trends through learning implemented via the feedback loop 146, enabling ongoing refinement based on user interactions and market changes. In some embodiments, the system implements cross-domain data normalization within the multi-tiered verification process 108, standardizing terminology across domains while maintaining domain-specific context through the ontology management layer 114.

In some embodiments, the system 100 adapts across domains beyond career guidance or workforce mobility. For example, in disaster response applications, the data verification subsystem 106 processes emergency reports, social media feeds, and sensor data through the multi-tiered verification process 108, while the ontology management layer 114 maps available resources to crisis needs through cross-domain mapping 118. The explainable AI 122 generates recommendations for resource allocation through SHAP analysis 124 and decision trees 126, providing emergency managers with detailed rationales for each decision. The Bayesian inference models within the explainable AI 122 calculate response probabilities using recursive Bayesian estimation with sliding windows to maintain current crisis alignment while incorporating historical response patterns.

In cybersecurity implementations, the data verification subsystem 106 processes threat indicators and system vulnerability data through context-aware NLP models. The ontology management layer 114 maintains comprehensive attack pattern mappings through the core ontology framework 302, which integrates with domain-specific knowledge bases 304 for different security domains. The explainable AI 122 implements SHAP analysis 124 to highlight critical threat indicators, while decision trees 126 provide security teams with transparent attack classifications. The feedback loop 146 enables continuous refinement of defense strategies through reinforcement learning mechanisms that optimize responses based on emerging threat patterns. The secure API layer 134 implements cross-platform synchronization 138 to maintain coordinated security responses while enforcing security protocols 136 across distributed systems. In disaster response, transitive inference can connect indirect resource needs to crisis outcomes, while in cybersecurity, abductive reasoning can trace potential vulnerabilities to likely attack patterns, ensuring transparent and domain-specific insights in each context.

FIGS. 19A-19D show a flowchart of an example method 1900 for providing explainable recommendations through an integrated ontology management and AI framework, according to some embodiments. The system 100 provides explainable recommendations through an integrated ontology management and AI framework. The ontology management layer 114 implements (1902) mechanisms for maintaining ontological consistency during updates while integrating cross-domain relationships through cross-domain mapping 118. The explainable AI 122 implements (1904) adjustment of explanation complexity based on predefined user expertise categories. The ontology management layer 114 updates and expands (1906) a multi-domain ontology using semantic similarity algorithms within the cross-domain mapping 118, integrates and reconciles (1908) ontologies across multiple industries, and/or provides (1910) updated ontological data to the explainable AI 122 for enhancing recommendation accuracy and explanation generation.

Referring next to FIG. 19B, in some embodiments, the ontology management layer 114 implements (1912) a hypergraph data structure where nodes represent concepts and hyperedges connect multiple nodes across domains, enabling fixed-time lookups for connected nodes. In some embodiments, each hyperedge maintains (1914) weight vectors representing relationship strengths across different domains, updating them through gradient descent with configurable learning rates. In some embodiments, the semantic similarity algorithms calculate (1916) similarity scores using a multidimensional similarity matrix with dimensionality reduction that preserves a minimum distance threshold between embedded concepts. In some embodiments, the ontology management layer 114 processes (1918) incoming data through sliding window analysis using predetermined time intervals and weighted averaging of data points. In some embodiments, the ontology management layer 114 implements (1920) asynchronous processing queues for handling ontology updates while maintaining system responsiveness. In some embodiments, the semantic similarity algorithms implement (1922) vector-based comparison methods with configurable similarity thresholds for relationship detection.

Figure 19A:
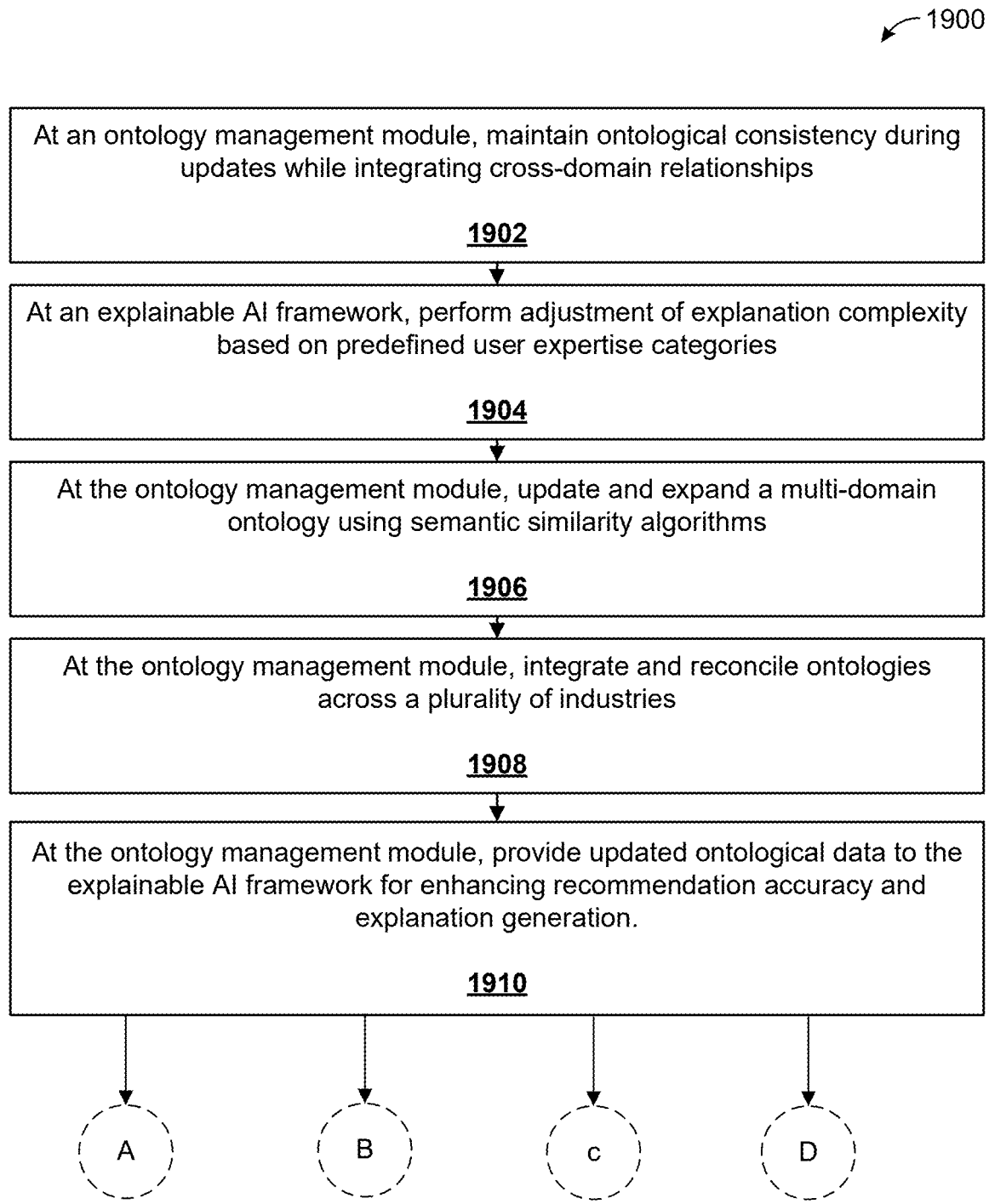
Figure 19C:
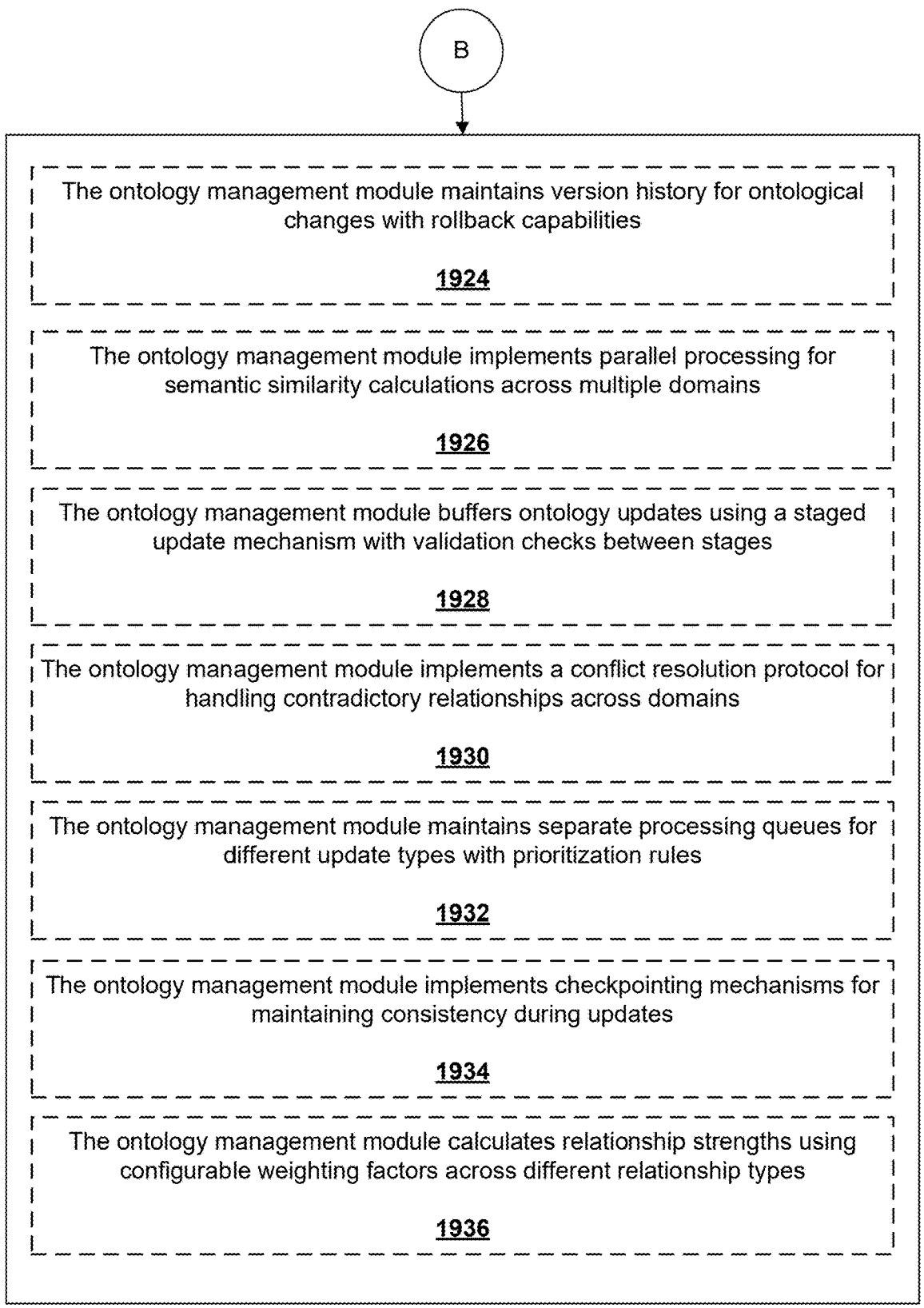

Referring next to FIG. 19C, in some embodiments, the ontology management layer 114 maintains (1924) version history for ontological changes with rollback capabilities. In some embodiments, the ontology management layer 114 implements (1926) parallel processing for semantic similarity calculations across multiple domains. In some embodiments, the ontology management layer 114 buffers (1928) ontology updates using a staged update mechanism with validation checks between stages. In some embodiments, the ontology management layer 114 implements (1930) a conflict resolution protocol for handling contradictory relationships across domains. In some embodiments, the ontology management layer 114 maintains (1932) separate processing queues for different update types with prioritization rules. In some embodiments, the ontology management layer 114 implements (1934) checkpointing mechanisms for maintaining consistency during updates. In some embodiments, the management layer 114 calculates (1936) relationship strengths using configurable weighting factors across different relationship types.

Figure 19D:
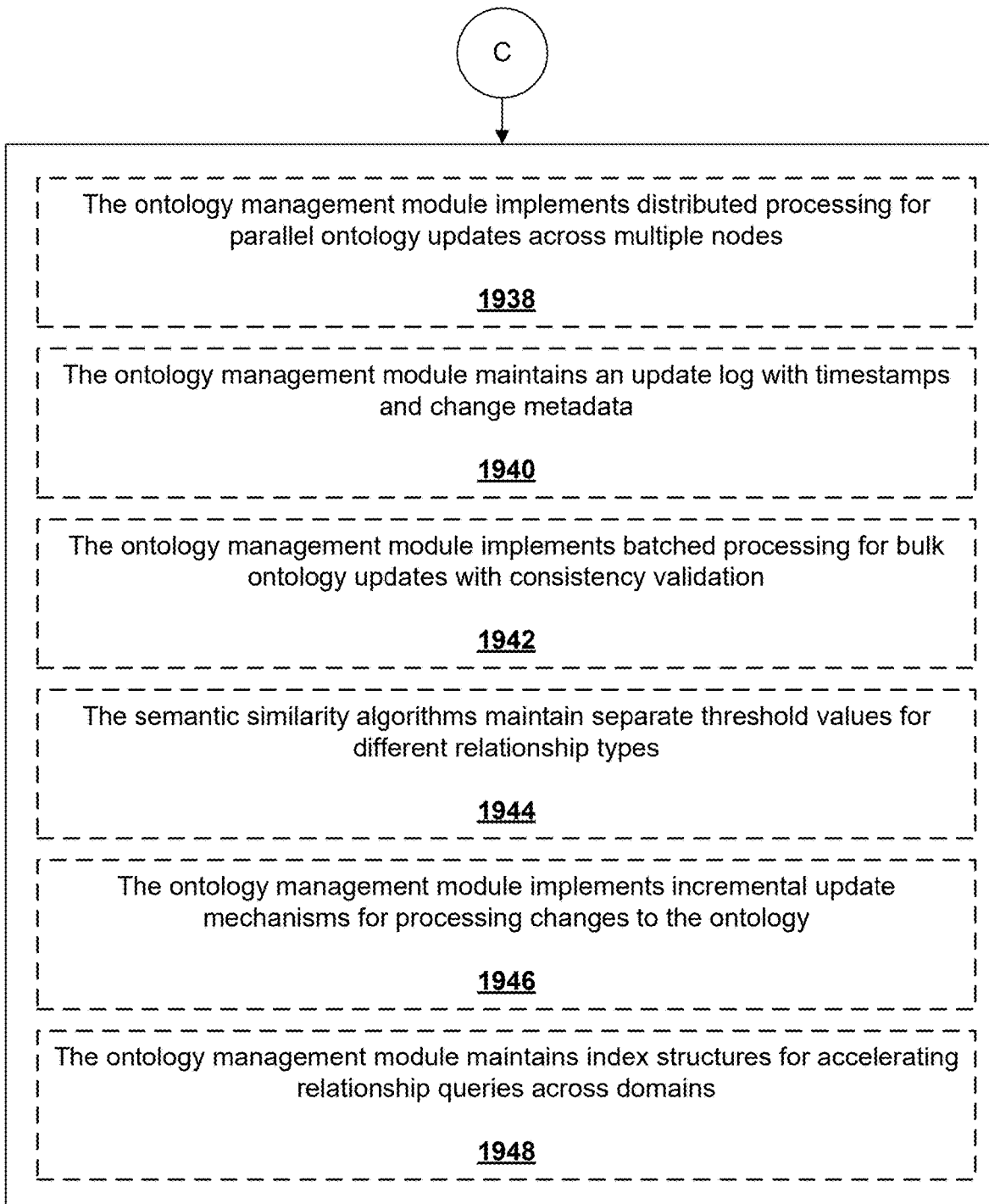

Referring next to FIG. 19D, in some embodiments, the ontology management layer 114 implements (1938) distributed processing for parallel ontology updates across multiple nodes. In some embodiments, the ontology management layer 114 maintains (1940) an update log with timestamps and change metadata. In some embodiments, the ontology management layer 114 implements (1942) batched processing for bulk ontology updates with consistency validation. In some embodiments, the semantic similarity algorithms maintain (1944) separate threshold values for different relationship types. In some embodiments, the ontology management layer 114 implements (1946) incremental update mechanisms for processing changes to the ontology. In some embodiments, the ontology management layer 114 maintains (1948) index structures for accelerating relationship queries across domains.

Figure 19E:
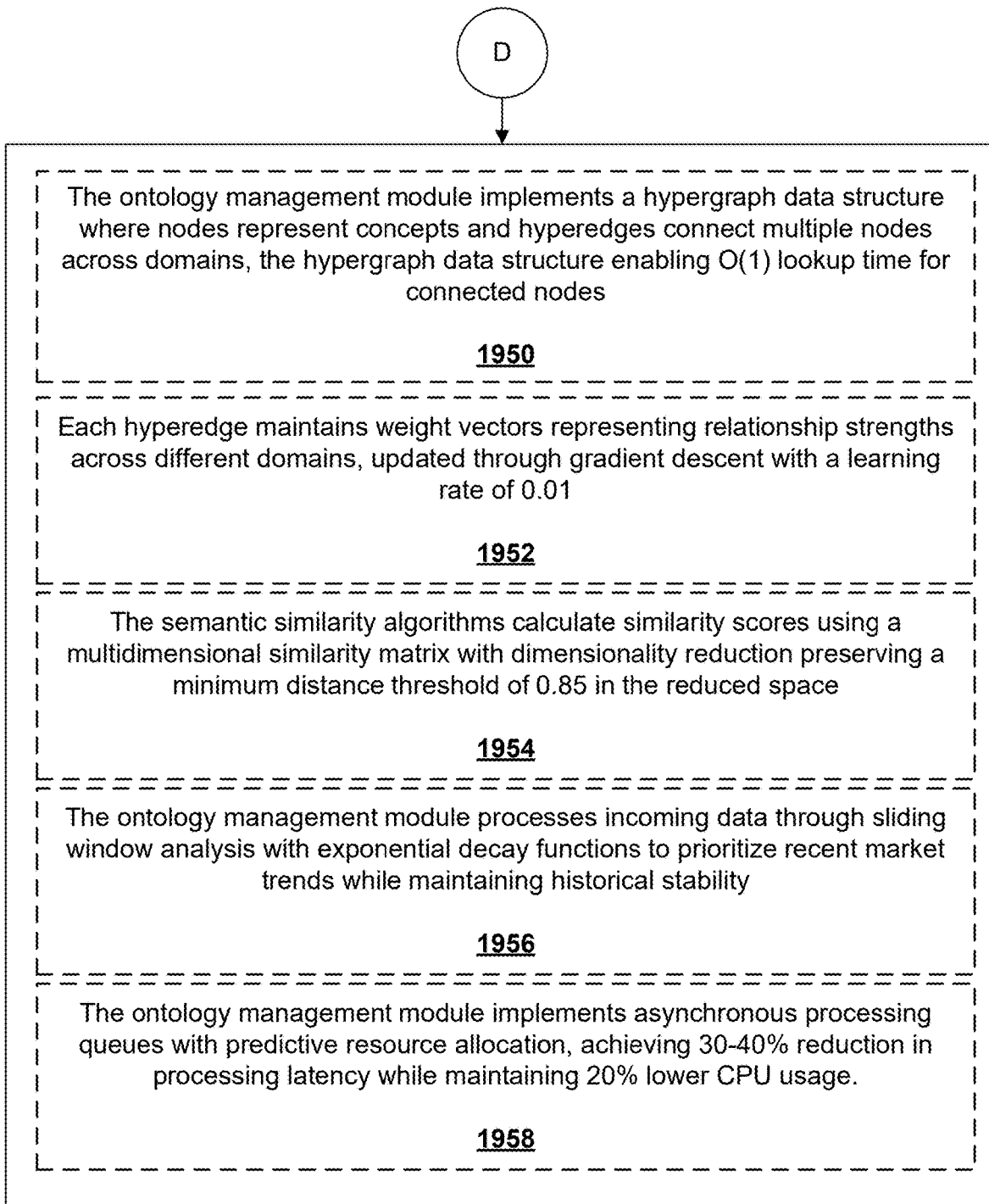

Referring next to FIG. 19E, in some embodiments, the ontology management layer 114 implements (1950) a hypergraph data structure where nodes represent concepts and hyperedges connect multiple nodes across domains, enabling O(1) lookup time for connected nodes. In some embodiments, each hyperedge maintains (1952) weight vectors representing relationship strengths across different domains, updating them through gradient descent with a learning rate of 0.01. In some embodiments, the semantic similarity algorithms calculate (1954) similarity scores using a multidimensional similarity matrix with dimensionality reduction preserving a minimum distance threshold of 0.85 in the reduced space. In some embodiments, the ontology management layer 114 processes (1956) incoming data through sliding window analysis with exponential decay functions to prioritize recent market trends while maintaining historical stability. In some embodiments, the ontology management layer 114 implements (1958) asynchronous processing queues with predictive resource allocation, achieving 30-40% reduction in processing latency while maintaining 20% lower CPU usage.

Example Multi-Tier Data Verification System for Explainable Artificial Intelligence The data verification subsystem 106 implements a multi-tier consensus protocol for resolving conflicting information from external sources 102. The explainable AI 122 implements adjustment of explanation complexity through SHAP analysis 124 and decision trees 126. The data verification subsystem 106 assigns confidence scores based on source reliability through the multi-tiered verification process 108. This process employs a Bayesian weighting model that adjusts weights based on observed patterns, increasing weights for sources that consistently provide accurate data. The system applies consensus algorithms including majority voting and weighted averaging through the conflict resolution 110 to resolve data discrepancies. When conflicts arise between data sources, the system implements exponential decay functions with a half-life of 30 days, ensuring recent data receives proportionally higher weight in confidence calculations. The verified data 112 flows to the explainable AI 122 with confidence metrics, enabling the generation of reliability-aware explanations through recommendations and explanations 132.

In some embodiments, the data verification subsystem 106 processes multi-domain, unstructured data 104 through context-aware NLP models that understand specific context for skills and certifications beyond simple keyword extraction. The system performs contextual entity identification using trained transformers fine-tuned on industry-specific datasets.

In some embodiments, the data verification subsystem 106 provides cleaned and structured data to the ontology management layer 114, implementing data categorization using NLP models specifically for ontology enrichment. The system maintains data streams with maximum latency of 5 seconds between updates. In some embodiments, the data verification subsystem 106 collects and processes unstructured data formats including job postings, certifications, and user profiles. The system processes these through the multi-tiered verification process 108 before converting them into verified data 112. In some embodiments, the context-aware NLP models within the data verification subsystem 106 identify expertise levels and relevant domains through semantic analysis. When processing technical skills, the models analyze context beyond simple keyword matching to enhance matching accuracy between verified data 112 and user profiles.

In some embodiments, the data verification subsystem 106 implements a cross-domain normalization process within the multi-tiered verification process 108. This process standardizes terminology across diverse industries, assigning normalized confidence scores based on source reliability, historical accuracy, and relevance. In some embodiments, the data verification subsystem 106 employs hybrid machine learning and statistical models within the multi-tiered verification process 108. These models categorize and prioritize incoming data sources, calculating confidence scores based on industry demand, geographic relevance, and data freshness. In some embodiments, the multi-tiered verification process 108 cross-references incoming data against external databases and verified sources. The process identifies potentially fraudulent or misleading data through probabilistic models, ensuring only authentic information passes through to the verified data 112.

In some embodiments, the data verification subsystem 106 applies context-aware NLP extraction and data prioritization through statistical models that analyze patterns in the unstructured data 104 to determine relevance and priority. In some embodiments, the data verification subsystem 106 transforms raw, unstructured data 104 into structured insights that the explainable AI 122 can immediately utilize for generating recommendations and explanations 132. In some embodiments, the data verification subsystem 106 processes domain-specific unstructured data 104 including career data, healthcare records, educational content, financial data, and e-commerce data. The system adapts NLP models to domain-specific vocabularies and contexts, fine-tuning them on industry-specific datasets comprising at least 10,000 labeled examples.

In some embodiments, the multi-tiered verification process 108 assigns confidence scores ranging from 0 to 1 to data points based on source reliability, historical accuracy, and relevance. The system calculates scores using weighted averages of source reliability and data freshness, with source reliability scored based on predefined criteria including source age, update frequency, and verification status. In some embodiments, the data verification subsystem 106 implements weighted averaging of confidence scores for conflicting skill requirements across multiple job postings. The system prioritizes verified company websites over third-party aggregators and maintains an audit trail of conflict resolution decisions through the conflict resolution 110. In some embodiments, the data verification subsystem 106 combines with a hybrid machine learning and statistical model that categorizes incoming data sources. The system calculates priority scores based on industry demand signals, geographic relevance metrics, and job posting recency through the multi-tiered verification process 108.

In some embodiments, the system provides domain-specific recommendations across multiple career platforms while ensuring updates. The verified data stream 128 maintains consistency across platforms through the secure API layer 134, which implements cross-platform synchronization 138. In some embodiments, the verification subsystem 106 implements configurable time windows for historical accuracy measurements, with default windows (e.g., of 30 days for high-frequency data sources and 90 days for slower-changing sources). In some embodiments, the confidence scores are calculated on a scale of 0-1, with thresholds of, for example: 0.9+ for critical systems, 0.8+ for standard operations, and 0.7+ for experimental features. These thresholds can be determined through empirical testing to optimize the tradeoff between accuracy and system responsiveness.

FIGS. 20A-20D show a flowchart of an example method 2000 for providing multi-tier data verification in an explainable AI system, according to some embodiments. The data verification subsystem 106 implements (2002) a multi-tier consensus protocol for resolving conflicting information from external sources 102. The explainable AI 122 implements (2004) adjustment of explanation complexity through SHAP analysis 124 and decision trees 126. The data verification subsystem 106 assigns (2006) confidence scores based on source reliability through the multi-tiered verification process 108. The system applies (2008) consensus algorithms through the conflict resolution 110 to resolve data discrepancies. The verified data 112 flows to the explainable AI 122 with confidence metrics, enabling (2010) the generation of reliability-aware explanations through recommendations and explanations 132.

Figure 20A:
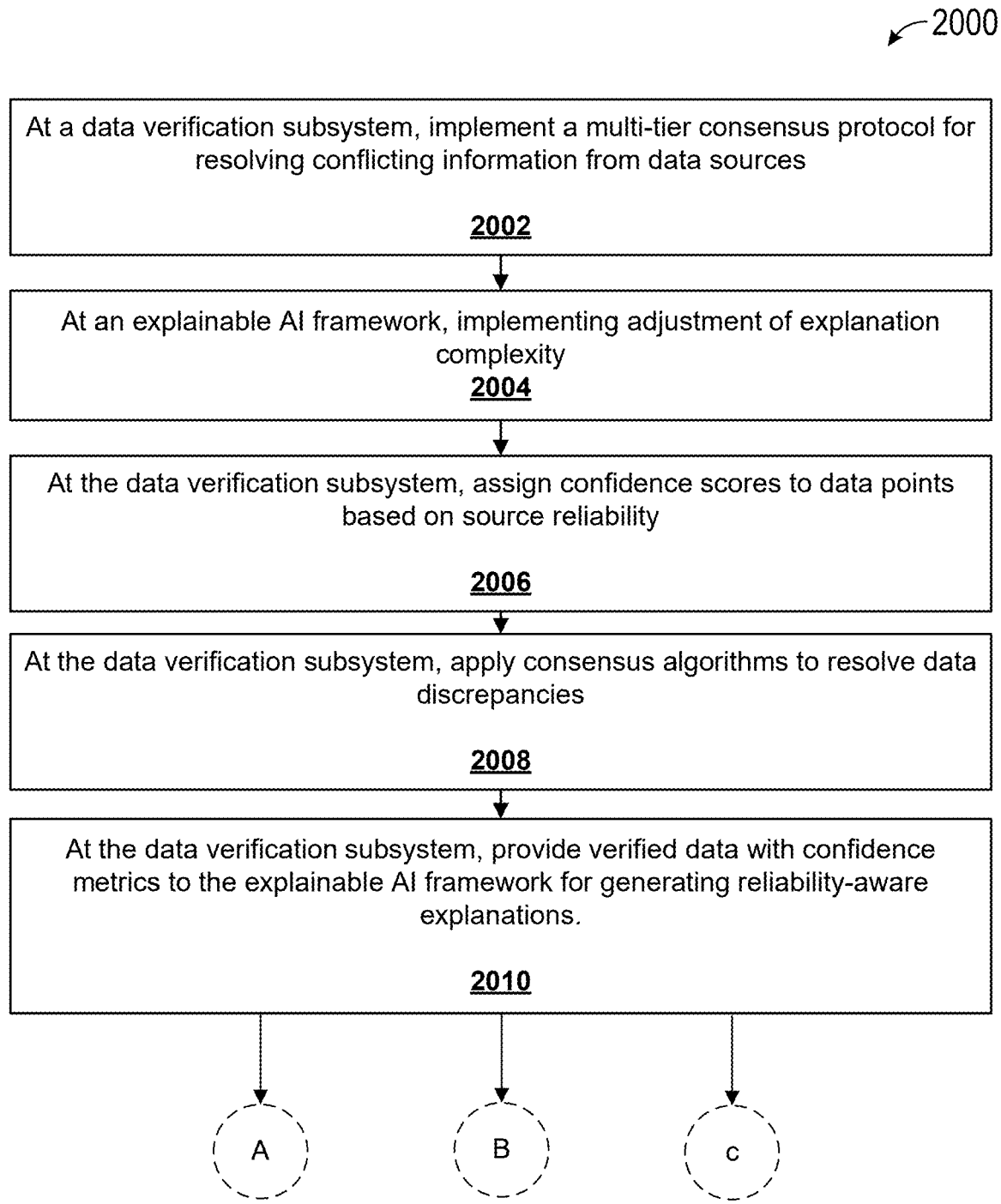
FIGS. 20A-20D show a flowchart of an example method for providing multi-tier data verification in an explainable AI system, according to some embodiments.
Figure 20B:
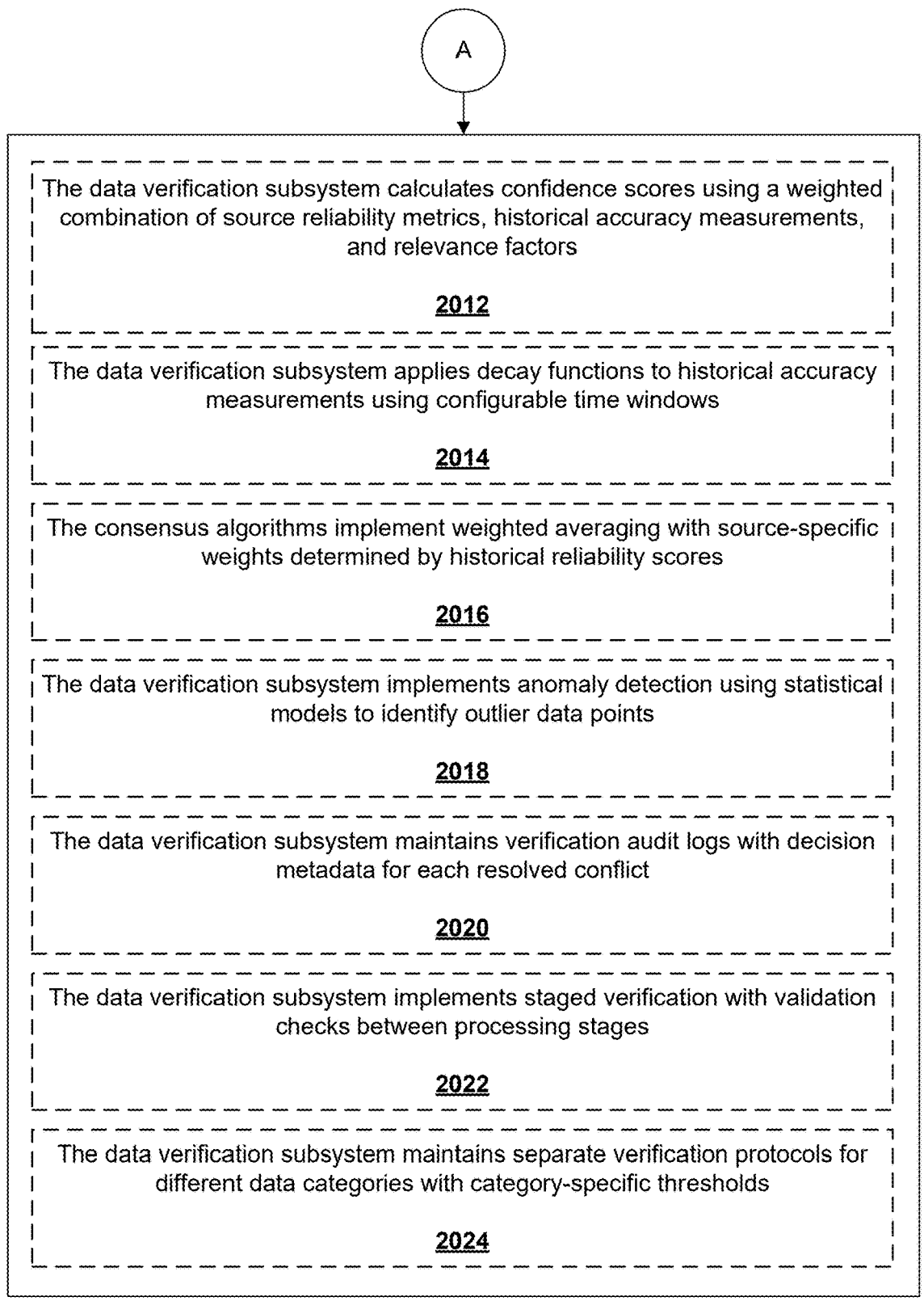

Referring next to FIG. 20B, in some embodiments, the data verification subsystem 106 calculates (2012) confidence scores using a weighted combination of source reliability metrics, historical accuracy measurements, and relevance factors through the multi-tiered verification process 108. In some embodiments, the data verification subsystem 106 applies (2014) decay functions to historical accuracy measurements using configurable time windows within the multi-tiered verification process 108. In some embodiments, the consensus algorithms within conflict resolution 110 implement (2016) weighted averaging with source-specific weights determined by historical reliability scores. In some embodiments, the data verification subsystem 106 implements (2018) anomaly detection using statistical models to identify outlier data points through the multi-tiered verification process 108. In some embodiments, the data verification subsystem 106 maintains (2020) verification audit logs with decision metadata for each resolved conflict through the conflict resolution 110. In some embodiments, the data verification subsystem 106 implements (2022) staged verification with validation checks between processing stages through the multi-tiered verification process 108. In some embodiments, the data verification subsystem 106 maintains (2024) separate verification protocols for different data categories with category-specific thresholds.

Figure 20C:
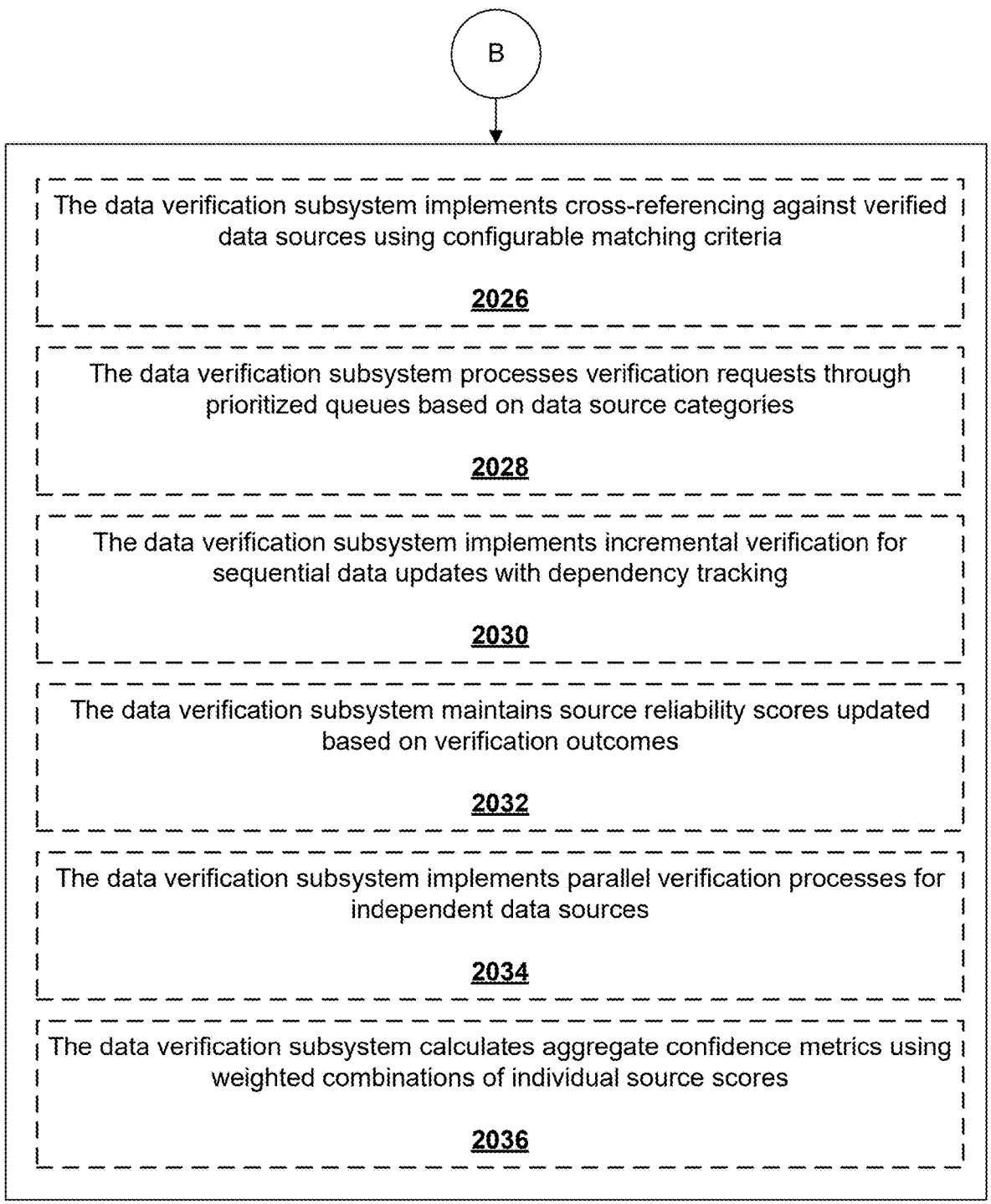
Figure 20D:
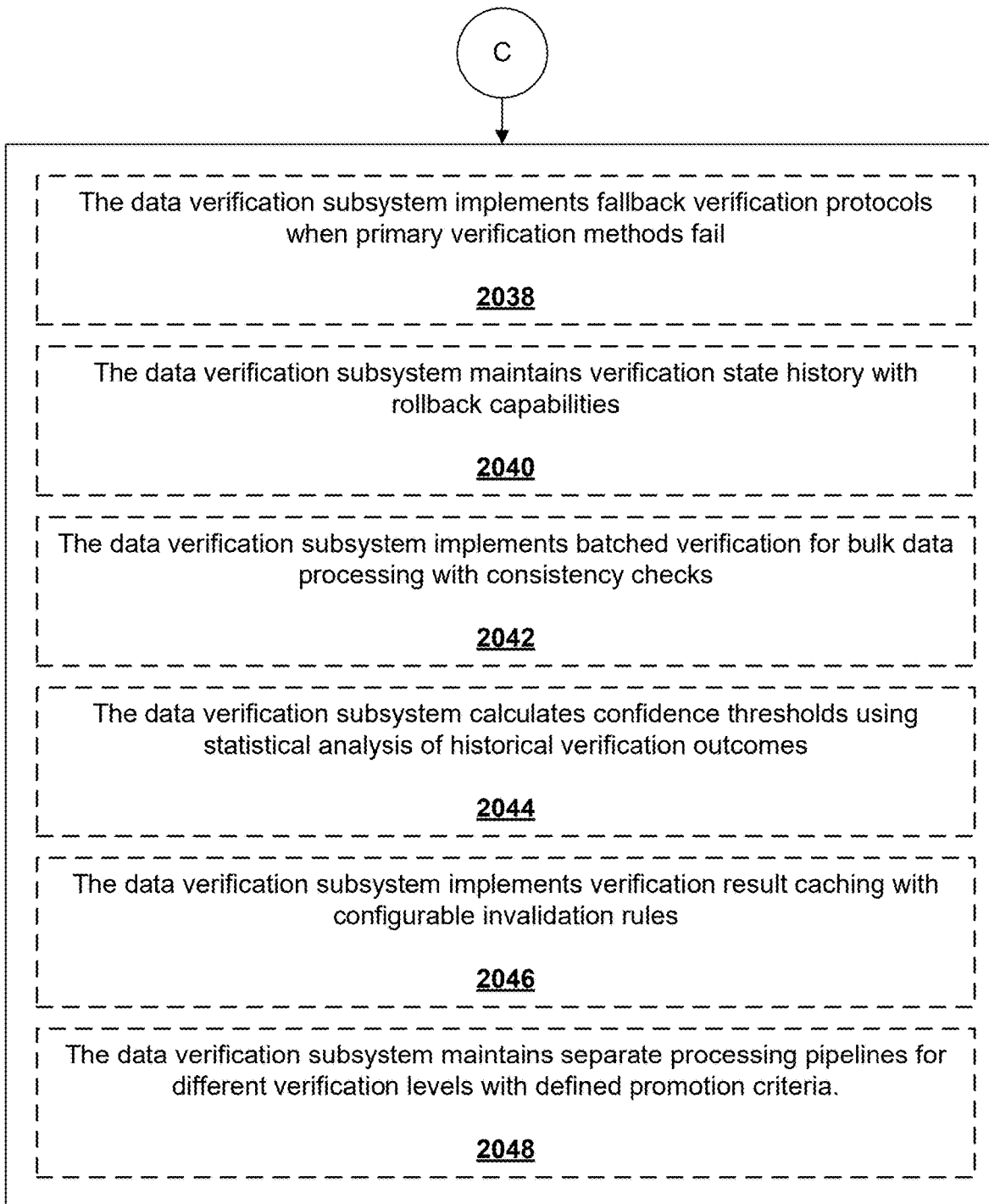

Referring next to FIG. 20C, in some embodiments, the data verification subsystem 106 implements (2026) cross-referencing against verified data sources using configurable matching criteria through the multi-tiered verification process 108. In some embodiments, the data verification subsystem 106 processes (2028) verification requests through prioritized queues based on data source categories. In some embodiments, the data verification subsystem 106 implements (2030) incremental verification for sequential data updates with dependency tracking through the multi-tiered verification process 108. In some embodiments, the data verification subsystem 106 maintains (2032) source reliability scores updated based on verification outcomes through the conflict resolution 110. In some embodiments, the data verification subsystem 106 implements (2034) parallel verification processes for independent data sources through the multi-tiered verification process 108. In some embodiments, the data verification subsystem 106 calculates (2036) aggregate confidence metrics using weighted combinations of individual source scores through the conflict resolution 110.

Referring next to FIG. 20C, in some embodiments, the data verification subsystem 106 implements (2038) fallback verification protocols when primary verification methods fail through the multi-tiered verification process 108. In some embodiments, the data verification subsystem 106 maintains (2040) verification state history with rollback capabilities. In some embodiments, the data verification subsystem 106 implements (2042) batched verification for bulk data processing with consistency checks through the multi-tiered verification process 108. In some embodiments, the data verification subsystem 106 calculates (2044) confidence thresholds using statistical analysis of historical verification outcomes through the conflict resolution 110. In some embodiments, the data verification subsystem 106 implements (2046) verification result caching with configurable invalidation rules. In some embodiments, the data verification subsystem 106 maintains (2048) separate processing pipelines for different verification levels with defined promotion criteria through the multi-tiered verification process 108.

Example Explainable Artificial Intelligence Framework System

In some embodiments, the explainable AI 122 generates domain-specific recommendations through interpretable machine learning models including decision trees 126 and Bayesian inference. The system implements SHAP analysis 124 to calculate feature importance, providing explainable rationales for each recommendation through the recommendations and explanations 132. The system utilizes enriched data 120 from the ontology management layer 114 to enhance recommendation accuracy. The explainable AI 122 implements adjustment of explanation complexity based on predefined user expertise categories through multi-level explanation 908. In some embodiments, the explainable AI 122 provides explanations for each recommendation, detailing the reasoning behind suggestions through decision trees 126 that show users how specific skills and experiences contribute to each recommendation decision.

In some embodiments, the explainable AI 122 adapts explanations across multiple domains through the multi-level explanation engine 908. The system provides basic view 910 for entry-level users, intermediate view 912 for proficient users, and advanced view 914 for expert users, maintaining consistency in explanation methodology while generating domain-appropriate visualizations. In some embodiments, the explainable AI 122 supports multiple recommendation types including career guidance, medical diagnostics, educational pathways, financial advice, and product recommendations. The system adapts feature importance calculations to domain-specific priorities through SHAP analysis 124 and implements domain-specific success metrics through performance monitoring 1224.

In some embodiments, the explainable AI 122 implements logical reasoning mechanisms that ground recommendations in the ontological structure. Through the cross-domain mapping 118, the system establishes conceptual hierarchies that enable abductive reasoning by working backward from recommendations to identify the most likely explanation paths. The ontology management layer 114 maintains logical rules and constraints through the core ontology framework 302 that govern valid relationships between concepts. When generating explanations through the SHAP analysis 124, the system leverages these hierarchical relationships to perform transitive inference, identifying indirect connections between concepts that strengthen the reasoning chain. The system's proof trees can incorporate user feedback to refine logical chains. The feedback loop 146 analyzes user-provided corrections to adjust the ontological relationships or logical rules within the ontology management layer 114, ensuring that future recommendations better align with user expectations and domain-specific nuances.

For example, when processing verified data 112 through the ontology management layer 114, the system may identify that Concept A relates to Concept B through Rule X, and Concept B relates to Concept C through Rule Y. The transitive inference mechanism automatically derives the relationship between Concepts A and C, validating this connection through the consistency check 314. This derived knowledge augments the statistical analysis from SHAP values and decision trees 126, providing logically complete explanation chains that trace each recommendation back to its foundational premises. In some embodiments, the rule validation 314 ensures that all logical inferences maintain consistency with domain-specific knowledge bases 304. When the explainable AI 122 generates recommendations and explanations 132, the explainable AI 122 constructs proof trees showing how each conclusion follows from the established rules and relationships in the ontology. The explanation generator 428 then translates these logical proofs into natural language explanations adapted to user expertise levels through the visualization adaptation system 918, maintaining both logical rigor and interpretability.

In some embodiments, the decision trees 126 generate interpretable recommendation processes that clearly show progression paths. The system implements cost-complexity pruning with predetermined depth constraints, maintaining interpretability while preserving recommendation accuracy. For example, skill trees maintain a maximum depth of 8 levels, while career path trees extend to 12 levels for complex relationships. In some embodiments, the SHAP analysis 124 highlights significant factors contributing to recommendations through feature importance scores. The system implements a multi-objective SHAP approach that combines predictive importance and fairness metrics through a weighted combination: SHAP combined=w1*SHAP predictive+w2*SHAP fairness, where w1 (0.7) and w2 (0.3) balance accuracy and fairness objectives. In some embodiments, Bayesian models within the explainable AI 122 calculate success probabilities for specific recommendations. The system processes enriched data 120 using recursive Bayesian estimation with sliding windows to maintain current market alignment while incorporating historical success patterns.

In some embodiments, the explainable AI 122 adapts explanations based on user feedback through the feedback loop 146. The system implements reinforcement learning using Q-learning with an ε-greedy policy (ε=0.1) for exploration, maintaining a state-action value matrix updated through the Bellman equation. In some embodiments, the explainable AI 122 demonstrates to users how their skills, experiences, and preferences contribute to each recommendation through the visualization adaptation system 918. The system generates career timeline graphs with milestone markers showing promotions, certifications, and lateral shifts. In some embodiments, the explainable AI 122 adapts to regional job markets and linguistic variations through the domain adaptation layer 712. The system fine-tunes NLP models on region-specific training data and implements vocabulary adaptation 716 for different linguistic contexts.

In some embodiments, the explainable AI 122 packages recommendations with explainability data for transmission through the secure API layer 134. The system maintains recommendation consistency across multiple API endpoints while enabling updates through cross-platform synchronization 138. This enables integration with external applications and user interfaces 144 while preserving explanation context. In some embodiments, the explainable AI 122 implements comprehensive bias handling through pre-processing data balancing techniques. The framework applies adversarial debiasing during model training by introducing targeted adjustments through SHAP analysis 124 that adapt to each user subgroup's characteristics. The system utilizes fairness indicators for bias monitoring and applies post-processing corrections based on disparate impact analysis of recommendations and explanations 132.

In some embodiments, the explainable AI 122 implements model distillation to convert complex models into interpretable forms through the model integration layer 1008. The system maintains layered explainability across decision-making stages while utilizing Local Interpretable Model-agnostic Explanations (LIME) for transparency. Each layer implements fairness constraints ensuring demographic parity deviation remains below a threshold of 0.1. In some embodiments, the system creates simplified interpretable models from larger ensembles through the model integration layer 1008. The framework maintains granular decision traces at each layer and implements progressive complexity reduction techniques while preserving a minimum accuracy threshold of 95% relative to the full model. This architecture ensures users can understand how specific factors contribute to recommendations even as the system scales to handle more complex scenarios.

In some embodiments, the explainable AI 122 maintains user expertise profiles through the user profile manager 902. The system generates multi-tiered explanations based on user technical proficiency levels through the multi-level explanation engine 908. Natural language generation employs template-based generation with complexity adjustment, tailoring explanations to each expertise level while maintaining consistent quality. In some embodiments, the system categorizes users into expertise tiers through the user profile manager 902, implementing distinct levels with quantifiable metrics: basic (Level 1) for users with less than 2 years of experience or fewer than 5 domain-specific skills; intermediate (Level 2) for users with 2-5 years of experience and 5-15 domain-specific skills; and advanced (Level 3) for users with more than 5 years of experience and over 15 domain-specific skills. The system provides technical statistical insights through complexity adjustment 922 while maintaining consistent explanation quality across expertise levels.

In some embodiments, the explainable AI 122 implements a multi-layered explanation system through the visualization adaptation system 918. The system generates initial high-level explanations with expandable sections enriched with visual aids such as decision trees showing skill relationships or feature importance graphs quantifying the impact of each qualification. The chart selection 920 and layout optimization 926 ensure consistent visualization quality while maintaining user-specific preferences for explanation detail levels. In some embodiments, the system provides interactive explanation interfaces with depth-on-demand capabilities through interactive elements 924. The visualization adaptation system 918 implements a three-tiered explanation system providing summary information at level 1, detailed analysis at level 2, and full technical documentation at level 3. The complexity adjustment 922 ensures each layer maintains a balance between comprehensiveness and accessibility.

In some embodiments, the system includes a multi-language career recommendation engine that adapts to regional job markets through the domain adaptation layer 712. The system fine-tunes NLP models on region-specific training data comprising at least 10,000 labeled examples per region, enabling accurate processing of local job market terminology and requirements. In some embodiments, the system implements a user profile enrichment mechanism through the user profile manager 902. The system extracts and incorporates new skills and qualifications from verified data 112, enabling profile updates based on emerging industry trends and user activities.

FIGS. 21A-21D show a flowchart of an example method 2100 for implementing an explainable AI framework with adaptive explanation complexity, according to some embodiments. The explainable AI 122 generates (2102) domain-specific recommendations through interpretable machine learning models including decision trees 126 and Bayesian inference. The system implements (2104) SHAP analysis 124 to calculate feature importance, providing explainable rationales for each recommendation through the recommendations and explanations 132. The system utilizes (2106) enriched data 120 from the ontology management layer 114 to enhance recommendation accuracy. The explainable AI 122 implements (2108) adjustment of explanation complexity based on predefined user expertise categories through multi-level explanation 908.

Figure 21A:
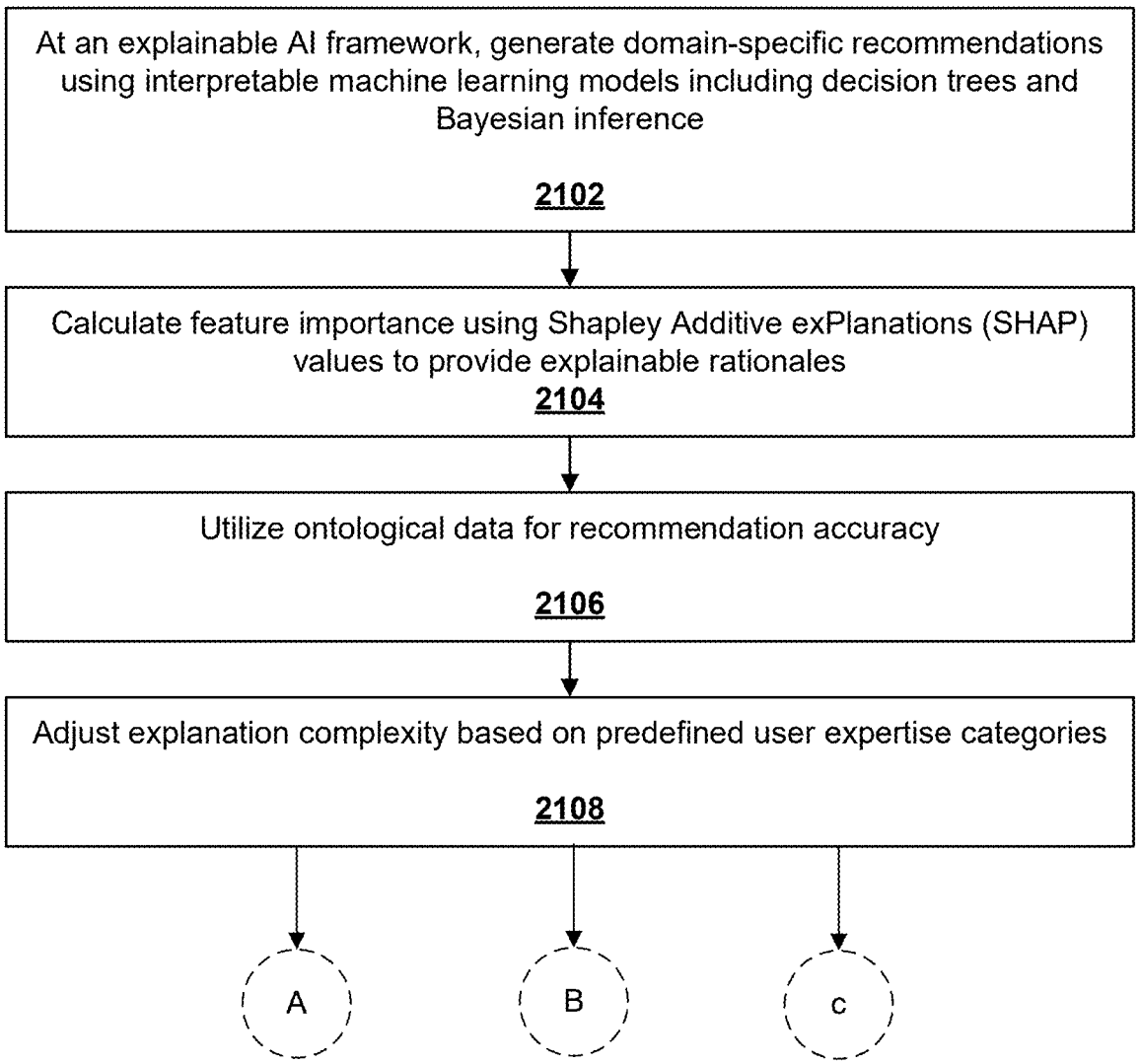
FIGS. 21A-21D show a flowchart of an example method for implementing an explainable AI framework with adaptive explanation complexity, according to some embodiments.
Figure 21B:
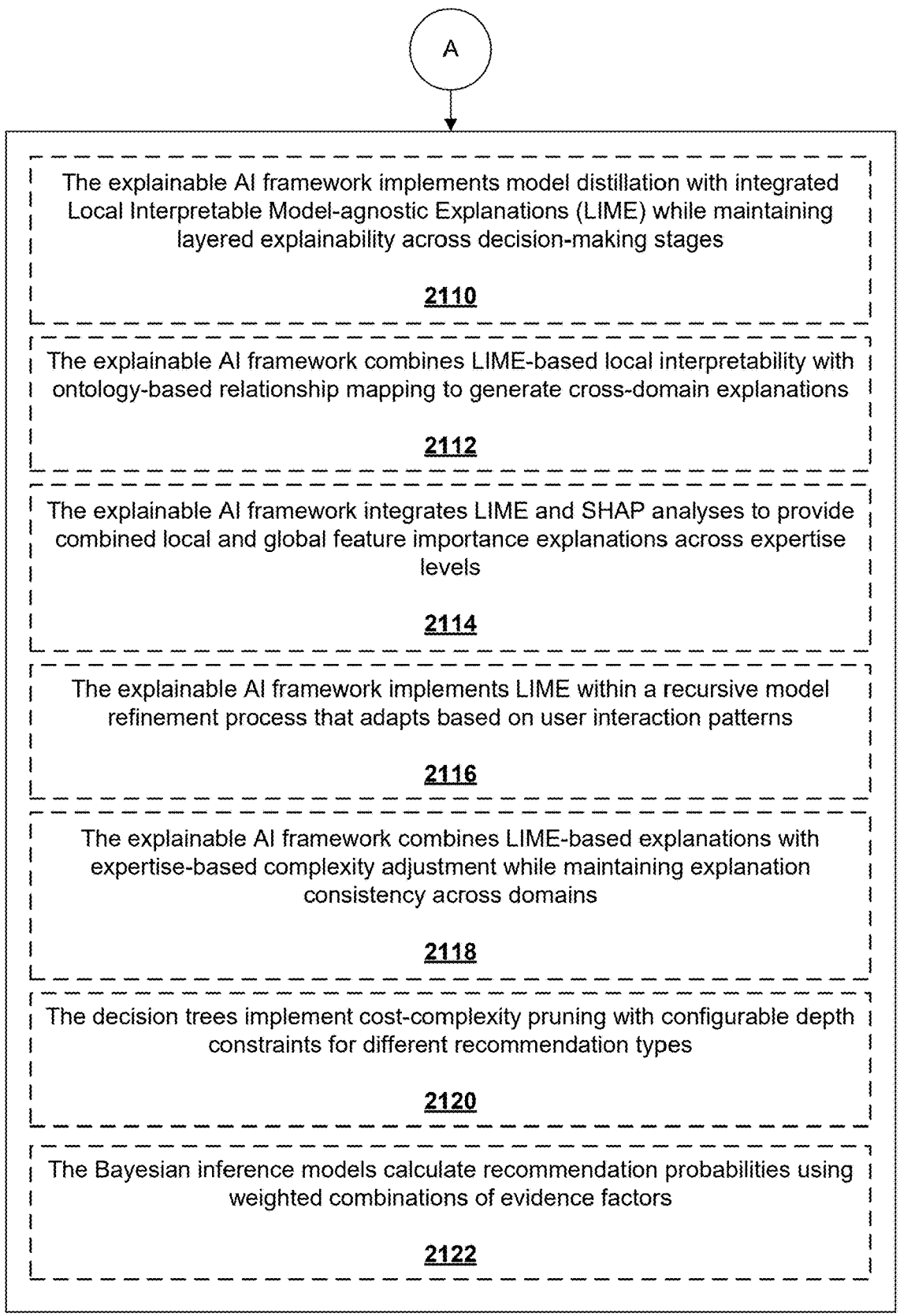

Referring next to FIG. 21B, in some embodiments, the explainable AI 122 implements (2110) model distillation through the model integration layer 1008 with integrated Local Interpretable Model-agnostic Explanations (LIME) while maintaining layered explainability across decision-making stages. In some embodiments, the explainable AI 122 combines (2112) LIME-based local interpretability with ontology-based relationship mapping through the cross-domain mapping 118 to generate cross-domain explanations. In some embodiments, the explainable AI 122 integrates (2114) LIME and SHAP analyses through SHAP analysis 124 to provide combined local and global feature importance explanations across expertise levels. In some embodiments, the explainable AI 122 implements (2116) LIME within a recursive model refinement process through the model refinement engine 1216 that adapts based on user interaction patterns. In some embodiments, the explainable AI 122 combines (2118) LIME-based explanations with expertise-based complexity adjustment through complexity adjustment 922 while maintaining explanation consistency across domains. In some embodiments, the decision trees 126 implement (2120) cost-complexity pruning with configurable depth constraints for different recommendation types. In some embodiments, the Bayesian inference models within the model integration layer 1008 calculate (2122) recommendation probabilities using weighted combinations of evidence factors.

Figure 21C:
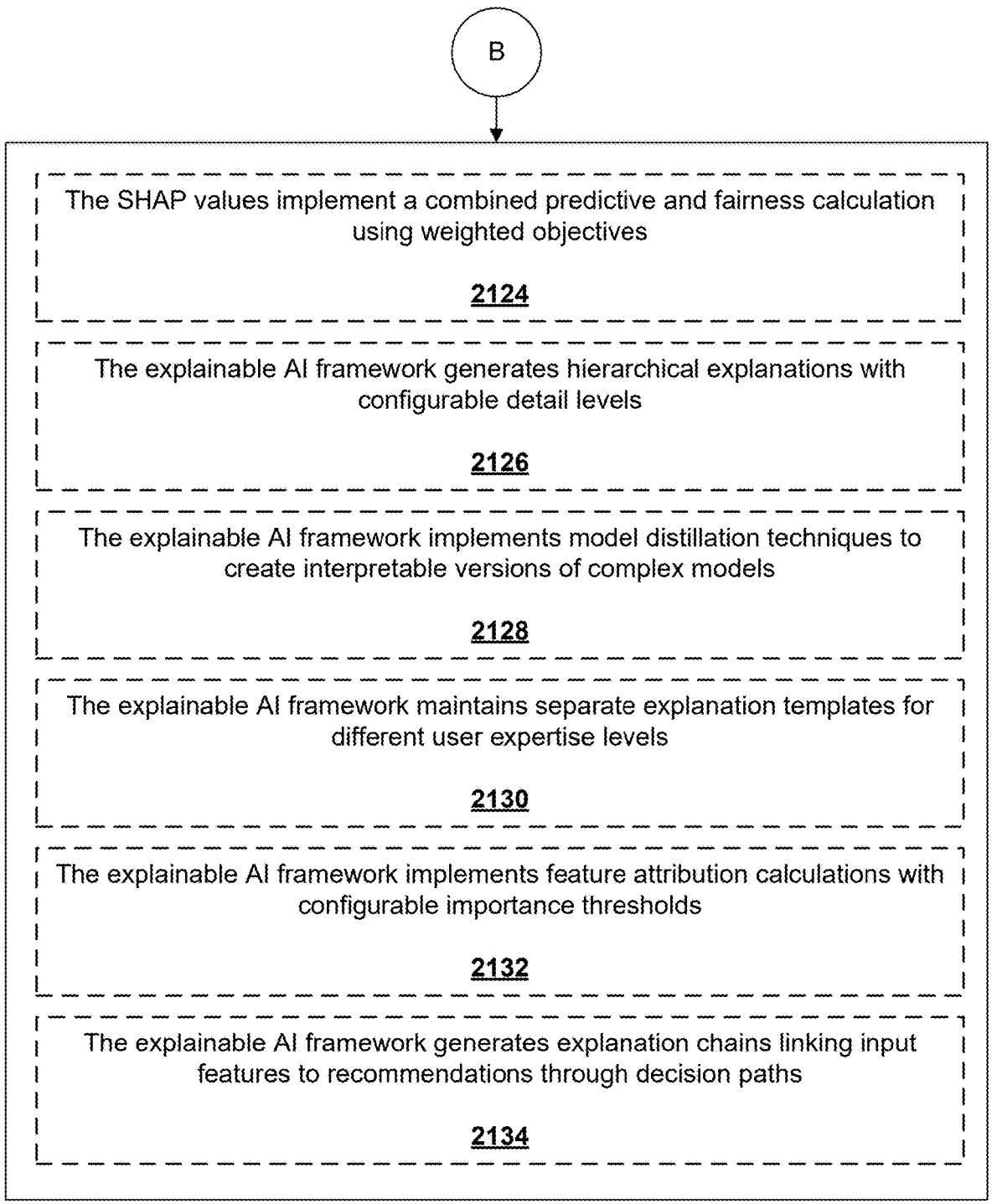

Referring next to FIG. 21C, in some embodiments, the SHAP analysis 124 implements (2124) a combined predictive and fairness calculation using weighted objectives. In some embodiments, the explainable AI 122 generates (2126) hierarchical explanations with configurable detail levels through the multi-level explanation engine 908. In some embodiments, the explainable AI 122 implements (2128) model distillation techniques through the model integration layer 1008 to generate interpretable versions of complex models. In some embodiments, the explainable AI 122 maintains (2130) separate explanation templates for different user expertise levels through the user profile manager 902. In some embodiments, the explainable AI 122 implements (2132) feature attribution calculations with configurable importance thresholds through SHAP analysis 124. In some embodiments, the explainable AI 122 generates (2134) explanation chains linking input features to recommendations through decision paths using decision trees 126.

Figure 21D:
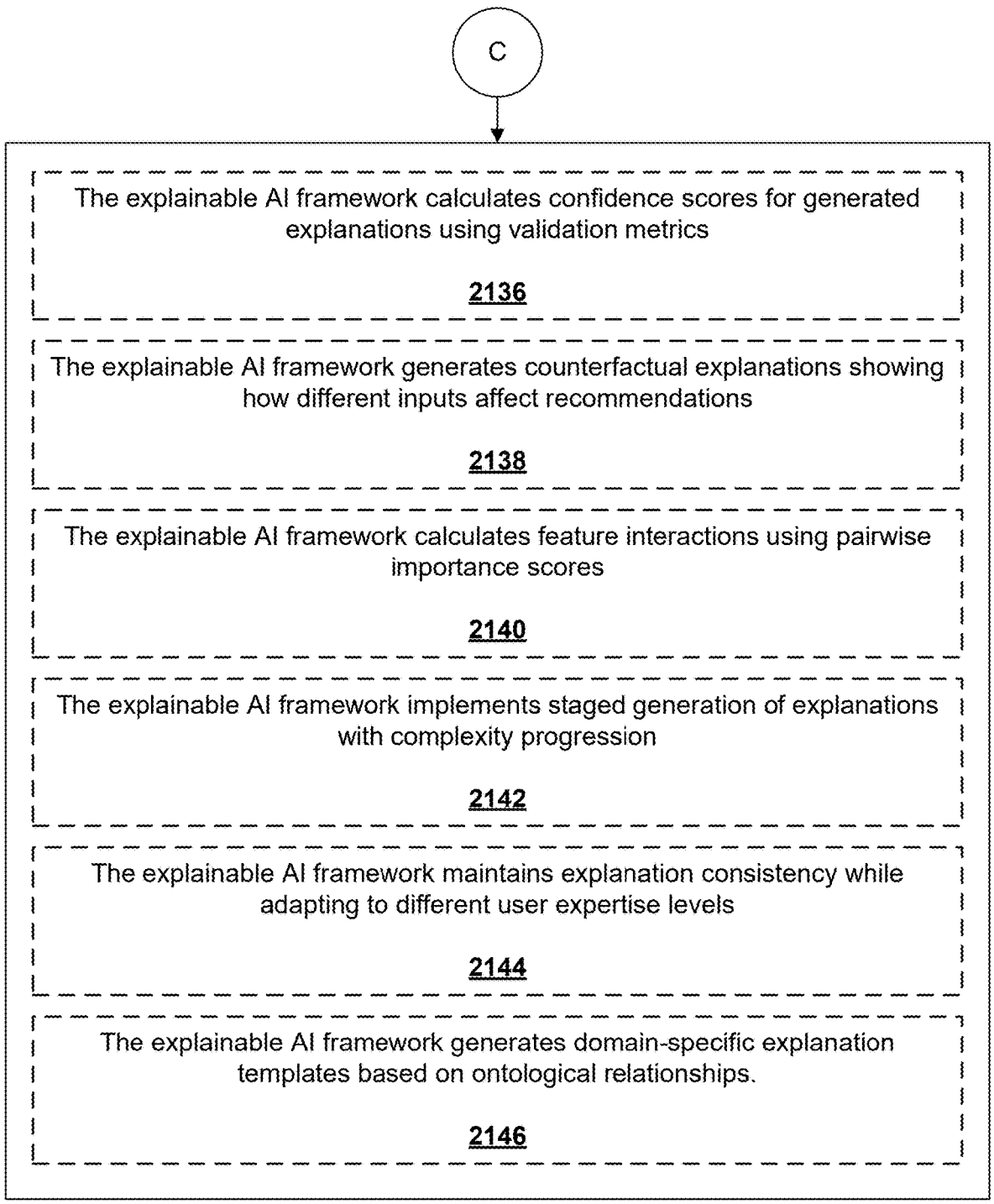

Referring next to FIG. 21D, in some embodiments, the explainable AI 122 calculates (2136) confidence scores for generated explanations using validation metrics through the confidence engine 1016. In some embodiments, the explainable AI 122 generates (2138) counterfactual explanations showing how different inputs affect recommendations through the explanation generator 428. In some embodiments, the explainable AI 122 calculates (2140) feature interactions using pairwise importance scores through SHAP analysis 124. In some embodiments, the explainable AI 122 implements (2142) staged generation of explanations with complexity progression through the visualization adaptation system 918. In some embodiments, the explainable AI 122 maintains (2144) explanation consistency while adapting to different user expertise levels through the multi-level explanation engine 908. In some embodiments, the explainable AI 122 generates (2146) domain-specific explanation templates based on ontological relationships through the explanation generator 428.

Example Cross-Domain Ontology Integration System

In some embodiments, the ontology integration layer 114 maintains concurrent domain-specific knowledge bases 304 through the core ontology framework 302. The system implements cross-domain relationships 306 using semantic similarity algorithms within a hypergraph data structure where nodes represent concepts and hyperedges connect multiple nodes across domains. This enables efficient multi-domain queries without duplicating data or flattening ontological hierarchies.

In some embodiments, the relationship mapping engine within the domain mapping component 312 identifies semantic similarities between concepts using vector representations in a multidimensional similarity matrix. The system calculates similarity scores for attribute pairs across domains and establishes validated mappings when scores exceed predetermined thresholds. For example, when comparing skill and role pairs that share less than 20% semantic similarity based on cosine distance, the system applies dimensionality reduction techniques like Principal Component Analysis (PCA) to compress the matrix while retaining key relationships. In some embodiments, the semantic similarity algorithms implement density-based spatial clustering with calculated epsilon values, for example: technical domains: eps=0.3 (enables tighter clustering for precise skills), and soft skills domains: eps=0.5 (allows looser clustering for transferable skills). The reward function for career transitions uses empirically determined weights, for example: w1=0.4 (salary gain); w2=0.3 (growth potential); and w3=0.3 (market demand). In some embodiments, the spectral clustering overlay uses an adaptive kernel bandwidth σ=median distance*scaling factor, where scaling factor adapts between 0.1 and 0.3 based on cluster density to optimize clustering quality.

In some embodiments, the domain extension mechanism detects emerging domains through the feedback loop 722. The system creates new domain-specific ontology structures using hierarchical clustering algorithms that group similar attributes, validates clusters at different levels, and establishes initial cross-domain mappings through cluster analysis while generating explanations for discovered relationships.

In some embodiments, the semantic similarity algorithms identify non-obvious relationships between skills across different industries through the cross-domain mapping 118. The system detects implicit domain connections using transitivity analysis with a minimum distance preservation constraint of 0.85 in the reduced space, validates cross-domain skill equivalencies through multiple verification sources, and supports explanation generation through the visualization adaptation system 918.

In some embodiments, the relationship mapping engine within the domain mapping component 312 maintains bidirectional mappings between domain concepts. The system tracks relationship confidence scores using an adjacency tensor representation, enabling O(1) lookup time for connected nodes. Each hyperedge maintains weight vectors representing relationship strengths across different domains, updated through gradient descent with a learning rate of 0.01. The system provides comprehensive relationship evidence through the visualization adaptation system 918 and updates mappings based on emerging patterns detected through learning subsystem 1200.

In some embodiments, the cross-domain explanation generator within the visualization adaptation system 918 explains relationships between seemingly unrelated skills through multi-level explanation 908. The system provides evidence for cross-domain career recommendations by generating career timeline graphs with milestone markers showing skill transferability and domain transitions. The complexity adjustment 922 adapts explanation detail based on user expertise levels while maintaining consistent explanation quality across domain boundaries.

In some embodiments, the system establishes cross-domain relationships through a rigorous validation process implemented by the consistency check 314. The system validates relationships through multiple verification sources using the multi-tiered verification process 108, maintains relationship provenance through version tracking in the state management system 1400, and implements temporal vector clocks to maintain event ordering across components. The system detects contradictory relationship definitions through rule validation and conflict detection mechanisms.

In some embodiments, the domain reconciliation mechanism within the core ontology framework 302 resolves conflicting concept definitions across domains using Conflict-Free Replicated Data Types (CRDTs). The system maintains consistent skill taxonomies across industries through the cross-domain mapping 118, preserves domain-specific context through knowledge bases 304, and generates explanations for reconciliation decisions through the explanation generator 428.

In some embodiments, the domain extension mechanism within the core ontology framework 302 detects emerging skill clusters across domains through pattern recognition 1210 in the learning subsystem 1200. The system validates new domain boundaries using density-based spatial clustering (DBSCAN) with epsilon calculation based on k-distance graphs. For technical domains, the system uses a tighter clustering with eps=0.3, while soft skills domains use eps=0.5 for looser clustering. The system establishes initial cross-domain skill mappings through cluster analysis and explains domain extension rationales through the explanation generator 428.

In some embodiments, the cross-domain learning mechanism implemented through the learning subsystem 1200 identifies transferable skills across domains using semantic similarity algorithms. The system calculates skill similarity metrics through feature processing 1002 and implements a Career Velocity Index (CVI) that measures progression rates based on skills acquisition, role transitions, and industry shifts. Dynamic time warping (DTW) algorithms compare individual CVI scores against similar user trajectories to explain skill transferability rationales.

In some embodiments, the system implements cross-domain career path mapping through the visualization adaptation system 918. The career path visualization 1610 displays multiple potential paths with annotations providing projected benefits, expected salary ranges, and skill growth potential through content integration 930. The system analyzes skill transferability using natural language generation tailored to each expertise level, with template-based generation adapting complexity based on user expertise scores.

In some embodiments, the domain expertise modeling component within the user profile manager 902 maps expertise levels across domains using predefined criteria. The system identifies prerequisite skill relationships through hierarchical clustering, calculates expertise equivalencies using composite metrics, and explains expertise level mappings through multi-level explanation 908. This enables accurate progression tracking and personalized recommendations across different domains.

In some embodiments, the system maintains cross-domain relationship consistency through the consistency check 314. The system validates relationship transitivity by ensuring that if skill A relates to skill B and skill B relates to skill C across different domains, the relationship between A and C is logically consistent. The hierarchical relationship preservation ensures that domain-specific skill hierarchies remain intact when mapped across industries. The system detects circular dependencies using graph analysis algorithms and generates explanations for validation decisions through the explanation generator 428.

In some embodiments, the emerging trend detection mechanism within the learning subsystem 1200 identifies new cross-domain skill patterns using pattern recognition 1210. The system processes trends through trend analysis 1110, implementing a multi-tiered trend weighting mechanism that applies Bayesian temporal smoothing: weight(t) =base weight*exp($-\lambda \Delta t$)*confidence factor. Different trend types use varying decay rates: market trends ($\lambda$=0.1), skill relevance ($\lambda$=0.05), and career transitions ($\lambda$=0.02). The system validates trend significance through impact assessment 1212 and explains implications through the explanation generator 428.

In some embodiments, the system maintains comprehensive metrics through the performance monitoring system 1100. The system tracks cross-domain relationship metrics including semantic similarity scores, confidence levels, and usage patterns. The analysis engine 1108 monitors skill equivalency mappings and domain transition patterns while maintaining explanation templates for different relationship types through the explanation generator 428.

In some embodiments, the recommendation context generator within the explanation generator 428 provides cross-domain context for recommendations using multi-level explanation 908. The system explains domain transition rationales by generating skill development paths through career path visualization 1610. The visualization adaptation system 918 adapts explanations for cross-domain recommendations based on user expertise levels while maintaining explanation consistency across domains.

In some embodiments, the system supports comprehensive multi-domain career planning through the career guidance interface 1600. The interface displays career path visualization 1610 showing multiple potential paths branching across different domains. Each path incorporates skill development requirements, projected timelines, and expected outcomes. The system analyzes career transitions using Markov Decision Processes (MDP) to model optimal transition points, with state space S={skills, roles, industry position, career stage} and action space A={upskill, role change, industry transition}. The reward function balances multiple factors: R(s, a)=w1*salary gain+w2*growth potential+w3*market demand, where w1=0.4, w2=0.3, and w3=0.3 ensure balanced recommendations.

In some embodiments, the system implements cross-industry skill development through the ontology management layer 114. The system tracks skill evolution across industries using updates 116, enabling identification of emerging skill requirements and cross-industry applications. The domain adaptation layer 712 ensures skills are properly contextualized for different industries while maintaining their core meaning and relationships. In some embodiments, the system provides domain transition guidance through the visualization adaptation system 918. The system generates personalized transition plans showing required skill acquisitions, certification paths, and experience milestones. The chart selection 920 presents this information through interactive career timeline graphs that users can explore at different detail levels through interactive elements 924.

FIGS. 22A-22E show a flowchart of an example method 2200 for cross-domain ontology integration in explainable AI environments, according to some embodiments. The ontology integration layer 114 maintains (2202) concurrent domain-specific knowledge bases 304 through the core ontology framework 302. The system implements (2204) cross-domain relationships 306 using semantic similarity algorithms within a hypergraph data structure where nodes represent concepts and hyperedges connect multiple nodes across domains. The system maps (2206) skills, certifications, and domain concepts across industry boundaries. The relationship mapping engine within the domain mapping component 312 identifies (2208) semantic similarities between concepts across different domain ontologies. The domain extension mechanism within the core ontology framework 302 detects (2210) emerging domains through the feedback loop 722 and establishes initial cross-domain mappings.

Referring next to FIG. 22B, in some embodiments, the semantic similarity algorithms implement (2212) density-based spatial clustering (DBSCAN) with epsilon calculation based on k-distance graphs, using eps=0.3 for technical domains and eps=0.5 for soft skills domains. In some embodiments, the system implements (2214) Markov Decision Process modeling for career transitions with state space S={skills, roles, industry position, career stage}, with action space (2216) A={upskill, role change, industry transition}. The reward function balances (2218) salary gain, growth potential, and market demand. In some embodiments, the reward function is calculated (2220) using R(s, a)=w1*salary gain+w2*growth potential+w3*market demand, where w1=0.4, w2=0.3, and w3=0.3. In some embodiments, the relationship mapping engine within the domain mapping component 312 maintains (2222) bidirectional mappings between domain concepts using an adjacency tensor representation, enabling O(1) lookup time for connected nodes. In some embodiments, the system implements (2224) hypergraph-based relationship tracking through cross-domain relationships 306, with weight vectors updated through gradient descent.

Figure 22A:
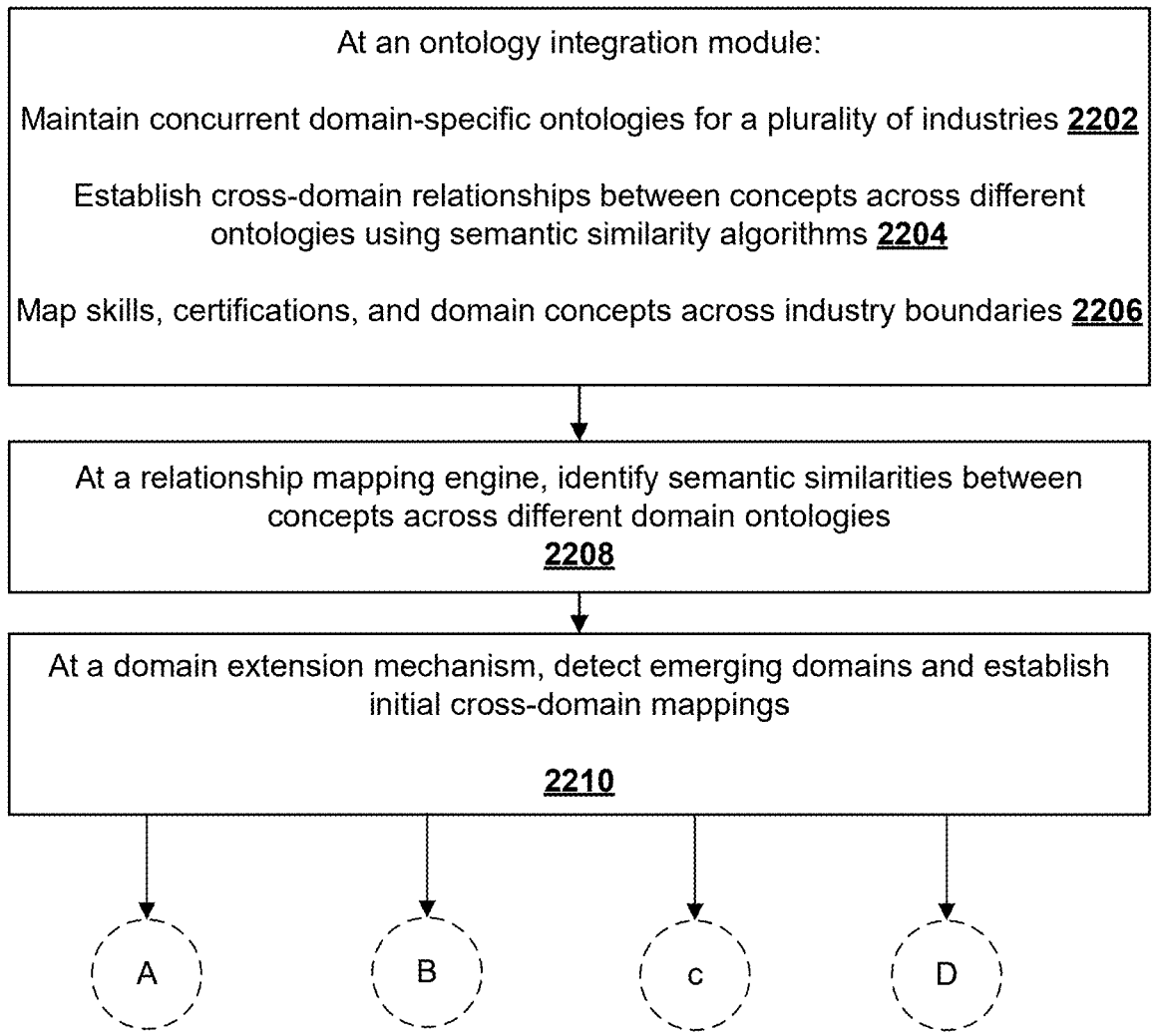
Figure 22C:
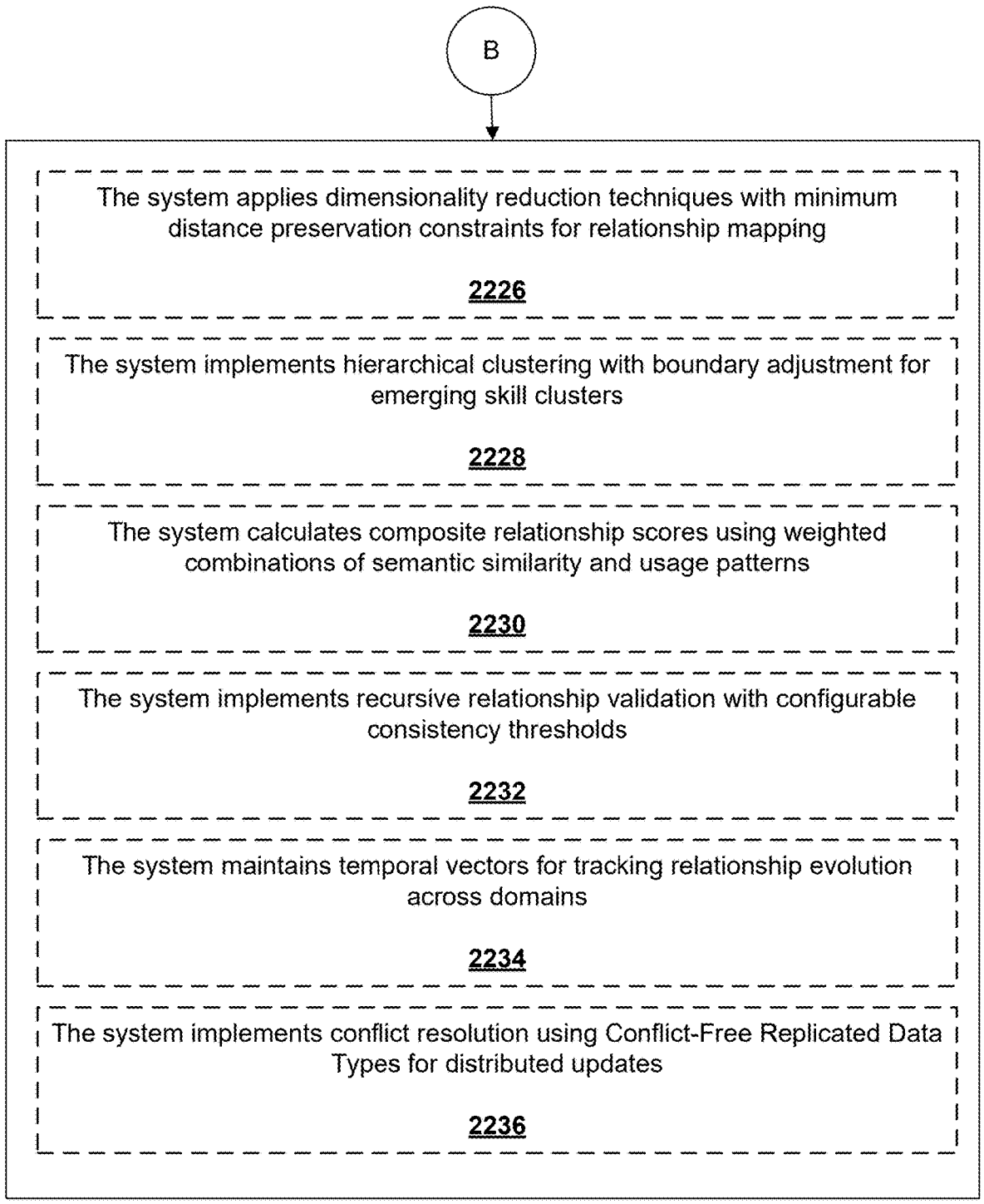

Referring next to FIG. 22C, in some embodiments, the system applies (2226) dimensionality reduction techniques with a minimum distance preservation constraint of 0.85 in the reduced space for relationship mapping. In some embodiments, the system implements (2228) hierarchical clustering with boundary adjustment through the domain mapping component 312 for emerging skill clusters. In some embodiments, the system calculates (2230) composite relationship scores using weighted combinations of semantic similarity and usage patterns through the cross-domain relationships 306. In some embodiments, the system implements (2232) recursive relationship validation with configurable consistency thresholds through the consistency check 314. In some embodiments, the system maintains (2234) temporal vectors through the state management system 1400 for tracking relationship evolution across domains. In some embodiments, the system implements (2236) conflict resolution using Conflict-Free Replicated Data Types (CRDTs) through the domain mapping component 312 for updates.

Figure 22D:
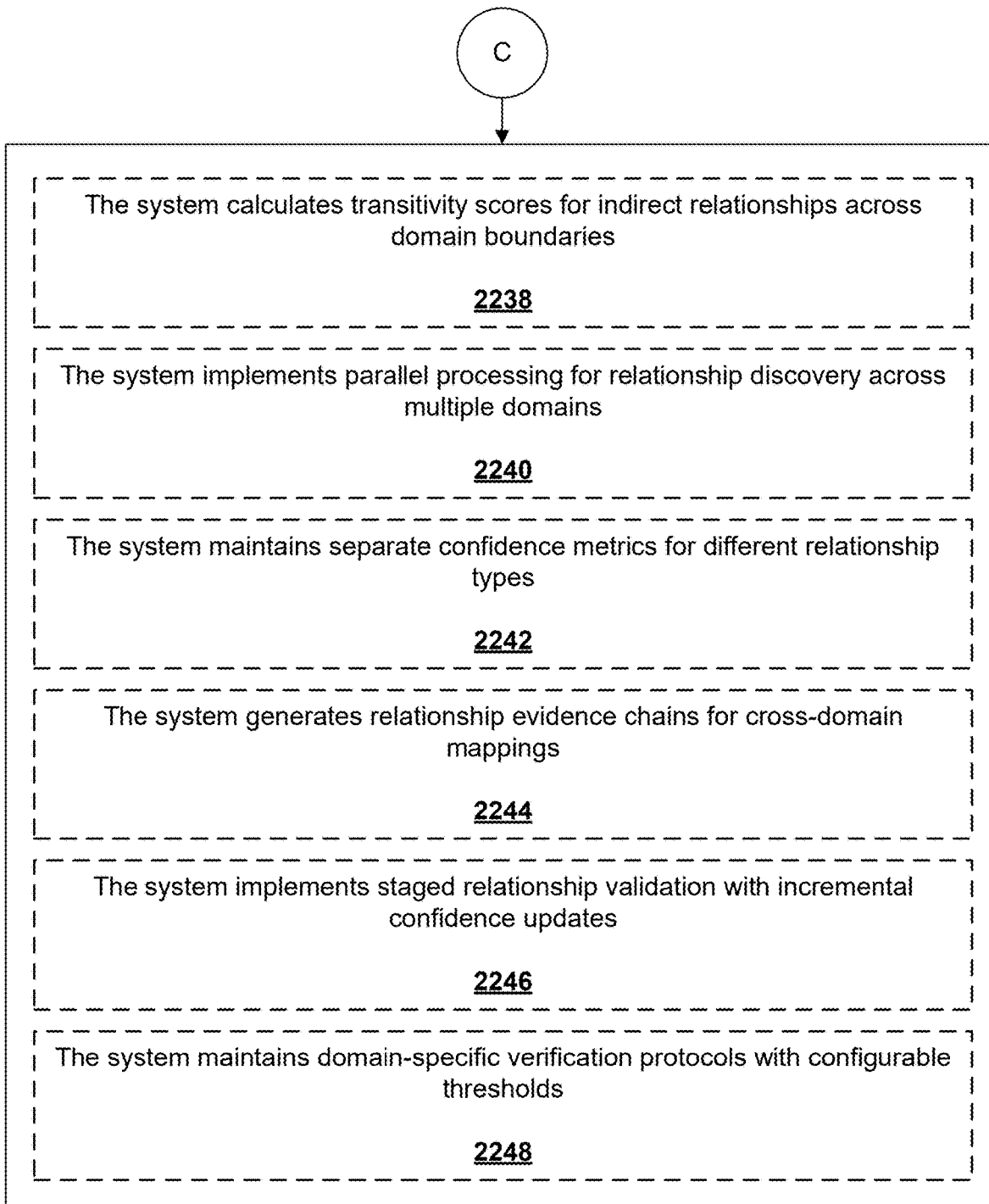

Referring next to FIG. 22D, in some embodiments, the system calculates (2238) transitivity scores for indirect relationships across domain boundaries through cross-domain relationships 306. In some embodiments, the system implements (2240) parallel processing for relationship discovery across multiple domains through the domain mapping component 312. In some embodiments, the system maintains (2242) separate confidence metrics for different relationship types through cross-domain relationships 306. In some embodiments, the system generates (2244) relationship evidence chains for cross-domain mappings through the explanation generator 428. In some embodiments, the system implements (2246) staged relationship validation with incremental confidence updates through the consistency check 314. In some embodiments, the system maintains (2248) domain-specific verification protocols with configurable thresholds through knowledge bases 304.

Figure 22E:
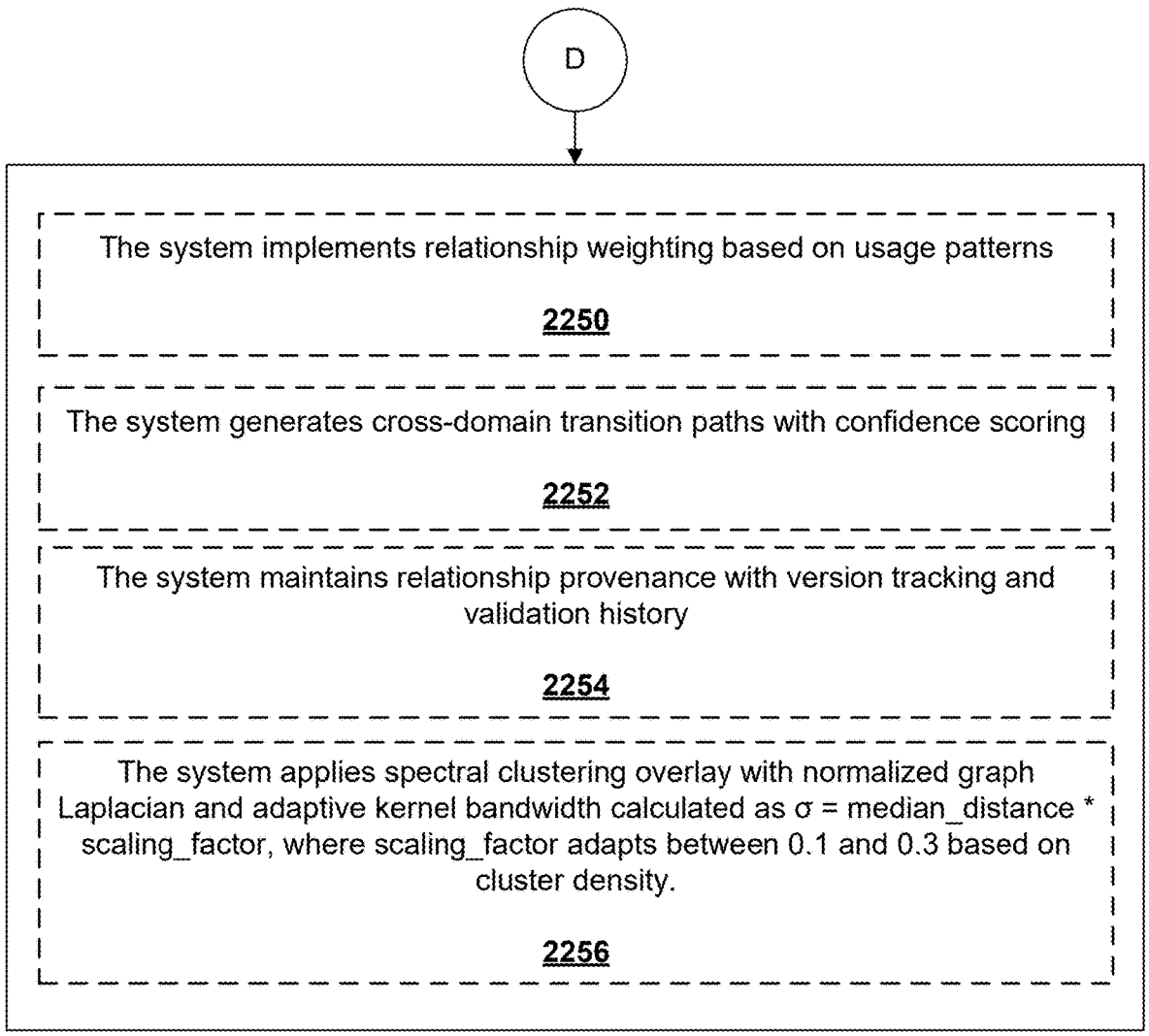

Referring next to FIG. 22E, in some embodiments, the system implements (2250) relationship weighting based on usage patterns through cross-domain relationships 306. In some embodiments, the system generates (2252) cross-domain transition paths with confidence scoring through the visualization adaptation system 918. In some embodiments, the system maintains (2254) relationship provenance with version tracking and validation history through the state management system 1400. In some embodiments, the system applies (2256) spectral clustering overlay with normalized graph Laplacian and adaptive kernel bandwidth calculated as σ=median distance*scaling factor, where scaling factor adapts between 0.1 and 0.3 based on cluster density.

Example Inter-Component Communication and Synchronization System

In some embodiments, the orchestration layer, implemented through the secure API layer 134, manages secure communication protocols between all system components. This layer ensures interaction between the data verification subsystem 106, ontology management layer 114, and explainable AI 122 while maintaining data privacy and system security. In some embodiments, the system performs data validation across component boundaries through the integration hub 1502. The communication protocol layer 1514 employs protocol buffers for efficient data serialization and transmission, achieving optimal performance while maintaining data integrity. Each component connects through specialized connectors: data verification 1506, ontology management 1508, XAI framework 1510, and API layer 1512.

In some embodiments, the system maintains synchronization between subsystems using a distributed message broker 1504. This broker implements partitioned topics with configurable specifications including a 15-day retention period, 15-second scrape interval, and recording rules for aggregated metrics across 5-minute rate windows, 1-hour averages, and 24-hour trends. In some embodiments, the system enables secure transmission of explanation data and recommendation context through multi-layered security protocols 136. Data security layer 1328 implements encryption at rest using AES-256-GCM and data in transit using TLS 1.3 with perfect forward secrecy, with 90-day key rotation. In some embodiments, the system implements adaptive resource allocation based on component interaction patterns through the analysis engine 1108. Performance monitoring 1224 tracks evaluation metrics, enabling adjustment of resource allocation based on usage patterns and system load. In some embodiments, the secure API layer 134 supports data ingestion through cross-platform synchronization 138. The system processes incoming user profiles, job market data, and skill ontologies while adjusting recommendations based on new information through the recommendations and explanations 132. In some embodiments, the system achieves bounded convergence times, for example, $99^{th}$ percentile within 500 milliseconds for standard operations, and $99.9^{th}$ percentile within 1000 milliseconds for complex operations. Load balancing maintains a maximum imbalance factor of 1.25 across nodes, determined through load testing to optimize resource utilization while maintaining system stability. Real-time processing can include, for example: core operations: <100 milliseconds latency, complex operations: <500 milliseconds latency, and batch operations: <1,000 milliseconds latency.

In some embodiments, the system implements multi-layered security protocols through the security architecture 1300. The perimeter security layer 1302 includes DDOS protection 1304, firewall rules 1306, and threat detection 1310. The authentication system 1312 implements multi-factor authentication 1316 and token management 1314 using JWT with configurable expiration (default: 1 hour) and refresh tokens (14-day validity). The system ensures compliance with data privacy regulations including GDPR through comprehensive audit trails and compliance monitoring 1340. In some embodiments, the secure API layer 134 integrates diverse data streams through the cross-platform synchronization 138. The system processes user data, job market information, and ontological updates through asynchronous processing queues. This integration enables contextually relevant domain-specific recommendations while achieving a 30-40% reduction in processing latency compared to conventional architectures, while maintaining 20% lower CPU usage through optimized load balancing.

In some embodiments, the secure API layer 134 implements a mechanism for integrating and synchronizing user data across career platforms through cross-platform synchronization 138. The system maintains data consistency using Conflict-Free Replicated Data Types (CRDTs), allowing each component to independently update state and converge without central authority. CRDT convergence mechanisms utilize version vectors with dotted version vectors for causality tracking (achieving 99th percentile convergence within 500 milliseconds, in some instances). In some embodiments, the secure API layer 134 includes an interface that processes data streams through the API request handler 502. The system implements load balancing with adaptive routing through request validation 504 and rate limiting 506. The architecture uses consistent hashing for session persistence, maintaining a maximum load imbalance factor of 1.25 across nodes. In some embodiments, the secure API layer 134 processes incoming data streams through the response handler 528. The system orchestrates machine-learning models through the integration layer 1008, generating tailored recommendations while maintaining response formatting 530 and encryption 532 for secure data transmission.

In some embodiments, the secure API layer 134 captures and routes user feedback through a feedback processing pipeline. The system sends feedback directly to the data verification subsystem 106, where it enters as unstructured data 104 for processing. This creates a learning cycle through the feedback loop 146 that enables system-wide refinement. The verification subsystem 106 processes this feedback through the same rigorous multi-tiered verification process 108 as other incoming data, ensuring data quality and relevance. In some embodiments, the secure API layer 134 implements a comprehensive feedback processing mechanism through the learning subsystem 1200. The system prepares user interaction data for re-ingestion through feedback analysis 1208, which includes pattern recognition 1210 and impact assessment 1212. Data routing capabilities maintain learning loops through feedback loops 146, while data quality assessment ensures feedback validity through performance monitoring 1224. In some embodiments, the secure API layer 134 implements domain-specific adaptations through specialized protocols. The system supports varied data formats and protocols through the communication protocol layer 1514, implements industry-specific security requirements through security protocols 136, and maintains separate authentication mechanisms for different domains through the authentication system 1312. This architecture enables secure cross-domain data sharing while preserving privacy controls through the data security layer 1328.

In some embodiments, the feedback loop 146 implements one or more refinement mechanisms. The system processes user interactions from external applications 144, maintaining data flows between components through the integration hub 1502. Updates to recommendations occur through the recommendations and explanations 132, while the system tracks impact through performance monitoring 1224 and adjusts component interactions based on metrics from the analysis engine 1108. In some embodiments, the feedback loop 146 maintains separate processing pipelines for different domains through the learning subsystem 1200. Each domain has its own dedicated feedback analysis 1208 mechanisms that understand domain-specific contexts and requirements. The system enables cross-domain learning through pattern recognition 1210, identifying successful patterns in one domain that might apply to others. The refinement mechanisms adapt to domain-specific requirements through specialized model refinement 1216, while performance monitoring 1224 tracks separate metrics for each domain.

In some embodiments, the system implements a domain configuration module through the domain adaptation layer 712. This module adapts system components to new domains by analyzing domain characteristics and requirements through context analysis 706. The system manages domain-specific settings through industry mapping 714 and maintains separate processing pipelines through domain adaptation 712, ensuring each domain receives appropriate handling while still enabling cross-domain integration where beneficial. In some embodiments, the system implements a domain configuration approach that coordinates all major components. The data verification subsystem 106 receives domain-specific configuration for data validation rules. The ontology management layer 114 adapts its relationship mapping based on domain requirements. The explainable AI 122 customizes its explanation generation for domain appropriateness. The security protocols 136 implement domain-specific controls, and the feedback mechanisms adapt to domain-specific needs through the feedback loop 146.

In some embodiments, the feedback loop 146 implements one or more bias monitoring and correction mechanisms. The system compares recommendation outcomes across different demographic groups through monitoring. When systematic bias is detected, the system adjusts model weights through the model refinement engine 1216. Bias correction mechanisms operate through the learning subsystem 1200, while bias monitoring metrics are maintained across all domains through performance monitoring 1224. In some embodiments, the feedback loop 146 incorporates unsuccessful outcomes through specialized handling mechanisms. The system treats negative outcomes as learning opportunities, using reinforcement learning mechanisms within the model refinement engine 1216. Counterfactual analysis examines alternative decision paths through the explainable AI 122, while the system adjusts model weights based on reported dissatisfaction. Historical records of recommendation failures are maintained through the state management system 1400 for improvement. In some embodiments, the system analyzes unsuccessful recommendations through pattern recognition 1210. The model refinement engine 1216 adjusts based on negative feedback, while the explainable AI 122 generates alternative recommendation paths through counterfactual analysis. The system maintains separate unsuccessful outcome tracking for each domain through performance monitoring 1224, enabling domain-specific improvements while identifying cross-domain patterns that might indicate systemic issues requiring attention.

FIGS. 23A-23D show a flowchart of an example method 2300 for orchestrating secure inter-component communication and synchronization in an explainable AI system, according to some embodiments. The orchestration layer, implemented through the secure API layer 134, manages (2302) secure communication protocols between all system components. This layer ensures interaction between the data verification subsystem 106, ontology management layer 114, and explainable AI 122 while maintaining data privacy and system security. The system performs (2306) data validation across component boundaries through the integration hub 1502. The communication protocol layer 1514 employs protocol buffers for efficient data serialization and transmission, thereby maintaining (2308) synchronization between subsystems. The system enables (2310) secure transmission of explanation data and recommendation context through multi-layered security protocols 136. The system implements (2312) adaptive resource allocation based on component interaction patterns through the analysis engine 1108.

Figure 23B:
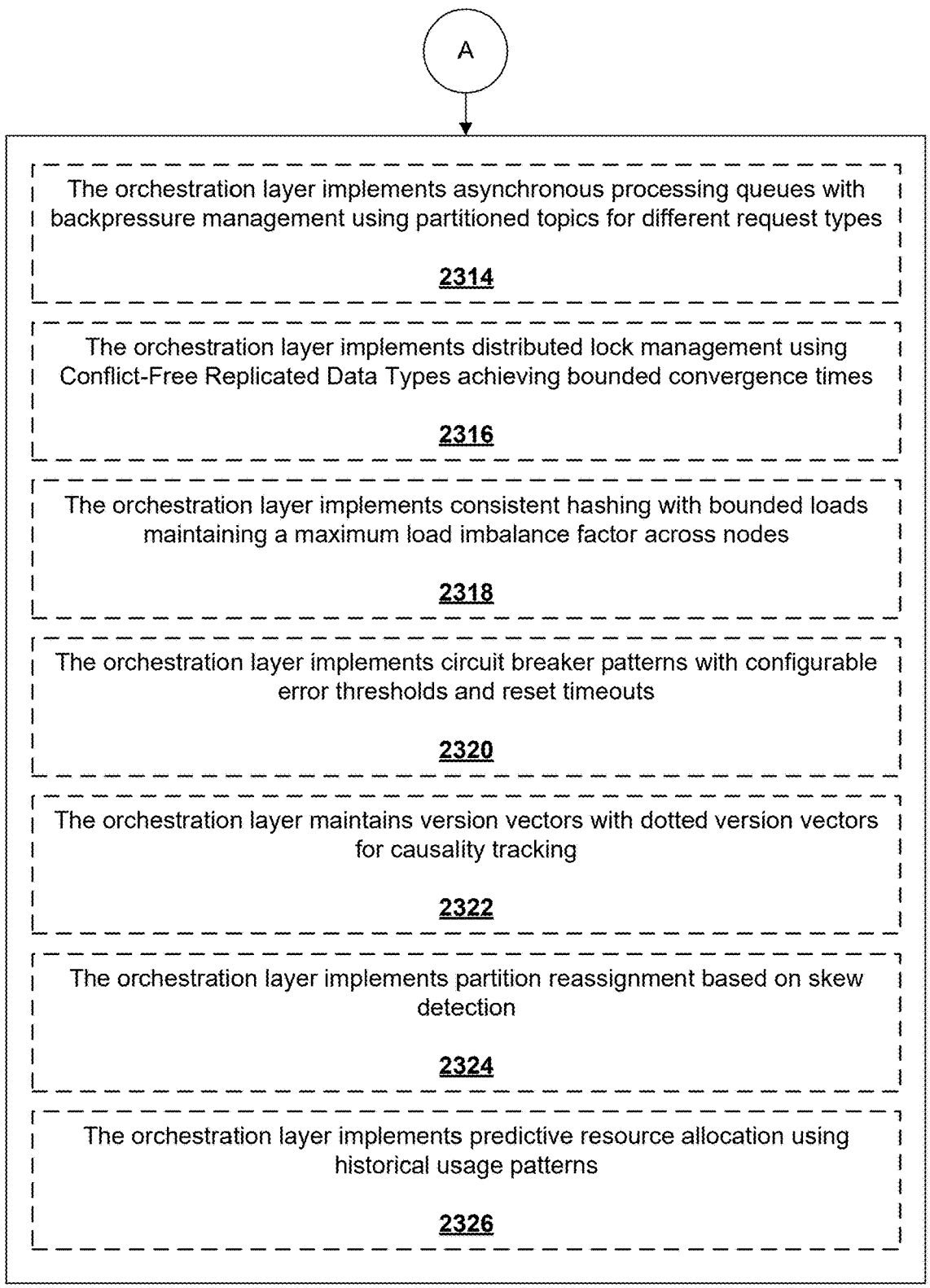

Referring next to FIG. 23B, in some embodiments, the secure API layer 134 implements (2314) asynchronous processing queues with backpressure management through the message broker 1504, using partitioned topics for different request types. In some embodiments, the communication protocol layer 1514 implements (2316) distributed lock management using Conflict-Free Replicated Data Types (CRDTs), achieving bounded convergence times (e.g., 99th percentile convergence within 500 milliseconds). In some embodiments, the secure API layer 134 implements (2318) consistent hashing for session persistence, maintaining a maximum load imbalance factor (e.g., 1.25) across nodes. In some embodiments, the secure API layer 134 implements (2320) circuit breaker patterns with configurable error thresholds and reset timeouts through cross-platform synchronization 138. In some embodiments, the communication protocol layer 1514 maintains (2322) version vectors with dotted version vectors for causality tracking through the message broker 1504. In some embodiments, the secure API layer 134 implements (2324) partition reassignment based on skew detection through cross-platform synchronization 138. In some embodiments, the layer 134 implements (2326) predictive resource allocation using historical usage patterns through the analysis engine 1108.

Figure 23C:
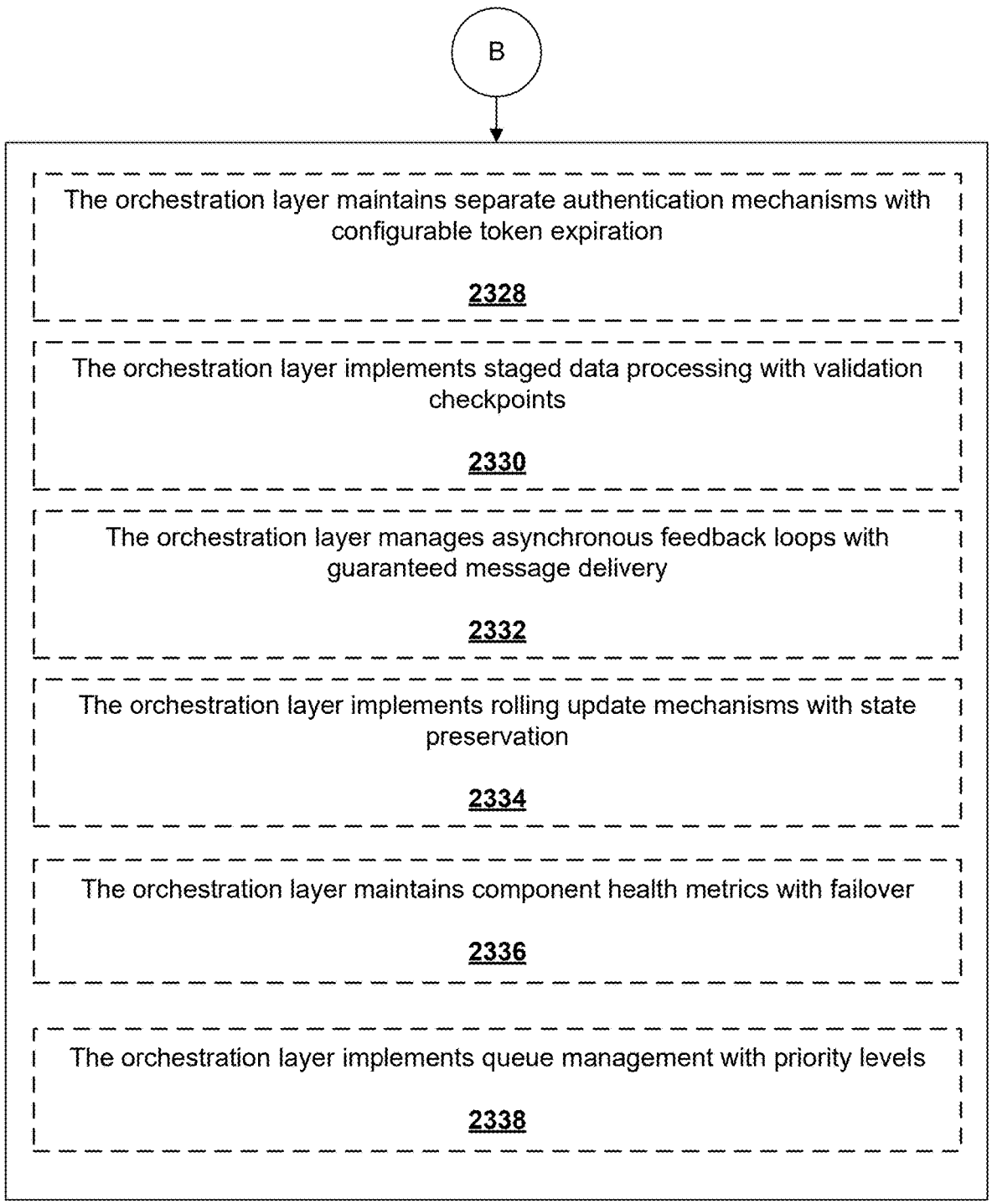

Referring next to FIG. 23C, in some embodiments, the secure API layer 134 maintains (2328) separate authentication mechanisms through the authentication system 1312, using JWT with configurable expiration. In some embodiments, the secure API layer 134 implements (2330) staged data processing with validation checkpoints through cross-platform synchronization 138. In some embodiments, the secure API layer 134 manages (2332) asynchronous feedback loops with guaranteed message delivery through the message broker 1504. In some embodiments, the secure API layer 134 implements (2334) rolling update mechanisms with state preservation through the state management system 1400. In some embodiments, the secure API layer 134 maintains (2336) component health metrics with failover through cross-platform synchronization 138. In some embodiments, the secure API layer 134 implements (2338) queue management with priority levels through the message broker 1504.

Figure 23D:
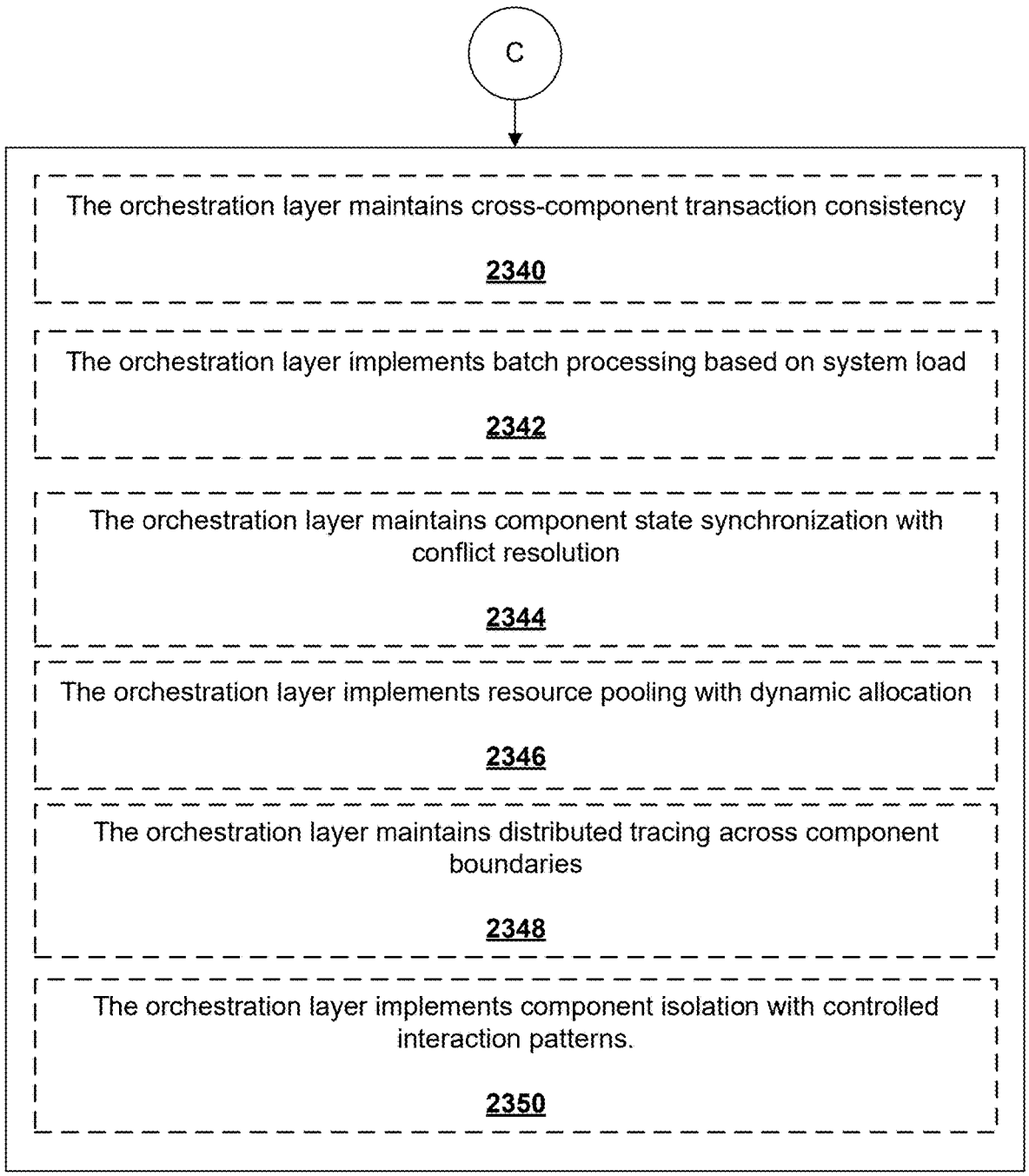

Referring next to FIG. 23D, in some embodiments, the secure API layer 134 maintains (2340) cross-component transaction consistency through the integration hub 1502. In some embodiments, the secure API layer 134 implements (2342) adaptive batch processing based on system load through cross-platform synchronization 138. In some embodiments, the secure API layer 134 maintains (2344) component state synchronization with conflict resolution through the state management system 1400. In some embodiments, the secure API layer 134 implements (2346) resource pooling with allocation through cross-platform synchronization 138. In some embodiments, the secure API layer 134 maintains (2348) distributed tracing across component boundaries through the integration hub 1502. In some embodiments, the secure API layer 134 implements (2350) component isolation with controlled interaction patterns through cross-platform synchronization 138.

Figure 24:
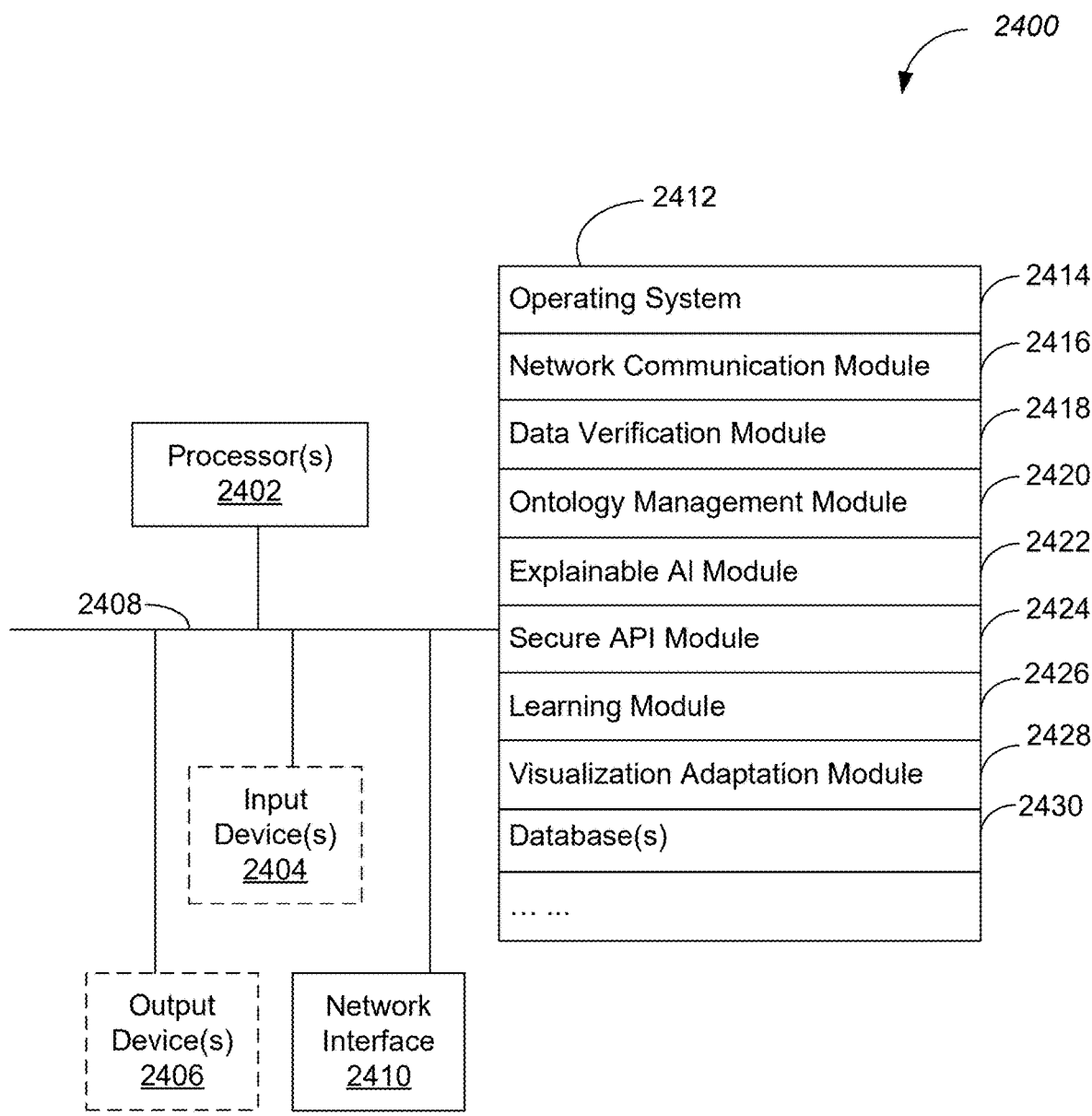
FIG. 24 shows a block diagram of an example computing device for implementing a configurable explainable AI platform, according to some embodiments.

FIG. 24 shows a block diagram of an example computing device 2400 for implementing a configurable explainable AI platform, according to some embodiments. The computing device 2400 can be used to implement the operations of the system 100. In particular, the various modules described above in reference to FIGS. 1-23D can be implemented using the various components shown in FIG. 24, according to some embodiments. Not all of the modules and/or data structures are required to implement the different embodiments described above.

The computing device 2400 includes one or more processors 2402 for executing instructions and processing data. These may include CPUs, GPUs, and/or specialized processors for tasks like natural language processing. The computing device 2400 also includes memory 2412, storage for data and instructions, which may include high-speed random access memory and non-volatile storage like solid-state drives. The computing device 2400 also includes a communication bus 2408, which may include one or more interconnects connecting the various hardware components, allowing data transfer between them. The computing device 2400 includes communication interface(s) 2410, which enable network connectivity, potentially including secure API endpoints, database connections, and wired or wireless connections for data transfer and cross-platform synchronization. The computing device 2400 may also include input devices 2404 and output devices 2406 for user interaction with the system.

In some embodiments, the memory 2412 includes high-speed random access memory, such as DRAM, SRAM, DDR RAM, and/or other random access solid state memory devices. In some embodiments, the memory 2412 includes non-volatile memory, such as one or more magnetic disk storage devices, optical disk storage devices, flash memory devices, or other non-volatile solid state storage devices. In some embodiments, the memory 2412 includes one or more storage devices remotely located from the processor(s) 2402. The memory 2412, or alternatively the non-volatile memory device(s) within the memory 2412, comprises a computer readable storage medium.

In some implementations, the memory 2412 stores the following programs, modules, and data structures, or a subset or superset thereof:

an operating system 2414, which manages system resources and provides platform support for the AI components;

- a network communications module 2416, which handles secure API communications and cross-platform synchronization;
- a data verification module 2418 (e.g., the data verification subsystem 106) for implementing multi-tier verification processes;
- an ontology management module 2420 (e.g., the ontology management 114) for maintaining cross-domain ontologies;
- an explainable AI module 2422 (e.g., the explainable AI 122) for generating recommendations;
- a secure API module 2424 (e.g., the secure API layer 134) for orchestrating inter-component communications;
- a learning module 2426 (e.g., the feedback loop 146) for feedback processing and model refinement;
- a visualization adaptation module 2428 (e.g., a module for visualizing the recommendations 142, the external applications and/or user interfaces 144) for generating user-appropriate explanations; and/or
- databases 2430 storing verified data, ontological relationships, user profiles, recommendation models, and/or recommendations.

Each of the above identified executable modules, applications, or sets of procedures may be stored in one or more of the previously mentioned memory devices, and corresponds to a set of instructions for performing a function described above. The above identified modules or programs need not be implemented as separate software programs, procedures, or modules, and thus various subsets of these modules may be combined or otherwise rearranged in various implementations. In some embodiments, the memory 2412 stores a subset of the modules and data structures identified above. Furthermore, in some embodiments, the memory 2412 stores additional modules or data structures not described above. Although FIG. 24 shows a computing device, it is intended more as a functional description of the various features that may be present rather than as a structural schematic of the implementations described herein. In practice, and as recognized by those of ordinary skill in the art, items shown separately could be combined and some items could be separated.

The present application discloses subject-matter in correspondence with the following numbered clauses:

(A1) A computer-implemented system for providing explainable recommendations, comprising: a data verification subsystem implementing a multi-tier consensus protocol for resolving conflicting information from a plurality of data sources; an ontology management module implementing one or more mechanisms for maintaining ontological consistency during updates while integrating cross-domain relationships; an explainable AI framework implementing adjustment of explanation complexity based on predefined user expertise categories; and an orchestration layer implementing secure communication protocols between the data verification subsystem, the ontology management module, and the explainable AI framework.

(B1) A computer-implemented system for providing explainable AI-powered domain-specific recommendations, comprising: a data ingestion subsystem configured to process multi-domain, unstructured data using context-aware natural language processing (NLP) models, perform contextual entity identification using machine learning algorithms, and implement a multi-tier data verification process to ensure data integrity and authenticity; an ontology management module configured to update and expand a multi-domain skill and domain-specific ontology using semantic similarity algorithms, integrate and reconcile ontologies across a plurality of industries, and provide updated ontological data to other system components; an explainable AI framework configured to generate domain-specific recommendations using interpretable machine learning models including decision trees and Bayesian inference, calculate feature importance using Shapley Additive explanations (SHAP) values to provide explainable rationales for suggestions, and utilize ontological data for enhanced recommendation accuracy; and a secure API layer configured to orchestrate a plurality of machine learning models for personalized domain-specific recommendations, implement multi-layered security protocols and role-based access control for data privacy compliance, facilitate cross-platform data synchronization and user profile enrichment, and enable secure communication between system components and external platforms.

(B2) The system as recited in clause B1, wherein the data ingestion subsystem is further configured to provide cleaned and structured data to the ontology management module, implement data categorization using NLP models specifically for ontology enrichment, and maintain data streams for ontology updates.

(B3) The system as recited in any of clauses B1-B2, wherein the data ingestion subsystem is further configured to collect and process unstructured data formats including job postings, certifications, and user profiles.

(B4) The system as recited in any of clauses B1-B3, wherein the context-aware NLP models are configured to understand a context identified in the processed text for skills and certifications beyond keyword extraction.

(B5) The system as recited in any of clauses B1-B4, wherein the data ingestion subsystem further comprises a cross-domain data normalization process configured to standardize data across diverse industries.

(B6) The system as recited in any of clauses B1-B5, wherein the data ingestion subsystem further comprises a customized relevance filtering process configured to categorize and prioritize incoming data sources based on factors including industry demand, geographic location, and job posting recency.

(B7) The system as recited in any of clauses B1-B6, wherein the multi-tier data verification process is configured to cross-reference incoming job postings and certifications with external databases and verified sources to identify potentially fraudulent or misleading data.

(B8) The system as recited in any of clauses B1-B7, wherein the data ingestion subsystem is further configured to apply context-aware NLP extraction and data prioritization through statistical models.

(B9) The system as recited in any of clauses B1-B8, wherein the data ingestion subsystem is further configured to transform raw, unstructured data into structured insights that the AI models can immediately utilize for accurate and personalized recommendations.

(B10) The system as recited in any of clauses B1-B9, wherein the data ingestion subsystem is further configured to process domain-specific unstructured data including career data, healthcare records, educational content, financial data, and e-commerce data; adapt NLP models to domain-specific vocabularies and contexts; and implement domain-specific data verification processes tailored to each industry's requirements.

(B11) The system as recited in any of clauses B1-B10, wherein the multi-tier data verification process is further configured to assign confidence scores to data points based on source reliability, historical accuracy, and relevance; apply consensus algorithms including majority voting and weighted averaging to resolve data discrepancies; and flag unresolved conflicts for human review or machine learning-based reconciliation.

(B12) The system as recited in any of clauses B1-B11, wherein the data ingestion subsystem is further configured to implement weighted averaging of confidence scores for conflicting skill requirements across multiple job postings; prioritize verified company websites over third-party data aggregators; and maintain an audit trail of conflict resolution decisions.

(B13) The system as recited in any of clauses B1-B12, wherein the ontology management module is further configured to map skills, certifications, job roles, and user profiles to the comprehensive, evolving ontology.

(B14) The system as recited in any of clauses B1-B13, wherein the semantic similarity algorithms are configured to identify and map relationships between seemingly unrelated skills and job roles.

(B15) The system as recited in any of clauses B1-B14, wherein the ontology management module further comprises a multi-domain ontology integration mechanism configured to merge and reconcile ontologies from a plurality of industries.

(B16) The system as recited in any of clauses B1-B15, wherein the ontology management module is further configured to employ machine learning models to enrich and expand the ontology based on processed input data.

(B17) The system as recited in any of clauses B1-B16, wherein the ontology management module further comprises a semantic analysis component configured to detect new relationships between skills and job roles, wherein the semantic analysis component is further configured to provide direct inputs to the explainable AI framework's decision trees and SHAP calculations for maintaining recommendation accuracy.

(B18) The system as recited in any of clauses B1-B17, wherein the ontology management module comprises an adaptive learning mechanism configured to update relationships between skills, job roles, and certifications based on job postings and labor market data changes.

(B19) The system as recited in any of clauses B1-B18, wherein the adaptive learning mechanism is further configured to adjust relationships between skills, job roles, and certifications based on incoming data and user interactions.

(B20) The system as recited in any of clauses B1-B19, wherein the ontology management module is further configured to process input data using machine learning models to enrich and expand the ontology, ensuring that career pathways and job recommendations align with the labor market trends.

(B21) The system as recited in any of clauses B1-B20, wherein the ontology management module is configured to provide ontological updates to the explainable AI framework; enable recalibration of recommendation models based on ontology changes; and maintain traceable relationships between ontological elements and recommendation decisions.

(B22) The system as recited in any of clauses B1-B21, wherein the ontology management module is further configured to concurrently maintain a plurality of domain-specific ontologies; establish cross-domain relationships between different ontologies; extend existing ontologies to incorporate new domains; and adapt semantic similarity algorithms to different industry contexts.

(B23) The system as recited in any of clauses B1-B22, wherein the explainable AI framework is further configured to provide explanations for each recommendation, detailing the reasoning behind suggestions for specific skills, jobs, or courses.

(B24) The system as recited in any of clauses B1-B23, wherein the explainable AI framework is further configured to provide explanations for recommendations across a plurality of domains; adapt explanation formats to domain-specific requirements; maintain consistency in explanation methodology across different applications; and generate domain-appropriate visualization of decision processes.

(B25) The system as recited in any of clauses B1-B24, wherein the explainable AI framework is further configured to support a plurality of recommendation types including career guidance, medical diagnostics, educational pathways, financial advice, and product recommendations; adapt feature importance calculations to domain-specific priorities; and implement domain-specific success metrics and evaluation criteria.

(B26) The system as recited in any of clauses B1-B25, wherein the decision trees are configured to generate interpretable recommendation processes that clearly show how different skills and experiences lead to a suggested job or course.

(B27) The system as recited in any of clauses B1-B26, wherein the SHAP values are configured to highlight the most significant factors contributing to a recommendation, providing users with a detailed breakdown of why the system made a specific suggestion.

(B28) The system as recited in any of clauses B1-B27, wherein the Bayesian inference models are configured to calculate the likelihood of success in specific job roles based on skill development.

(B29) The system as recited in any of clauses B1-B28, wherein the explainable AI framework is further configured to adapt explanations based on user feedback and interactions.

(B30) The system as recited in any of clauses B1-B29, wherein the explainable AI framework is further configured to show users how their skills, experiences, and preferences contributed to each recommendation decision.

(B31) The system as recited in any of clauses B1-B30, wherein the explainable AI framework is further configured to adapt AI models to regional job markets and linguistic variations for providing multi-language domain-specific recommendations.

(B32) The system as recited in any of clauses B1-B31, wherein the explainable AI framework is further configured to transmit recommendation data to the API layer, include contextual metadata with each recommendation for API processing, and maintain communication channels with the API layer for updates.

(B33) The system as recited in any of clauses B1-B32, wherein the explainable AI framework is configured to package recommendations with explainability data for API transmission, maintain recommendation consistency across a plurality of API endpoints, and enable recommendation updates through API channels.

(B34) The system as recited in any of clauses B1-B33, wherein the explainable AI framework is further configured to implement pre-processing data balancing techniques to ensure diverse representation; employ adversarial debiasing during model training; utilize fairness indicators for bias monitoring; and apply post-processing corrections based on disparate impact analysis.

(B35) The system as recited in any of clauses B1-B34, wherein the explainable AI framework is further configured to implement model distillation to convert models into interpretable forms; maintain layered explainability across a plurality of decision-making stages; utilize Local Interpretable Model-agnostic Explanations (LIME) for transparency; and generate hierarchical explanations that decompose decisions.

(B36) The system as recited in any of clauses B1-B35, wherein the system is further configured to generate simplified, interpretable models from larger ensemble models; maintain explanation consistency across different scales of operation; provide granular decision traces for each recommendation component; and implement progressive model complexity reduction techniques.

(B37) The system as recited in any of clauses B1-B36, wherein the explainable AI framework is further configured to maintain user expertise profiles for explanation customization; generate multi-tiered explanations based on user technical proficiency; employ natural language generation tailored to user expertise levels; and adjust explanation complexity based on user interaction patterns.

(B38) The system as recited in any of clauses B1-B37, wherein the system is further configured to categorize users into expertise tiers based on profile data and interactions; provide technical statistical insights for users; generate simplified explanations for non-technical users; and maintain consistent explanation quality across expertise levels.

(B39) The system as recited in any of clauses B1-B38, wherein the explainable AI framework is further configured to implement a multi-layered explanation system with expandable detail levels; generate initial high-level explanations with optional detailed expansions; integrate visual aids including decision trees and feature importance graphs; and maintain user-specific preferences for explanation detail levels.

(B40) The system as recited in any of clauses B1-B39, wherein the system is further configured to provide interactive explanation interfaces with depth-on-demand capabilities; generate visual representations of decision processes; maintain consistent explanation structures across different recommendation types; and implement user-controlled explanation detail thresholds.

(B41) The system as recited in any of clauses B1-B40, wherein the secure API layer is further configured to support data ingestion and analysis, adjusting recommendations based on new job market data or updates to user profiles.

(B42) The system as recited in any of clauses B1-B41, wherein the multi-layered security protocols are configured to ensure compliance with data privacy regulations including GDPR.

(B43) The system as recited in any of clauses B1-B42, wherein the secure API layer is further configured to integrate user data, job trends, and ontologies to provide contextually relevant domain-specific recommendations.

(B44) The system as recited in any of clauses B1-B43, wherein the secure API layer further comprises a mechanism for integrating and synchronizing user data across a plurality of career platforms.

(B45) The system as recited in any of clauses B1-B44, wherein the secure API layer comprises an interface configured to receive and process user data, job market information, and skill ontologies.

(B46) The system as recited in any of clauses B1-B45, wherein the secure API layer is further configured to process incoming user profiles, job market data, and skill ontologies, orchestrating machine-learning models to generate tailored recommendations.

(B47) The system as recited in any of clauses B1-B46, wherein the secure API layer is further configured to capture and route user feedback directly to the data ingestion subsystem, maintain feedback streams for system refinement, and enable data synchronization between external platforms and the data ingestion subsystem.

(B48) The system as recited in any of clauses B1-B47, wherein the secure API layer comprises a feedback processing mechanism configured to prepare user interaction data for re-ingestion, data routing capabilities for maintaining learning loops, and data quality assessment for feedback validation.

(B49) The system as recited in any of clauses B1-B48, wherein the secure API layer is further configured to support domain-specific data formats and protocols; implement industry-specific security requirements; maintain separate authentication and authorization mechanisms for different domains; and enable cross-domain data sharing with privacy controls.

(B50) The system as recited in any of clauses B1-B49, wherein the feedback loop is configured to refine domain-specific recommendations based on user feedback, ensuring personalized improvements over time.

(B51) The system as recited in any of clauses B1-B50, wherein the feedback loop is configured to refine domain-specific recommendations based on user feedback, maintain data flows between all system components, enable updates to recommendations based on new data, track an impact measured by changes in recommendation accuracy, and adjust component interactions based on performance metrics.

(B52) The system as recited in any of clauses B1-B51, wherein the feedback loop is configured to refine domain-specific recommendations based on user feedback; maintain separate feedback processing pipelines for different domains; enable cross-domain learning where applicable; adapt refinement mechanisms to domain-specific requirements; and track domain-specific performance metrics.

(B53) The system as recited in any of clauses B1-B52, further comprising a multi-language career recommendation engine configured to provide domain-specific recommendations in a plurality of languages, adapting AI models to regional job markets and linguistic variations.

(B54) The system as recited in any of clauses B1-B53, further comprising a user profile enrichment mechanism configured to enrich user profiles by extracting and incorporating new skills and qualifications from external data sources.

(B55) The system as recited in any of clauses B1-B54, wherein the system is further configured to adapt to emerging trends and provide recommendations that reflect current industry needs through learning and updating of its components.

(B56) The system as recited in any of clauses B1-B55, wherein the system is configured to facilitate career guidance across different domains and ensure versatility in skill applicability through its multi-domain ontology integration and cross-domain data normalization processes.

(B57) The system as recited in any of clauses B1-B56, further comprising a hybrid machine learning and statistical model configured to categorize and prioritize incoming data sources based on factors including industry demand, geographic location, and job posting recency.

(B58) The system as recited in any of clauses B1-B57, wherein the system is further configured to provide domain-specific recommendations across a plurality of career platforms while ensuring updates and consistent recommendations.

(B59) The system as recited in any of clauses B1-B58, wherein the system is further configured to perform data validation across component boundaries, synchronization between all subsystems, performance monitoring of component interactions, adjustment of inter-component communication patterns, and adaptive resource allocation based on component interaction patterns.

(B60) The system as recited in any of clauses B1-B59, further comprising a domain configuration module configured to adapt system components to new domains; manage domain-specific settings and parameters; facilitate cross-domain integration where applicable; and maintain separate processing pipelines for different domains.

(B61) The system as recited in any of clauses B1-B60, further comprising a domain configuration module configured to configure the data ingestion subsystem for a specific domain; adapt the ontology management module to domain-specific requirements; customize the explainable AI framework for domain-appropriate explanations; implement domain-specific security and privacy controls; and establish domain-appropriate feedback mechanisms.

(B62) The system as recited in any of clauses B1-B61, wherein the feedback loop is further configured to compare recommendation outcomes across different demographic groups; adjust model weights when systematic bias is detected; implement bias correction mechanisms; and maintain bias monitoring metrics across all domains.

(B63) The system as recited in any of clauses B1-B62, wherein the feedback loop is further configured to incorporate unsuccessful outcomes using reinforcement learning mechanisms; perform counterfactual analysis on negative recommendations; adjust model weights based on reported user dissatisfaction; and maintain historical records of recommendation failures for improvement.

(B64) The system as recited in any of clauses B1-B63, wherein the system is further configured to analyze patterns in unsuccessful recommendations; implement model adjustments based on negative feedback; generate alternative recommendation paths through counterfactual analysis; and maintain separate unsuccessful outcome tracking for each domain.

(C1) A computer-implemented method for providing explainable AI-powered domain-specific recommendations, comprising: processing multi-domain, unstructured data using context-aware natural language processing (NLP) models; performing contextual entity identification using machine learning algorithms; implementing a multi-tier data verification process to ensure data integrity and authenticity; updating and expanding a multi-domain skill and domain-specific ontology using semantic similarity algorithms; integrating and reconciling ontologies across various industries; generating domain-specific recommendations using interpretable machine learning models including decision trees and Bayesian inference; calculating feature importance using Shapley Additive explanations (SHAP) values to provide explainable rationales for suggestions; orchestrating a plurality of machine learning models for personalized domain-specific recommendations; implementing multi-layered security protocols and role-based access control for data privacy compliance; facilitating cross-platform data synchronization and user profile enrichment; and implementing a feedback loop integrating all steps, enabling refinement of recommendations by adapting to evolving domain-specific trends and user interactions.

(C2) The method as recited in clause (C1), further comprising providing cleaned and structured data for ontology management, implementing data categorization using NLP models specifically for ontology enrichment, and maintaining data streams for ontology updates.

(C3) The method as recited in any of clauses (C1)-(C2), further comprising collecting and processing unstructured data formats including job postings, certifications, and user profiles.

(C4) The method as recited in any of clauses (C1)-(C3), wherein the context-aware NLP models are configured to understand a context identified in the processed text for skills and certifications beyond keyword extraction.

(C5) The method as recited in any of clauses (C1)-(C4), further comprising standardizing data across diverse industries through cross-domain data normalization.

(C6) The method as recited in any of clauses (C1)-(C5), further comprising categorizing and prioritizing incoming data sources based on factors including industry demand, geographic location, and job posting recency.

(C7) The method as recited in any of clauses (C1)-(C6), further comprising cross-referencing incoming job postings and certifications with external databases and verified sources to identify potentially fraudulent or misleading data.

(C8) The method as recited in any of clauses (C1)-(C7), further comprising applying context-aware NLP extraction and data prioritization through statistical models.

(C9) The method as recited in any of clauses (C1)-(C8), further comprising transforming raw, unstructured data into structured insights that the AI models can immediately utilize for accurate and personalized recommendations.

(C10) The method as recited in any of clauses (C1)-(C9), further comprising: processing domain-specific unstructured data including career data, healthcare records, educational content, financial data, and e-commerce data; adapting NLP models to domain-specific vocabularies and contexts; and implementing domain-specific data verification processes tailored to each industry's requirements.

(C11) The method as recited in any of clauses (C1)-(C10), further comprising: assigning confidence scores to data points based on source reliability, historical accuracy, and relevance; applying consensus algorithms including majority voting and weighted averaging to resolve data discrepancies; and flagging unresolved conflicts for human review or machine learning-based reconciliation.

(C12) The method as recited in any of clauses (C1)-(C11), further comprising: implementing weighted averaging of confidence scores for conflicting skill requirements across multiple job postings; prioritizing verified company websites over third-party data aggregators; and maintaining an audit trail of conflict resolution decisions.

(C13) The method as recited in any of clauses (C1)-(C12), further comprising mapping skills, certifications, job roles, and user profiles to a comprehensive, evolving ontology.

(C14) The method as recited in any of clauses (C1)-(C13), further comprising identifying and mapping relationships between seemingly unrelated skills and job roles using semantic similarity algorithms.

(C15) The method as recited in any of clauses (C1)-(C14), further comprising merging and reconciling ontologies from multiple industries through multi-domain ontology integration.

(C16) The method as recited in any of clauses (C1)-(C15), further comprising employing machine learning models to enrich and expand the ontology based on processed input data.

(C17) The method as recited in any of clauses (C1)-(C16), further comprising: detecting new relationships between skills and job roles through semantic analysis; and providing direct inputs to decision trees and SHAP calculations for maintaining recommendation accuracy.

(C18) The method as recited in any of clauses (C1)-(C17), further comprising updating relationships between skills, job roles, and certifications based on job postings and labor market data changes.

(C19) The method as recited in any of clauses (C1)-(C18), further comprising adjusting relationships between skills, job roles, and certifications based on incoming data and user interactions.

(C20) The method as recited in any of clauses (C1)-(C19), further comprising processing input data using machine learning models to enrich and expand the ontology, ensuring career pathways and job recommendations align with labor market trends.

(C21) The method as recited in any of clauses (C1)-(C20), further comprising: providing ontological updates for recommendation generation; enabling recalibration of recommendation models based on ontology changes; and maintaining traceable relationships between ontological elements and recommendation decisions.

(C22) The method as recited in any of clauses (C1)-(C21), further comprising: concurrently maintaining multiple domain-specific ontologies; establishing cross-domain relationships between different ontologies; extending existing ontologies to incorporate new domains; and adapting semantic similarity algorithms to different industry contexts.

(C23) The method as recited in any of clauses (C1)-(C22), further comprising providing explanations for each recommendation, detailing the reasoning behind suggestions for specific skills, jobs, or courses.

(C24) The method as recited in any of clauses (C1)-(C23), further comprising: providing explanations for recommendations across multiple domains; adapting explanation formats to domain-specific requirements; maintaining consistency in explanation methodology across different applications; and generating domain-appropriate visualization of decision processes.

(C25) The method as recited in any of clauses (C1)-(C24), further comprising: supporting multiple recommendation types including career guidance, medical diagnostics, educational pathways, financial advice, and product recommendations; adapting feature importance calculations to domain-specific priorities; and implementing domain-specific success metrics and evaluation criteria.

(C26) The method as recited in any of clauses (C1)-(C25), further comprising creating interpretable recommendation processes that clearly show how different skills and experiences lead to suggested jobs or courses.

(C27) The method as recited in any of clauses (C1)-(C26), further comprising highlighting the most significant factors contributing to recommendations, providing users with detailed breakdowns of system decisions.

(C28) The method as recited in any of clauses (C1)-(C27), further comprising calculating likelihood of success in specific job roles based on skill development using Bayesian inference.

(C29) The method as recited in any of clauses (C1)-(C28), further comprising adapting explanations based on user feedback and interactions.

(C30) The method as recited in any of clauses (C1)-(C29), further comprising showing users how their skills, experiences, and preferences contributed to each recommendation decision.

(C31) The method as recited in any of clauses (C1)-(C30), further comprising adapting AI models to regional job markets and linguistic variations for providing multi-language domain-specific recommendations.

(C32) The method as recited in any of clauses (C1)-(C31), further comprising: transmitting recommendation data; including contextual metadata with each recommendation; and maintaining communication channels for updates.

(C33) The method as recited in any of clauses (C1)-(C32), further comprising: packaging recommendations with explainability data for transmission; maintaining recommendation consistency across multiple endpoints; and enabling recommendation updates.

(C34) The method as recited in any of clauses (C1)-(C33), further comprising: implementing pre-processing data balancing techniques to ensure diverse representation; employing adversarial debiasing during model training; utilizing fairness indicators for bias monitoring; and applying post-processing corrections based on disparate impact analysis.

(C35) The method as recited in any of clauses (C1)-(C34), further comprising: implementing model distillation to convert models into interpretable forms; maintaining layered explainability across multiple decision-making stages; utilizing Local Interpretable Model-agnostic Explanations (LIME) for transparency; and generating hierarchical explanations that decompose decisions.

(C36) The method as recited in any of clauses (C1)-(C35), further comprising: creating simplified, interpretable models from larger ensemble models; maintaining explanation consistency across different scales of operation; providing granular decision traces for each recommendation component; and implementing progressive model complexity reduction techniques.

(C37) The method as recited in any of clauses (C1)-(C36), further comprising adapting explanations based on user feedback and interactions.

(C38) The method as recited in any of clauses (C1)-(C37), further comprising showing users how their skills, experiences, and preferences contributed to each recommendation decision.

(C39) The method as recited in any of clauses (C1)-(C38), further comprising adapting AI models to regional job markets and linguistic variations for providing multi-language domain-specific recommendations.

(C40) The method as recited in any of clauses (C1)-(C39), further comprising: transmitting recommendation data; including contextual metadata with each recommendation; and maintaining communication channels for updates.

(C41) The method as recited in any of clauses (C1)-(C40), further comprising: packaging recommendations with explainability data for transmission; maintaining recommendation consistency across multiple endpoints; and enabling recommendation updates.

(C42) The method as recited in any of clauses (C1)-(C41), further comprising: implementing pre-processing data balancing techniques to ensure diverse representation; employing adversarial debiasing during model training; utilizing fairness indicators for bias monitoring; and applying post-processing corrections based on disparate impact analysis.

(C43) The method as recited in any of clauses (C1)-(C42), further comprising: implementing model distillation to convert models into interpretable forms; maintaining layered explainability across multiple decision-making stages; utilizing Local Interpretable Model-agnostic Explanations (LIME) for transparency; and generating hierarchical explanations that decompose decisions.

(C44) The method as recited in any of clauses (C1)-(C43), further comprising: creating simplified, interpretable models from larger ensemble models; maintaining explanation consistency across different scales of operation; providing granular decision traces for each recommendation component; and implementing progressive model complexity reduction techniques.

(C45) The method as recited in any of clauses (C1)-(C44), further comprising: maintaining user expertise profiles for explanation customization; generating multi-tiered explanations based on user technical proficiency; employing natural language generation tailored to user expertise levels; and adjusting explanation complexity based on user interaction patterns.

(C46) The method as recited in any of clauses (C1)-(C45), further comprising: categorizing users into expertise tiers based on profile data and interactions; providing technical statistical insights for users; generating simplified explanations for non-technical users; and maintaining consistent explanation quality across expertise levels.

(C47) The method as recited in any of clauses (C1)-(C46), further comprising: implementing a multi-layered explanation system with expandable detail levels; generating initial high-level explanations with optional detailed expansions; integrating visual aids including decision trees and feature importance graphs; and maintaining user-specific preferences for explanation detail levels.

(C48) The method as recited in any of clauses (C1)-(C47), further comprising: providing interactive explanation interfaces with depth-on-demand capabilities; generating visual representations of decision processes; maintaining consistent explanation structures across different recommendation types; and implementing user-controlled explanation detail thresholds.

(C49) The method as recited in any of clauses (C1)-(C48), further comprising supporting data ingestion and analysis, adjusting recommendations based on new job market data or updates to user profiles.

(C50) The method as recited in any of clauses (C1)-(C49), further comprising ensuring compliance with data privacy regulations including GDPR through multi-layered security protocols.

(C51) The method as recited in any of clauses (C1)-(C50), further comprising integrating user data, job trends, and ontologies to provide contextually relevant domain-specific recommendations.

(C52) The method as recited in any of clauses (C1)-(C51), further comprising integrating and synchronizing user data across multiple career platforms.

(C53) The method as recited in any of clauses (C1)-(C52), further comprising receiving and processing user data, job market information, and skill ontologies.

(C54) The method as recited in any of clauses (C1)-(C53), further comprising processing incoming user profiles, job market data, and skill ontologies to generate tailored recommendations.

(C55) The method as recited in any of clauses (C1)-(C54), further comprising: capturing and routing user feedback directly for data ingestion; maintaining feedback streams for system refinement; and enabling data synchronization between external platforms.

(C56) The method as recited in any of clauses (C1)-(C55), further comprising: preparing user interaction data for re-ingestion; routing data for maintaining learning loops; and performing data quality assessment for feedback validation.

(C57) The method as recited in any of clauses (C1)-(C56), further comprising: supporting domain-specific data formats and protocols; implementing industry-specific security requirements; maintaining separate authentication and authorization mechanisms for different domains; and enabling cross-domain data sharing with privacy controls.

(C58) The method as recited in any of clauses (C1)-(C57), further comprising refining domain-specific recommendations based on user feedback, ensuring personalized improvements over time.

(C59) The method as recited in any of clauses (C1)-(C58), further comprising: maintaining data flows between all system components; enabling updates to recommendations based on new data; tracking impact measured by changes in recommendation accuracy; and adjusting component interactions based on performance metrics.

(C60) The method as recited in any of clauses (C1)-(C59), further comprising: maintaining separate feedback processing pipelines for different domains; enabling cross-domain learning where applicable; adapting refinement mechanisms to domain-specific requirements; and tracking domain-specific performance metrics.

(C61) The method as recited in any of clauses (C1)-(C60), further comprising providing domain-specific recommendations in multiple languages, adapting to regional job markets and linguistic variations.

(C62) The method as recited in any of clauses (C1)-(C61), further comprising enriching user profiles by extracting and incorporating new skills and qualifications from external data sources.

(C63) The method as recited in any of clauses (C1)-(C62), further comprising adapting to emerging trends and providing recommendations that reflect current industry needs through learning and updating.

(C64) The method as recited in any of clauses (C1)-(C63), further comprising facilitating career guidance across different domains and ensuring versatility in skill applicability through multi-domain ontology integration and cross-domain data normalization.

(C65) The method as recited in any of clauses (C1)-(C64), further comprising categorizing and prioritizing incoming data sources based on industry demand, geographic location, and job posting recency using hybrid machine learning and statistical models.

(C66) The method as recited in any of clauses (C1)-(C65), further comprising providing domain-specific recommendations across multiple career platforms while ensuring updates and consistent recommendations.

(C67) The method as recited in any of clauses (C1)-(C66), further comprising: performing data validation across component boundaries; implementing synchronization between all subsystems; monitoring component interactions; adjusting inter-component communication patterns; and allocating resources adaptively based on component interaction patterns.

(C68) The method as recited in any of clauses (C1)-(C67), further comprising: adapting to new domains; managing domain-specific settings and parameters; facilitating cross-domain integration where applicable; and maintaining separate processing pipelines for different domains.

(C69) The method as recited in any of clauses (C1)-(C68), further comprising: configuring data ingestion for specific domains; adapting ontology management to domain-specific requirements; customizing explanations for domain appropriateness; implementing domain-specific security and privacy controls; and establishing domain-appropriate feedback mechanisms.

(C70) The method as recited in any of clauses (C1)-(C69), further comprising: comparing recommendation outcomes across different demographic groups; adjusting model weights when systematic bias is detected; implementing bias correction mechanisms; and maintaining bias monitoring metrics across all domains.

(D1) A non-transitory processor-readable medium storing code representing instructions to be executed by a processor, the code comprising code to: maintain, via the processor, ontological consistency during updates by implementing mechanisms that integrate cross-domain relationships; adjust, via the processor, explanation complexity based on predefined user expertise categories within an explainable AI framework; update and expand, via the processor, a multi-domain ontology using semantic similarity algorithms; integrate and reconcile, via the processor, ontologies across a plurality of industries; generate, via the processor, updated ontological data; provide, via the processor, the updated ontological data to the explainable AI framework; and enhance, via the processor and using the updated ontological data, recommendation accuracy and explanation generation within the explainable AI framework.

(D2) The non-transitory processor-readable medium as recited in clause (D1), further comprising code to cause the processor to: implement, via the processor, a hypergraph data structure where nodes represent concepts and hyperedges connect multiple nodes across domains; enable, via the processor and using the hypergraph data structure, fixed-time lookups for connected nodes; and maintain, via the processor, weight vectors within each hyperedge representing relationship strengths across different domains.

(D3) The non-transitory processor-readable medium as recited in any of clauses (D1)-(D2), further comprising code to cause the processor to: update, via the processor, the weight vectors through gradient descent with configurable learning rates; and calculate, via the processor, similarity scores using a multidimensional similarity matrix with dimensionality reduction preserving a minimum distance threshold between embedded concepts.

(D4) The non-transitory processor-readable medium as recited in any of clauses (D1)-(D3), further comprising code to cause the processor to: process, via the processor, incoming data through sliding window analysis using predetermined time intervals; and perform, via the processor, weighted averaging of data points within the sliding window analysis.

(D5) The non-transitory processor-readable medium as recited in any of clauses (D1)-(D4), further comprising code to cause the processor to: implement, via the processor, asynchronous processing queues for handling ontology updates; and maintain, via the processor, system responsiveness during the ontology updates.

(D6) The non-transitory processor-readable medium as recited in any of clauses (D1)-(D5), further comprising code to cause the processor to: implement, via the processor, vector-based comparison methods with configurable similarity thresholds for relationship detection.

(D7) The non-transitory processor-readable medium as recited in any of clauses (D1)-(D6), further comprising code to cause the processor to: maintain, via the processor, version history for ontological changes; and enable, via the processor, rollback capabilities for the ontological changes.

(D8) The non-transitory processor-readable medium as recited in any of clauses (D1)-(D7), further comprising code to cause the processor to: implement, via the processor, parallel processing for semantic similarity calculations across multiple domains.

(D9) The non-transitory processor-readable medium as recited in any of clauses (D1)-(D8), further comprising code to cause the processor to: buffer, via the processor, ontology updates using a staged update mechanism; and perform, via the processor, validation checks between stages of the staged update mechanism.

(D10) The non-transitory processor-readable medium as recited in any of clauses (D1)-(D9), further comprising code to cause the processor to: implement, via the processor, a conflict resolution protocol for handling contradictory relationships across domains.

(D11) The non-transitory processor-readable medium as recited in any of clauses (D1)-(D10), further comprising code to cause the processor to: maintain, via the processor, separate processing queues for different update types; and apply, via the processor, prioritization rules to the separate processing queues.

(D12) The non-transitory processor-readable medium as recited in any of clauses (D1)-(D11), further comprising code to cause the processor to: implement, via the processor, checkpointing mechanisms for maintaining consistency during updates.

(D13) The non-transitory processor-readable medium as recited in any of clauses (D1)-(D12), further comprising code to cause the processor to: calculate, via the processor, relationship strengths using configurable weighting factors across different relationship types.

(D14) The non-transitory processor-readable medium as recited in any of clauses (D1)-(D13), further comprising code to cause the processor to: implement, via the processor, distributed processing for parallel ontology updates across multiple nodes.

(D15) The non-transitory processor-readable medium as recited in any of clauses (D1)-(D14), further comprising code to cause the processor to: maintain, via the processor, an update log with timestamps and change metadata.

(D16) The non-transitory processor-readable medium as recited in any of clauses (D1)-(D15), further comprising code to cause the processor to: implement, via the processor, batched processing for bulk ontology updates; and perform, via the processor, consistency validation during the batched processing.

(D17) The non-transitory processor-readable medium as recited in any of clauses (D1)-(D16), further comprising code to cause the processor to: maintain, via the processor, separate threshold values for different relationship types within the semantic similarity algorithms.

(D18) The non-transitory processor-readable medium as recited in any of clauses (D1)-(D17), further comprising code to cause the processor to: implement, via the processor, incremental update mechanisms for processing changes to the ontology.

(D19) The non-transitory processor-readable medium as recited in any of clauses (D1)-(D18), further comprising code to cause the processor to: maintain, via the processor, index structures for accelerating relationship queries across domains.

(D20) The non-transitory processor-readable medium as recited in any of clauses (D1)-(D19), further comprising code to cause the processor to: process, via the processor, incoming data through sliding window analysis with exponential decay functions; prioritize, via the processor, recent market trends; and maintain, via the processor, historical stability during the processing.

(E1) A computer-implemented system for providing explainable recommendations, comprising: an ontology management module implementing mechanisms for maintaining ontological consistency during updates while integrating cross-domain relationships; an explainable AI framework implementing adjustment of explanation complexity based on predefined user expertise categories; and wherein the ontology management module is configured to: update and expand a multi-domain ontology using semantic similarity algorithms; integrate and reconcile ontologies across a plurality of industries; and provide updated ontological data to the explainable AI framework for enhancing recommendation accuracy and explanation generation.

(E2) The system as recited in any of clause (E1), wherein the ontology management module implements a hypergraph data structure where nodes represent concepts and hyperedges connect multiple nodes across domains, the hypergraph data structure enabling fixed-time lookups for connected nodes.

(E3) The system as recited in any of clauses (E1)-(E2), wherein each hyperedge maintains weight vectors representing relationship strengths across different domains, updated through gradient descent with configurable learning rates.

(E4) The system as recited in any of clauses (E1)-(E3), wherein the semantic similarity algorithms calculate similarity scores using a multidimensional similarity matrix with dimensionality reduction preserving a minimum distance threshold between embedded concepts.

(E5) The system as recited in any of clauses (E1)-(E4), wherein the ontology management module processes incoming data through sliding window analysis using predetermined time intervals and weighted averaging of data points.

(E6) The system as recited in any of clauses (E1)-(E5), wherein the ontology management module implements asynchronous processing queues for handling ontology updates while maintaining system responsiveness.

(E7) The system as recited in any of clauses (E1)-(E6), wherein the semantic similarity algorithms implement vector-based comparison methods with configurable similarity thresholds for relationship detection.

(E8) The system as recited in any of clauses (E1)-(E7), wherein the ontology management module maintains version history for ontological changes with rollback capabilities.

(E9) The system as recited in any of clauses (E1)-(E8), wherein the ontology management module implements parallel processing for semantic similarity calculations across multiple domains.

(E10) The system as recited in any of clauses (E1)-(E9), wherein the ontology management module buffers ontology updates using a staged update mechanism with validation checks between stages.

(E11) The system as recited in any of clauses (E1)-(E10), wherein the ontology management module implements a conflict resolution protocol for handling contradictory relationships across domains.

(E12) The system as recited in any of clauses (E1)-(E11), wherein the ontology management module maintains separate processing queues for different update types with prioritization rules.

(E13) The system as recited in any of clauses (E1)-(E12), wherein the ontology management module implements checkpointing mechanisms for maintaining consistency during updates.

(E14) The system as recited in any of clauses (E1)-(E13), wherein the ontology management module calculates relationship strengths using configurable weighting factors across different relationship types.

(E15) The system as recited in any of clauses (E1)-(E14), wherein the ontology management module implements distributed processing for parallel ontology updates across multiple nodes.

(E16) The system as recited in any of clauses (E1)-(E15), wherein the ontology management module maintains an update log with timestamps and change metadata.

(E17) The system as recited in any of clauses (E1)-(E16), wherein the ontology management module implements batched processing for bulk ontology updates with consistency validation.

(E18) The system as recited in any of clauses (E1)-(E17), wherein the semantic similarity algorithms maintain separate threshold values for different relationship types.

(E19) The system as recited in any of clauses (E1)-(E18), wherein the ontology management module implements incremental update mechanisms for processing changes to the ontology.

(E20) The system as recited in any of clauses (E1)-(E19), wherein the ontology management module maintains index structures for accelerating relationship queries across domains.

(E21) The system as recited in any of clauses (E1)-(E20), wherein the ontology management module implements a hypergraph data structure where nodes represent concepts and hyperedges connect multiple nodes across domains, the hypergraph data structure enabling O(1) lookup time for connected nodes.

(E22) The system as recited in any of clauses (E1)-(E21), wherein each hyperedge maintains weight vectors representing relationship strengths across different domains, updated through gradient descent with a learning rate of 0.01.

(E23) The system as recited in any of clauses (E1)-(E22), wherein the semantic similarity algorithms calculate similarity scores using a multidimensional similarity matrix with dimensionality reduction preserving a minimum distance threshold of 0.85 in the reduced space.

(E24) The system as recited in any of clauses (E1)-(E23), wherein the ontology management module processes incoming data through sliding window analysis with exponential decay functions to prioritize recent market trends while maintaining historical stability.

(E25) The system as recited in any of clauses (E1)-(E24), wherein the ontology management module implements asynchronous processing queues with predictive resource allocation, achieving 30-40% reduction in processing latency while maintaining 20% lower CPU usage.

(F1) A method for providing explainable recommendations, the method comprising: maintaining, via a processor, ontological consistency during updates by implementing mechanisms that integrate cross-domain relationships; adjusting, via the processor, explanation complexity based on predefined user expertise categories within an explainable AI framework; updating and expanding, via the processor, a multi-domain ontology using semantic similarity algorithms; integrating and reconciling, via the processor, ontologies across a plurality of industries; generating, via the processor, updated ontological data; providing, via the processor, the updated ontological data to the explainable AI framework; and enhancing, via the processor and using the updated ontological data, recommendation accuracy and explanation generation within the explainable AI framework.

(F2) The method as recited in any clause (F1), further comprising: implementing, via the processor, a hypergraph data structure where nodes represent concepts and hyperedges connect multiple nodes across domains; enabling, via the processor and using the hypergraph data structure, fixed-time lookups for connected nodes; and maintaining, via the processor, weight vectors within each hyperedge representing relationship strengths across different domains.

(F3) The method as recited in any of clauses (F1)-(F2), further comprising: updating, via the processor, the weight vectors through gradient descent with configurable learning rates; and calculating, via the processor, similarity scores using a multidimensional similarity matrix with dimensionality reduction preserving a minimum distance threshold between embedded concepts.

(F4) The method as recited in any of clauses (F1)-(F3), further comprising: processing, via the processor, incoming data through sliding window analysis using predetermined time intervals; and performing, via the processor, weighted averaging of data points within the sliding window analysis.

(F5) The method as recited in any of clauses (F1)-(F4), further comprising: implementing, via the processor, asynchronous processing queues for handling ontology updates; and maintaining, via the processor, system responsiveness during the ontology updates.

(F6) The method as recited in any of clauses (F1)-(F5), further comprising: implementing, via the processor, vector-based comparison methods with configurable similarity thresholds for relationship detection.

(F7) The method as recited in any of clauses (F1)-(F6), further comprising: maintaining, via the processor, version history for ontological changes; and enabling, via the processor, rollback capabilities for the ontological changes.

(F8) The method as recited in any of clauses (F1)-(F7), further comprising: implementing, via the processor, parallel processing for semantic similarity calculations across multiple domains.

(F9) The method as recited in any of clauses (F1)-(F8), further comprising: buffering, via the processor, ontology updates using a staged update mechanism; and performing, via the processor, validation checks between stages of the staged update mechanism.

(F10) The method as recited in any of clauses (F1)-(F9), further comprising: implementing, via the processor, a conflict resolution protocol for handling contradictory relationships across domains.

(F11) The method as recited in any of clauses (F1)-(F10), further comprising: maintaining, via the processor, separate processing queues for different update types; and applying, via the processor, prioritization rules to the separate processing queues.

(F12) The method as recited in any of clauses (F1)-(F11), further comprising: implementing, via the processor, checkpointing mechanisms for maintaining consistency during updates.

(F13) The method as recited in any of clauses (F1)-(F12), further comprising: calculating, via the processor, relationship strengths using configurable weighting factors across different relationship types.

(F14) The method as recited in any of clauses (F1)-(F13), further comprising: implementing, via the processor, distributed processing for parallel ontology updates across multiple nodes.

(F15) The method as recited in any of clauses (F1)-(F14), further comprising: maintaining, via the processor, an update log with timestamps and change metadata.

(F16) The method as recited in any of clauses (F1)-(F15), further comprising: implementing, via the processor, batched processing for bulk ontology updates; and performing, via the processor, consistency validation during the batched processing.

(F17) The method as recited in any of clauses (F1)-(F16), further comprising: maintaining, via the processor, separate threshold values for different relationship types within the semantic similarity algorithms.

(F18) The method as recited in any of clauses (F1)-(F17), further comprising: implementing, via the processor, incremental update mechanisms for processing changes to the ontology.

(F19) The method as recited in any of clauses (F1)-(F18), further comprising: maintaining, via the processor, index structures for accelerating relationship queries across domains.

(F20) The method as recited in any of clauses (F1)-(F19), further comprising: processing, via the processor, incoming data through sliding window analysis with exponential decay functions; prioritizing, via the processor, recent market trends; and maintaining, via the processor, historical stability during the processing.

(G1) A non-transitory processor-readable medium storing code representing instructions to be executed by a processor, the code comprising code to cause the processor to: implement, via the processor, a multi-tier consensus protocol for resolving conflicting information from data sources; assign, via the processor, confidence scores to data points based on source reliability; apply, via the processor, consensus algorithms to resolve data discrepancies; generate, via the processor, verified data with confidence metrics; provide, via the processor, the verified data with confidence metrics to an explainable AI framework; and generate, via the processor and using the verified data, reliability-aware explanations within the explainable AI framework.

(G2) The non-transitory processor-readable medium as recited in clause (G1), further comprising code to cause the processor to: calculate, via the processor, confidence scores using a weighted combination of source reliability metrics, historical accuracy measurements, and relevance factors; and apply, via the processor, decay functions to historical accuracy measurements using configurable time windows.

(G3) The non-transitory processor-readable medium as recited in any of clauses (G1)-(G2), further comprising code to cause the processor to: implement, via the processor, anomaly detection using statistical models to identify outlier data points.

(G4) The non-transitory processor-readable medium as recited in any of clauses (G1)-(G3), further comprising code to cause the processor to: maintain, via the processor, verification audit logs with decision metadata for each resolved conflict.

(G5) The non-transitory processor-readable medium as recited in any of clauses (G1)-(G4), further comprising code to cause the processor to: implement, via the processor, staged verification with validation checks between processing stages.

(G6) The non-transitory processor-readable medium as recited in any of clauses (G1)-(G5), further comprising code to cause the processor to: maintain, via the processor, separate verification protocols for different data categories; and apply, via the processor, category-specific thresholds to each verification protocol.

(G7) The non-transitory processor-readable medium as recited in any of clauses (G1)-(G6), further comprising code to cause the processor to: implement, via the processor, cross-referencing against verified data sources using configurable matching criteria.

(G8) The non-transitory processor-readable medium as recited in any of clauses (G1)-(G7), further comprising code to cause the processor to: process, via the processor, verification requests through prioritized queues based on data source categories.

(G9) The non-transitory processor-readable medium as recited in any of clauses (G1)-(G8), further comprising code to cause the processor to: implement, via the processor, incremental verification for sequential data updates; and maintain, via the processor, dependency tracking during the sequential data updates.

(G10) The non-transitory processor-readable medium as recited in any of clauses (G1)-(G9), further comprising code to cause the processor to: maintain, via the processor, source reliability scores; and update, via the processor, the source reliability scores based on verification outcomes.

(G11) The non-transitory processor-readable medium as recited in any of clauses (G1)-(G10), further comprising code to cause the processor to: implement, via the processor, parallel verification processes for independent data sources.

(G12) The non-transitory processor-readable medium as recited in any of clauses (G1)-(G11), further comprising code to cause the processor to: calculate, via the processor, aggregate confidence metrics using weighted combinations of individual source scores.

(G13) The non-transitory processor-readable medium as recited in any of clauses (G1)-(G12), further comprising code to cause the processor to: implement, via the processor, fallback verification protocols when primary verification methods fail.

(G14) The non-transitory processor-readable medium as recited in any of clauses (G1)-(G13), further comprising code to cause the processor to: maintain, via the processor, verification state history with rollback capabilities.

(G15) The non-transitory processor-readable medium as recited in any of clauses (G1)-(G14), further comprising code to cause the processor to: implement, via the processor, batched verification for bulk data processing; and perform, via the processor, consistency checks during the bulk data processing.

(G16) The non-transitory processor-readable medium as recited in any of clauses (G1)-(G15), further comprising code to cause the processor to: calculate, via the processor, confidence thresholds using statistical analysis of historical verification outcomes.

(G17) The non-transitory processor-readable medium as recited in any of clauses (G1)-(G16), further comprising code to cause the processor to: implement, via the processor, verification result caching with configurable invalidation rules.

(G18) The non-transitory processor-readable medium as recited in any of clauses (G1)-(G17), further comprising code to cause the processor to: maintain, via the processor, separate processing pipelines for different verification levels; and apply, via the processor, defined promotion criteria between verification levels.

(H1) A computer-implemented system for providing explainable recommendations, comprising: a data verification subsystem implementing a multi-tier consensus protocol for resolving conflicting information from data sources; and an explainable AI framework implementing adjustment of explanation complexity; and wherein the data verification subsystem is configured to: assign confidence scores to data points based on source reliability; apply consensus algorithms to resolve data discrepancies; and provide verified data with confidence metrics to the explainable AI framework for generating reliability-aware explanations.

(H2) The system as recited in clause (H1), wherein the data verification subsystem calculates confidence scores using a weighted combination of source reliability metrics, historical accuracy measurements, and relevance factors.

(H3) The system as recited in any of clauses (H1)-(H2), wherein the data verification subsystem applies decay functions to historical accuracy measurements using configurable time windows.

(H4) The system as recited in any of clauses (H1)-(H3), wherein the consensus algorithms implement weighted averaging with source-specific weights determined by historical reliability scores.

(H5) The system as recited in any of clauses (H1)-(H4), wherein the data verification subsystem implements anomaly detection using statistical models to identify outlier data points.

(H6) The system as recited in any of clauses (H1)-(H5), wherein the data verification subsystem maintains verification audit logs with decision metadata for each resolved conflict.

(H7) The system as recited in any of clauses (H1)-(H6), wherein the data verification subsystem implements staged verification with validation checks between processing stages.

(H8) The system as recited in any of clauses (H1)-(H7), wherein the data verification subsystem maintains separate verification protocols for different data categories with category-specific thresholds.

(H9) The system as recited in any of clauses (H1)-(H8), wherein the data verification subsystem implements cross-referencing against verified data sources using configurable matching criteria.

(H10) The system as recited in any of clauses (H1)-(H9), wherein the data verification subsystem processes verification requests through prioritized queues based on data source categories.

(H11) The system as recited in any of clauses (H1)-(H10), wherein the data verification subsystem implements incremental verification for sequential data updates with dependency tracking.

(H12) The system as recited in any of clauses (H1)-(H11), wherein the data verification subsystem maintains source reliability scores updated based on verification outcomes.

(H13) The system as recited in any of clauses (H1)-(H12), wherein the data verification subsystem implements parallel verification processes for independent data sources.

(H14) The system as recited in any of clauses (H1)-(H13), wherein the data verification subsystem calculates aggregate confidence metrics using weighted combinations of individual source scores.

(H15) The system as recited in any of clauses (H1)-(H14), wherein the data verification subsystem implements fallback verification protocols when primary verification methods fail.

(H16) The system as recited in any of clauses (H1)-(H15), wherein the data verification subsystem maintains verification state history with rollback capabilities.

(H17) The system as recited in any of clauses (H1)-(H16), wherein the data verification subsystem implements batched verification for bulk data processing with consistency checks.

(H18) The system as recited in any of clauses (H1)-(H17), wherein the data verification subsystem calculates confidence thresholds using statistical analysis of historical verification outcomes.

(H19) The system as recited in any of clauses (H1)-(H18), wherein the data verification subsystem implements verification result caching with configurable invalidation rules.

(H20) The system as recited in any of clauses (H1)-(H19), wherein the data verification subsystem maintains separate processing pipelines for different verification levels with defined promotion criteria.

(I1) A method comprising: implementing, via a processor, a multi-tier consensus protocol for resolving conflicting information from data sources; assigning, via the processor, confidence scores to data points based on source reliability; applying, via the processor, consensus algorithms to resolve data discrepancies; generating, via the processor, verified data with confidence metrics; providing, via the processor, the verified data with confidence metrics to an explainable AI framework; and generating, via the processor and using the verified data, reliability-aware explanations within the explainable AI framework.

(I2) The method as recited in clause (I1), further comprising: calculating, via the processor, confidence scores using a weighted combination of source reliability metrics, historical accuracy measurements, and relevance factors; and applying, via the processor, decay functions to historical accuracy measurements using configurable time windows.

(I3) The method as recited in any of clauses (I1)-(I2), further comprising: implementing, via the processor, anomaly detection using statistical models to identify outlier data points.

(I4) The method as recited in any of clauses (I1)-(I3), further comprising: maintaining, via the processor, verification audit logs with decision metadata for each resolved conflict.

(I5) The method as recited in any of clauses (I1)-(I4), further comprising: implementing, via the processor, staged verification with validation checks between processing stages.

(I6) The method as recited in any of clauses (I1)-(I5), further comprising: maintaining, via the processor, separate verification protocols for different data categories; and applying, via the processor, category-specific thresholds to each verification protocol.

(I7) The method as recited in any of clauses (I1)-(I6), further comprising: implementing, via the processor, cross-referencing against verified data sources using configurable matching criteria.

(I8) The method as recited in any of clauses (I1)-(I7), further comprising: processing, via the processor, verification requests through prioritized queues based on data source categories.

(I9) The method as recited in any of clauses (I1)-(I8), further comprising: implementing, via the processor, incremental verification for sequential data updates; and maintaining, via the processor, dependency tracking during the sequential data updates.

(I10) The method as recited in any of clauses (I1)-(I9), further comprising: maintaining, via the processor, source reliability scores; and updating, via the processor, the source reliability scores based on verification outcomes.

(I11) The method as recited in any of clauses (I1)-(I10), further comprising: implementing, via the processor, parallel verification processes for independent data sources.

(I12) The method as recited in any of clauses (I1)-(I11), further comprising: calculating, via the processor, aggregate confidence metrics using weighted combinations of individual source scores.

(I13) The method as recited in any of clauses (I1)-(I12), further comprising: implementing, via the processor, fallback verification protocols when primary verification methods fail.

(I14) The method as recited in any of clauses (I1)-(I13), further comprising: maintaining, via the processor, verification state history with rollback capabilities.

(I15) The method as recited in any of clauses (I1)-(I14), further comprising: implementing, via the processor, batched verification for bulk data processing; and performing, via the processor, consistency checks during the bulk data processing.

(I16) The method as recited in any of clauses (I1)-(I15), further comprising: calculating, via the processor, confidence thresholds using statistical analysis of historical verification outcomes.

(I17) The method as recited in any of clauses (I1)-(I16), further comprising: implementing, via the processor, verification result caching with configurable invalidation rules.

(I18) The method as recited in any of clauses (I1)-(I17), further comprising: maintaining, via the processor, separate processing pipelines for different verification levels; and applying, via the processor, defined promotion criteria between verification levels.

(J1) A non-transitory processor-readable medium storing code representing instructions to be executed by a processor, the code comprising code to cause the processor to: generate, via the processor, domain-specific recommendations using interpretable machine learning models including decision trees and Bayesian inference; calculate, via the processor, feature importance using Shapley Additive explanations (SHAP) values to provide explainable rationales; utilize, via the processor, ontological data for recommendation accuracy; and adjust, via the processor, explanation complexity based on predefined user expertise categories.

(J2) The non-transitory processor-readable medium as recited in clause (J1), further comprising code to cause the processor to: implement, via the processor, model distillation with integrated Local Interpretable Model-agnostic Explanations (LIME); and maintain, via the processor, layered explainability across decision-making stages.

(J3) The non-transitory processor-readable medium as recited in any of clauses (J1)-(J2), further comprising code to cause the processor to: combine, via the processor, LIME-based local interpretability with ontology-based relationship mapping; and generate, via the processor, cross-domain explanations.

(J4) The non-transitory processor-readable medium as recited in any of clauses (J1)-(J3), further comprising code to cause the processor to: integrate, via the processor, LIME and SHAP analyses; and provide, via the processor, combined local and global feature importance explanations across expertise levels.

(J5) The non-transitory processor-readable medium as recited in any of clauses (J1)-(J4), further comprising code to cause the processor to: implement, via the processor, LIME within a recursive model refinement process; and adapt, via the processor, the refinement process based on user interaction patterns.

(J6) The non-transitory processor-readable medium as recited in any of clauses (J1)-(J5), further comprising code to cause the processor to: combine, via the processor, LIME-based explanations with expertise-based complexity adjustment; and maintain, via the processor, explanation consistency across domains.

(J7) The non-transitory processor-readable medium as recited in any of clauses (J1)-(J6), further comprising code to cause the processor to: implement, via the processor, cost-complexity pruning with configurable depth constraints for different recommendation types within the decision trees.

(J8) The non-transitory processor-readable medium as recited in any of clauses (J1)-(J7), further comprising code to cause the processor to: calculate, via the processor, recommendation probabilities using weighted combinations of evidence factors within the Bayesian inference models.

(J9) The non-transitory processor-readable medium as recited in any of clauses (J1)-(J8), further comprising code to cause the processor to: implement, via the processor, a combined predictive and fairness calculation using weighted objectives within the SHAP values.

(J10) The non-transitory processor-readable medium as recited in any of clauses (J1)-(J9), further comprising code to cause the processor to: generate, via the processor, hierarchical explanations with configurable detail levels.

(J11) The non-transitory processor-readable medium as recited in any of clauses (J1)-(J10), further comprising code to cause the processor to: implement, via the processor, model distillation techniques; and create, via the processor, interpretable versions of complex models.

(J12) The non-transitory processor-readable medium as recited in any of clauses (J1)-(J11), further comprising code to cause the processor to: maintain, via the processor, separate explanation templates for different user expertise levels.

(J13) The non-transitory processor-readable medium as recited in any of clauses (J1)-(J12), further comprising code to cause the processor to: implement, via the processor, feature attribution calculations with configurable importance thresholds.

(J14) The non-transitory processor-readable medium as recited in any of clauses (J1)-(J13), further comprising code to cause the processor to: generate, via the processor, explanation chains linking input features to recommendations through decision paths.

(J15) The non-transitory processor-readable medium as recited in any of clauses (J1)-(J14), further comprising code to cause the processor to: calculate, via the processor, confidence scores for generated explanations using validation metrics.

(J16) The non-transitory processor-readable medium as recited in any of clauses (J1)-(J15), further comprising code to cause the processor to: generate, via the processor, counterfactual explanations showing how different inputs affect recommendations.

(J17) The non-transitory processor-readable medium as recited in any of clauses (J1)-(J16), further comprising code to cause the processor to: calculate, via the processor, feature interactions using pairwise importance scores.

(J18) The non-transitory processor-readable medium as recited in any of clauses (J1)-(J17), further comprising code to cause the processor to: implement, via the processor, staged generation of explanations with complexity progression.

(J19) The non-transitory processor-readable medium as recited in any of clauses (J1)-(J18), further comprising code to cause the processor to: maintain, via the processor, explanation consistency while adapting to different user expertise levels.

(J20) The non-transitory processor-readable medium as recited in any of clauses (J1)-(J19), further comprising code to cause the processor to: generate, via the processor, domain-specific explanation templates based on ontological relationships.

(K1) A computer-implemented system for providing explainable recommendations, comprising: an explainable AI framework configured to: generate domain-specific recommendations using interpretable machine learning models including decision trees and Bayesian inference; calculate feature importance using Shapley Additive explanations (SHAP) values to provide explainable rationales; utilize ontological data for recommendation accuracy; and adjust explanation complexity based on predefined user expertise categories.

(K2) The system as recited in clause (K1), wherein the explainable AI framework implements model distillation with integrated Local Interpretable Model-agnostic Explanations (LIME) while maintaining layered explainability across decision-making stages.

(K3) The system as recited in any of clauses (K1)-(K2), wherein the explainable AI framework combines LIME-based local interpretability with ontology-based relationship mapping to generate cross-domain explanations.

(K4) The system as recited in any of clauses (K1)-(K3), wherein the explainable AI framework integrates LIME and SHAP analyses to provide combined local and global feature importance explanations across expertise levels.

(K5) The system as recited in any of clauses (K1)-(K4), wherein the explainable AI framework implements LIME within a recursive model refinement process that adapts based on user interaction patterns.

(K6) The system as recited in any of clauses (K1)-(K5), wherein the explainable AI framework combines LIME-based explanations with expertise-based complexity adjustment while maintaining explanation consistency across domains.

(K7) The system as recited in any of clauses (K1)-(K6), wherein the decision trees implement cost-complexity pruning with configurable depth constraints for different recommendation types.

(K8) The system as recited in any of clauses (K1)-(K7), wherein the Bayesian inference models calculate recommendation probabilities using weighted combinations of evidence factors.

(K9) The system as recited in any of clauses (K1)-(K8), wherein the SHAP values implement a combined predictive and fairness calculation using weighted objectives.

(K10) The system as recited in any of clauses (K1)-(K9), wherein the explainable AI framework generates hierarchical explanations with configurable detail levels.

(K11) The system as recited in any of clauses (K1)-(K10), wherein the explainable AI framework implements model distillation techniques to generate interpretable versions of complex models.

(K12) The system as recited in any of clauses (K1)-(K11), wherein the explainable AI framework maintains separate explanation templates for different user expertise levels.

(K13) The system as recited in any of clauses (K1)-(K12), wherein the explainable AI framework implements feature attribution calculations with configurable importance thresholds.

(K14) The system as recited in any of clauses (K1)-(K13), wherein the explainable AI framework generates explanation chains linking input features to recommendations through decision paths.

(K15) The system as recited in any of clauses (K1)-(K14), wherein the explainable AI framework calculates confidence scores for generated explanations using validation metrics.

(K16) The system as recited in any of clauses (K1)-(K15), wherein the explainable AI framework generates counterfactual explanations showing how different inputs affect recommendations.

(K17) The system as recited in any of clauses (K1)-(K16), wherein the explainable AI framework calculates feature interactions using pairwise importance scores.

(K18) The system as recited in any of clauses (K1)-(K17), wherein the explainable AI framework implements staged generation of explanations with complexity progression.

(K19) The system as recited in any of clauses (K1)-(K18), wherein the explainable AI framework maintains explanation consistency while adapting to different user expertise levels.

(K20) The system as recited in any of clauses (K1)-(K19), wherein the explainable AI framework generates domain-specific explanation templates based on ontological relationships.

(L1) A method comprising: generating, via a processor, domain-specific recommendations using interpretable machine learning models including decision trees and Bayesian inference; calculating, via the processor, feature importance using Shapley Additive explanations (SHAP) values to provide explainable rationales; utilizing, via the processor, ontological data for recommendation accuracy; and adjusting, via the processor, explanation complexity based on predefined user expertise categories.

(L2) The method as recited in clause (L1), further comprising: implementing, via the processor, model distillation with integrated Local Interpretable Model-agnostic Explanations (LIME); and maintaining, via the processor, layered explainability across decision-making stages.

(L3) The method as recited in any of clauses (L1)-(L2), further comprising: combining, via the processor, LIME-based local interpretability with ontology-based relationship mapping; and generating, via the processor, cross-domain explanations.

(L4) The method as recited in any of clauses (L1)-(L3), further comprising: integrating, via the processor, LIME and SHAP analyses; and providing, via the processor, combined local and global feature importance explanations across expertise levels.

(L5) The method as recited in any of clauses (L1)-(L4), further comprising: implementing, via the processor, LIME within a recursive model refinement process; and adapting, via the processor, the refinement process based on user interaction patterns.

(L6) The method as recited in any of clauses (L1)-(L5), further comprising: combining, via the processor, LIME-based explanations with expertise-based complexity adjustment; and maintaining, via the processor, explanation consistency across domains.

(L7) The method as recited in any of clauses (L1)-(L6), further comprising: implementing, via the processor, cost-complexity pruning with configurable depth constraints for different recommendation types within the decision trees.

(L8) The method as recited in any of clauses (L1)-(L7), further comprising: calculating, via the processor, recommendation probabilities using weighted combinations of evidence factors within the Bayesian inference models.

(L9) The method as recited in any of clauses (L1)-(L8), further comprising: implementing, via the processor, a combined predictive and fairness calculation using weighted objectives within the SHAP values.

(L10) The method as recited in any of clauses (L1)-(L9), further comprising: generating, via the processor, hierarchical explanations with configurable detail levels.

(L11) The method as recited in any of clauses (L1)-(L10), further comprising: implementing, via the processor, model distillation techniques; and creating, via the processor, interpretable versions of complex models.

(L12) The method as recited in any of clauses (L1)-(L11), further comprising: maintaining, via the processor, separate explanation templates for different user expertise levels.

(L13) The method as recited in any of clauses (L1)-(L12), further comprising: implementing, via the processor, feature attribution calculations with configurable importance thresholds.

(L14) The method as recited in any of clauses (L1)-(L13), further comprising: generating, via the processor, explanation chains linking input features to recommendations through decision paths.

(L15) The method as recited in any of clauses (L1)-(L14), further comprising: calculating, via the processor, confidence scores for generated explanations using validation metrics.

(L16) The method as recited in any of clauses (L1)-(L15), further comprising: generating, via the processor, counterfactual explanations showing how different inputs affect recommendations.

(L17) The method as recited in any of clauses (L1)-(L16), further comprising: calculating, via the processor, feature interactions using pairwise importance scores.

(L18) The method as recited in any of clauses (L1)-(L17), further comprising: implementing, via the processor, staged generation of explanations with complexity progression.

(L19) The method as recited in any of clauses (L1)-(L18), further comprising: maintaining, via the processor, explanation consistency while adapting to different user expertise levels.

(L20) The method as recited in any of clauses (L1)-(L19), further comprising: generating, via the processor, domain-specific explanation templates based on ontological relationships.

(M1) A non-transitory processor-readable medium storing code representing instructions to be executed by a processor, the code comprising code to cause the processor to: maintain, via the processor, concurrent domain-specific ontologies for a plurality of industries; establish, via the processor, cross-domain relationships between concepts across different ontologies using semantic similarity algorithms; map, via the processor, skills, certifications, and domain concepts across industry boundaries; identify, via the processor, semantic similarities between concepts across different domain ontologies; detect, via the processor, emerging domains; and establish, via the processor, initial cross-domain mappings for the emerging domains.

(M2) The non-transitory processor-readable medium as recited in clause (M1), further comprising code to cause the processor to: implement, via the processor, density-based spatial clustering with epsilon calculation using k-distance graphs; apply, via the processor, an epsilon value of 0.3 for technical domains; and apply, via the processor, an epsilon value of 0.5 for soft skills domains.

(M3) The non-transitory processor-readable medium as recited in any of clauses (M1)-(M2), further comprising code to cause the processor to: implement, via the processor, Markov Decision Process modeling for career transitions by: maintaining, via the processor, a state space comprising skills, roles, industry position, and career stage; defining, via the processor, an action space comprising upskill, role change, and industry transition; and implementing, via the processor, a reward function balancing salary gain, growth potential, and market demand.

(M4) The non-transitory processor-readable medium as recited in any of clauses (M1)-(M3), further comprising code to cause the processor to: calculate, via the processor, the reward function as w1*salary gain+w2*growth potential+w3*market demand; and apply, via the processor, weight values of w1=0.4, w2=0.3, and w3=0.3.

(M5) The non-transitory processor-readable medium as recited in any of clauses (M1)-(M4), further comprising code to cause the processor to: maintain, via the processor, bidirectional mappings using adjacency tensor representation; and enable, via the processor, constant-time lookups for connected nodes.

(M6) The non-transitory processor-readable medium as recited in any of clauses (M1)-(M5), further comprising code to cause the processor to: implement, via the processor, hypergraph-based relationship tracking; and update, via the processor, weight vectors through gradient descent.

(M7) The non-transitory processor-readable medium as recited in any of clauses (M1)-(M6), further comprising code to cause the processor to: apply, via the processor, dimensionality reduction techniques with minimum distance preservation constraints for relationship mapping.

(M8) The non-transitory processor-readable medium as recited in any of clauses (M1)-(M7), further comprising code to cause the processor to: implement, via the processor, hierarchical clustering with boundary adjustment for emerging skill clusters.

(M9) The non-transitory processor-readable medium as recited in any of clauses (M1)-(M8), further comprising code to cause the processor to: calculate, via the processor, composite relationship scores using weighted combinations of semantic similarity and usage patterns.

(M10) The non-transitory processor-readable medium as recited in any of clauses (M1)-(M9), further comprising code to cause the processor to: implement, via the processor, recursive relationship validation with configurable consistency thresholds.

(M11) The non-transitory processor-readable medium as recited in any of clauses (M1)-(M10), further comprising code to cause the processor to: maintain, via the processor, temporal vectors for tracking relationship evolution across domains.

(M12) The non-transitory processor-readable medium as recited in any of clauses (M1)-(M11), further comprising code to cause the processor to: implement, via the processor, conflict resolution using Conflict-Free Replicated Data Types for distributed updates.

(M13) The non-transitory processor-readable medium as recited in any of clauses (M1)-(M12), further comprising code to cause the processor to: calculate, via the processor, transitivity scores for indirect relationships across domain boundaries.

(M14) The non-transitory processor-readable medium as recited in any of clauses (M1)-(M13), further comprising code to cause the processor to: implement, via the processor, parallel processing for relationship discovery across multiple domains.

(M15) The non-transitory processor-readable medium as recited in any of clauses (M1)-(M14), further comprising code to cause the processor to: maintain, via the processor, separate confidence metrics for different relationship types.

(M16) The non-transitory processor-readable medium as recited in any of clauses (M1)-(M15), further comprising code to cause the processor to: generate, via the processor, relationship evidence chains for cross-domain mappings.

(M17) The non-transitory processor-readable medium as recited in any of clauses (M1)-(M16), further comprising code to cause the processor to: implement, via the processor, staged relationship validation with incremental confidence updates.

(M18) The non-transitory processor-readable medium as recited in any of clauses (M1)-(M17), further comprising code to cause the processor to: maintain, via the processor, domain-specific verification protocols with configurable thresholds.

(M19) The non-transitory processor-readable medium as recited in any of clauses (M1)-(M18), further comprising code to cause the processor to: implement, via the processor, relationship weighting based on usage patterns.

(M20) The non-transitory processor-readable medium as recited in any of clauses (M1)-(M19), further comprising code to cause the processor to: generate, via the processor, cross-domain transition paths with confidence scoring.

(M21) The non-transitory processor-readable medium as recited in any of clauses (M1)-(M20), further comprising code to cause the processor to: maintain, via the processor, relationship provenance with version tracking and validation history.

(M22) The non-transitory processor-readable medium as recited in any of clauses (M1)-(M21), further comprising code to cause the processor to: apply, via the processor, spectral clustering overlay with normalized graph Laplacian; calculate, via the processor, adaptive kernel bandwidth as $\sigma$=median distance*scaling factor; and adapt, via the processor, the scaling factor between 0.1 and 0.3 based on cluster density.

(N1) A computer-implemented system for cross-domain ontology integration in explainable AI environments, comprising: an ontology integration module configured to: maintain concurrent domain-specific ontologies for a plurality of industries; establish cross-domain relationships between concepts across different ontologies using semantic similarity algorithms; and map skills, certifications, and domain concepts across industry boundaries; a relationship mapping engine configured to identify semantic similarities between concepts across different domain ontologies; and a domain extension mechanism configured to detect emerging domains and establish initial cross-domain mappings.

(N2) The system as recited in clause (N1), wherein the semantic similarity algorithms implement density-based spatial clustering with epsilon calculation using k-distance graphs, comprising eps=0.3 for technical domains and eps=0.5 for soft skills domains.

(N3) The system as recited in any of clauses (N1)-(N2), wherein the system implements Markov Decision Process modeling for career transitions with: (i) state space comprising skills, roles, industry position, and career stage; (ii) action space comprising upskill, role change, and industry transition; and (iii) reward function balancing salary gain, growth potential, and market demand.

(N4) The system as recited in any of clauses (N1)-(N3), wherein the reward function is calculated as w1*salary gain+w2*growth potential+w3*market_demand, where w1=0.4, w2=0.3, and w3=0.3.

(N5) The system as recited in any of clauses (N1)-(N4), wherein the relationship mapping engine maintains bidirectional mappings using adjacency tensor representation enabling constant-time lookups for connected nodes.

(N6) The system as recited in any of clauses (N1)-(N5), wherein the system implements hypergraph-based relationship tracking with weight vectors updated through gradient descent.

(N7) The system as recited in any of clauses (N1)-(N6), wherein the system applies dimensionality reduction techniques with minimum distance preservation constraints for relationship mapping.

(N8) The system as recited in any of clauses (N1)-(N7), wherein the system implements hierarchical clustering with boundary adjustment for emerging skill clusters.

(N9) The system as recited in any of clauses (N1)-(N8), wherein the system calculates composite relationship scores using weighted combinations of semantic similarity and usage patterns.

(N10) The system as recited in any of clauses (N1)-(N9), wherein the system implements recursive relationship validation with configurable consistency thresholds.

(N11) The system as recited in any of clauses (N1)-(N10), wherein the system maintains temporal vectors for tracking relationship evolution across domains.

(N12) The system as recited in any of clauses (N1)-(N11), wherein the system implements conflict resolution using Conflict-Free Replicated Data Types for distributed updates.

(N13) The system as recited in any of clauses (N1)-(N12), wherein the system calculates transitivity scores for indirect relationships across domain boundaries.

(N14) The system as recited in any of clauses (N1)-(N13), wherein the system implements parallel processing for relationship discovery across multiple domains.

(N15) The system as recited in any of clauses (N1)-(N14), wherein the system maintains separate confidence metrics for different relationship types.

(N16) The system as recited in any of clauses (N1)-(N15), wherein the system generates relationship evidence chains for cross-domain mappings.

(N17) The system as recited in any of clauses (N1)-(N16), wherein the system implements staged relationship validation with incremental confidence updates.

(N18) The system as recited in any of clauses (N1)-(N17), wherein the system maintains domain-specific verification protocols with configurable thresholds.

(N19) The system as recited in any of clauses (N1)-(N18), wherein the system implements relationship weighting based on usage patterns.

(N20) The system as recited in any of clauses (N1)-(N19), wherein the system generates cross-domain transition paths with confidence scoring.

(N21) The system as recited in any of clauses (N1)-(N20), wherein the system maintains relationship provenance with version tracking and validation history.

(N22) The system as recited in any of clauses (N1)-(N21), wherein the system applies spectral clustering overlay with normalized graph Laplacian and adaptive kernel bandwidth calculated as $\sigma$=median distance*scaling factor, where scaling factor adapts between 0.1 and 0.3 based on cluster density.

(O1) A method comprising: maintaining, via a processor, concurrent domain-specific ontologies for a plurality of industries; establishing, via the processor, cross-domain relationships between concepts across different ontologies using semantic similarity algorithms; mapping, via the processor, skills, certifications, and domain concepts across industry boundaries; identifying, via the processor, semantic similarities between concepts across different domain ontologies; detecting, via the processor, emerging domains; and establishing, via the processor, initial cross-domain mappings for the emerging domains.

(O2) The method as recited in clause (O1), further comprising: implementing, via the processor, density-based spatial clustering with epsilon calculation using k-distance graphs; applying, via the processor, an epsilon value of 0.3 for technical domains; and applying, via the processor, an epsilon value of 0.5 for soft skills domains.

(O3) The method as recited in any of clauses (O1)-(O2), further comprising: implementing, via the processor, Markov Decision Process modeling for career transitions by: maintaining, via the processor, a state space comprising skills, roles, industry position, and career stage; defining, via the processor, an action space comprising upskill, role change, and industry transition; and implementing, via the processor, a reward function balancing salary gain, growth potential, and market demand.

(O4) The method as recited in any of clauses (O1)-(O3), further comprising: calculating, via the processor, the reward function as w1salary_gain+w2growth_potential+w3*market_demand; and applying, via the processor, weight values of w1=0.4, w2=0.3, and w3=0.3.

(O5) The method as recited in any of clauses (O1)-(O4), further comprising: maintaining, via the processor, bidirectional mappings using adjacency tensor representation; and enabling, via the processor, constant-time lookups for connected nodes.

(O6) The method as recited in any of clauses (O1)-(O5), further comprising: implementing, via the processor, hypergraph-based relationship tracking; and updating, via the processor, weight vectors through gradient descent.

(O7) The method as recited in any of clauses (O1)-(O6), further comprising: applying, via the processor, dimensionality reduction techniques with minimum distance preservation constraints for relationship mapping.

(O8) The method as recited in any of clauses (O1)-(O7), further comprising: implementing, via the processor, hierarchical clustering with boundary adjustment for emerging skill clusters.

(O9) The method as recited in any of clauses (O1)-(O8), further comprising: calculating, via the processor, composite relationship scores using weighted combinations of semantic similarity and usage patterns.

(O10) The method as recited in any of clauses (O1)-(O9), further comprising: implementing, via the processor, recursive relationship validation with configurable consistency thresholds.

(O11) The method as recited in any of clauses (O1)-(O10), further comprising: maintaining, via the processor, temporal vectors for tracking relationship evolution across domains.

(O12) The method as recited in any of clauses (O1)-(O11), further comprising: implementing, via the processor, conflict resolution using Conflict-Free Replicated Data Types for distributed updates.

(O13) The method as recited in any of clauses (O1)-(O12), further comprising: calculating, via the processor, transitivity scores for indirect relationships across domain boundaries.

(O14) The method as recited in any of clauses (O1)-(O13), further comprising: implementing, via the processor, parallel processing for relationship discovery across multiple domains.

(O15) The method as recited in any of clauses (O1)-(O14), further comprising: maintaining, via the processor, separate confidence metrics for different relationship types.

(O16) The method as recited in any of clauses (O1)-(O15), further comprising: generating, via the processor, relationship evidence chains for cross-domain mappings.

(O17) The method as recited in any of clauses (O1)-(O16), further comprising: implementing, via the processor, staged relationship validation with incremental confidence updates.

(O18) The method as recited in any of clauses (O1)-(O17), further comprising: maintaining, via the processor, domain-specific verification protocols with configurable thresholds.

(O19) The method as recited in any of clauses (O1)-(O18), further comprising: implementing, via the processor, relationship weighting based on usage patterns.

(O20) The method as recited in any of clauses (O1)-(O19), further comprising: generating, via the processor, cross-domain transition paths with confidence scoring.

(O21) The method as recited in any of clauses (O1)-(O20), further comprising: maintaining, via the processor, relationship provenance with version tracking and validation history.

(O22) The method as recited in any of clauses (O1)-(O21), further comprising: applying, via the processor, spectral clustering overlay with normalized graph Laplacian; calculating, via the processor, adaptive kernel bandwidth as σ=median distance*scaling factor; and adapting, via the processor, the scaling factor between 0.1 and 0.3 based on cluster density.

(P1) A non-transitory processor-readable medium storing code representing instructions to be executed by a processor, the code comprising code to cause the processor to: implement, via the processor, secure communication protocols between system components; implement, via the processor, adjustment of explanation complexity within an explainable AI framework; perform, via the processor, data validation across component boundaries; maintain, via the processor, synchronization between subsystems; enable, via the processor, secure transmission of explanation data and recommendation context; and implement, via the processor, adaptive resource allocation based on component interaction patterns.

(P2) The non-transitory processor-readable medium as recited in clause (P1), further comprising code to cause the processor to: implement, via the processor, asynchronous processing queues with backpressure management; and utilize, via the processor, partitioned topics for different request types.

(P3) The non-transitory processor-readable medium as recited in any of clauses (P1)-(P2), further comprising code to cause the processor to: implement, via the processor, distributed lock management using Conflict-Free Replicated Data Types; and achieve, via the processor, bounded convergence times.

(P4) The non-transitory processor-readable medium as recited in any of clauses (P1)-(P3), further comprising code to cause the processor to: implement, via the processor, consistent hashing with bounded loads; and maintain, via the processor, a maximum load imbalance factor across nodes.

(P5) The non-transitory processor-readable medium as recited in any of clauses (P1)-(P4), further comprising code to cause the processor to: implement, via the processor, circuit breaker patterns with configurable error thresholds and reset timeouts.

(P6) The non-transitory processor-readable medium as recited in any of clauses (P1)-(P5), further comprising code to cause the processor to: maintain, via the processor, version vectors with dotted version vectors for causality tracking.

(P7) The non-transitory processor-readable medium as recited in any of clauses (P1)-(P6), further comprising code to cause the processor to: implement, via the processor, partition reassignment based on skew detection.

(P8) The non-transitory processor-readable medium as recited in any of clauses (P1)-(P7), further comprising code to cause the processor to: implement, via the processor, predictive resource allocation using historical usage patterns.

(P9) The non-transitory processor-readable medium as recited in any of clauses (P1)-(P8), further comprising code to cause the processor to: maintain, via the processor, separate authentication mechanisms with configurable token expiration.

(P10) The non-transitory processor-readable medium as recited in any of clauses (P1)-(P9), further comprising code to cause the processor to: implement, via the processor, staged data processing with validation checkpoints.

(P11) The non-transitory processor-readable medium as recited in any of clauses (P1)-(P10), further comprising code to cause the processor to: manage, via the processor, asynchronous feedback loops with guaranteed message delivery.

(P12) The non-transitory processor-readable medium as recited in any of clauses (P1)-(P11), further comprising code to cause the processor to: implement, via the processor, rolling update mechanisms with state preservation.

(P13) The non-transitory processor-readable medium as recited in any of clauses (P1)-(P12), further comprising code to cause the processor to: maintain, via the processor, component health metrics with failover.

(P14) The non-transitory processor-readable medium as recited in any of clauses (P1)-(P13), further comprising code to cause the processor to: implement, via the processor, queue management with priority levels.

(P15) The non-transitory processor-readable medium as recited in any of clauses (P1)-(P14), further comprising code to cause the processor to: maintain, via the processor, cross-component transaction consistency.

(P16) The non-transitory processor-readable medium as recited in any of clauses (P1)-(P15), further comprising code to cause the processor to: implement, via the processor, adaptive batch processing based on system load.

(P17) The non-transitory processor-readable medium as recited in any of clauses (P1)-(P16), further comprising code to cause the processor to: maintain, via the processor, component state synchronization with conflict resolution.

(P18) The non-transitory processor-readable medium as recited in any of clauses (P1)-(P17), further comprising code to cause the processor to: implement, via the processor, resource pooling with allocation.

(P19) The non-transitory processor-readable medium as recited in any of clauses (P1)-(P18), further comprising code to cause the processor to: maintain, via the processor, distributed tracing across component boundaries.

(P20) The non-transitory processor-readable medium as recited in any of clauses (P1)-(P19), further comprising code to cause the processor to: implement, via the processor, component isolation with controlled interaction patterns.

(Q1) A computer-implemented system for providing explainable recommendations, comprising: an orchestration layer implementing secure communication protocols between system components; and an explainable AI framework implementing adjustment of explanation complexity; and wherein the orchestration layer is configured to: perform data validation across component boundaries; maintain synchronization between subsystems; enable secure transmission of explanation data and recommendation context; and implement adaptive resource allocation based on component interaction patterns.

(Q2) The system as recited in clause (Q1), wherein the orchestration layer implements asynchronous processing queues with backpressure management using partitioned topics for different request types.

(Q3) The system as recited in any of clauses (Q1)-(Q2), wherein the orchestration layer implements distributed lock management using Conflict-Free Replicated Data Types achieving bounded convergence times.

(Q4) The system as recited in any of clauses (Q1)-(Q3), wherein the orchestration layer implements consistent hashing with bounded loads maintaining a maximum load imbalance factor across nodes.

(Q5) The system as recited in any of clauses (Q1)-(Q4), wherein the orchestration layer implements circuit breaker patterns with configurable error thresholds and reset timeouts.

(Q6) The system as recited in any of clauses (Q1)-(Q5), wherein the orchestration layer maintains version vectors with dotted version vectors for causality tracking.

(Q7) The system as recited in any of clauses (Q1)-(Q6), wherein the orchestration layer implements partition reassignment based on skew detection.

(Q8) The system as recited in any of clauses (Q1)-(Q7), wherein the orchestration layer implements predictive resource allocation using historical usage patterns.

(Q9) The system as recited in any of clauses (Q1)-(Q8), wherein the orchestration layer maintains separate authentication mechanisms with configurable token expiration.

(Q10) The system as recited in any of clauses (Q1)-(Q9), wherein the orchestration layer implements staged data processing with validation checkpoints.

(Q11) The system as recited in any of clauses (Q1)-(Q10), wherein the orchestration layer manages asynchronous feedback loops with guaranteed message delivery.

(Q12) The system as recited in any of clauses (Q1)-(Q11), wherein the orchestration layer implements rolling update mechanisms with state preservation.

(Q13) The system as recited in any of clauses (Q1)-(Q12), wherein the orchestration layer maintains component health metrics with failover.

(Q14) The system as recited in any of clauses (Q1)-(Q13), wherein the orchestration layer implements queue management with priority levels.

(Q15) The system as recited in any of clauses (Q1)-(Q14), wherein the orchestration layer maintains cross-component transaction consistency.

(Q16) The system as recited in any of clauses (Q1)-(Q15), wherein the orchestration layer implements adaptive batch processing based on system load.

(Q17) The system as recited in any of clauses (Q1)-(Q16), wherein the orchestration layer maintains component state synchronization with conflict resolution.

(Q18) The system as recited in any of clauses (Q1)-(Q17), wherein the orchestration layer implements resource pooling with allocation.

(Q19) The system as recited in any of clauses (Q1)-(Q18), wherein the orchestration layer maintains distributed tracing across component boundaries.

(Q20) The system as recited in any of clauses (Q1)-(Q19), wherein the orchestration layer implements component isolation with controlled interaction patterns.

(R1) A method comprising: implementing, via a processor, secure communication protocols between system components; implementing, via the processor, adjustment of explanation complexity within an explainable AI framework; performing, via the processor, data validation across component boundaries; maintaining, via the processor, synchronization between subsystems; enabling, via the processor, secure transmission of explanation data and recommendation context; and implementing, via the processor, adaptive resource allocation based on component interaction patterns.

(R2) The method as recited in clause (R1), further comprising: implementing, via the processor, asynchronous processing queues with backpressure management; and utilizing, via the processor, partitioned topics for different request types.

(R3) The method as recited in any of clauses (R1)-(R2), further comprising: implementing, via the processor, distributed lock management using Conflict-Free Replicated Data Types; and achieving, via the processor, bounded convergence times.

(R4) The method as recited in any of clauses (R1)-(R3), further comprising: implementing, via the processor, consistent hashing with bounded loads; and maintaining, via the processor, a maximum load imbalance factor across nodes.

(R5) The method as recited in any of clauses (R1)-(R4), further comprising: implementing, via the processor, circuit breaker patterns with configurable error thresholds and reset timeouts.

(R6) The method as recited in any of clauses (R1)-(R5), further comprising: maintaining, via the processor, version vectors with dotted version vectors for causality tracking.

(R7) The method as recited in any of clauses (R1)-(R6), further comprising: implementing, via the processor, partition reassignment based on skew detection.

(R8) The method as recited in any of clauses (R1)-(R7), further comprising: implementing, via the processor, predictive resource allocation using historical usage patterns.

(R9) The method as recited in any of clauses (R1)-(R8), further comprising: maintaining, via the processor, separate authentication mechanisms with configurable token expiration.

(R10) The method as recited in any of clauses (R1)-(R9), further comprising: implementing, via the processor, staged data processing with validation checkpoints.

(R11) The method as recited in any of clauses (R1)-(R10), further comprising: managing, via the processor, asynchronous feedback loops with guaranteed message delivery.

(R12) The method as recited in any of clauses (R1)-(R11), further comprising: implementing, via the processor, rolling update mechanisms with state preservation.

(R13) The method as recited in any of clauses (R1)-(R12), further comprising: maintaining, via the processor, component health metrics with failover.

(R14) The method as recited in any of clauses (R1)-(R13), further comprising: implementing, via the processor, queue management with priority levels.

(R15) The method as recited in any of clauses (R1)-(R14), further comprising: maintaining, via the processor, cross-component transaction consistency.

(R16) The method as recited in any of clauses (R1)-(R15), further comprising: implementing, via the processor, adaptive batch processing based on system load.

(R17) The method as recited in any of clauses (R1)-(R16), further comprising: maintaining, via the processor, component state synchronization with conflict resolution.

(R18) The method as recited in any of clauses (R1)-(R17), further comprising: implementing, via the processor, resource pooling with allocation.

(R19) The method as recited in any of clauses (R1)-(R18), further comprising: maintaining, via the processor, distributed tracing across component boundaries.

(R20) The method as recited in any of clauses (R1)-(R19), further comprising: implementing, via the processor, component isolation with controlled interaction patterns.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A non-transitory processor-readable medium storing code representing instructions to be executed by a processor, the code comprising code to cause the processor to:
   maintain, via the processor, ontological consistency during updates by implementing mechanisms that integrate cross-domain relationships;
   adjust, via the processor, explanation complexity based on predefined user expertise categories within an explainable AI framework;
   update and expand, via the processor, a multi-domain ontology using semantic similarity algorithms;
   integrate and reconcile, via the processor, ontologies across a plurality of industries;
   generate, via the processor, updated ontological data;
   provide, via the processor, the updated ontological data to the explainable AI framework; and
   enhance, via the processor and using the updated ontological data, recommendation accuracy and explanation generation within the explainable AI framework.

2. The non-transitory processor-readable medium of claim 1, further comprising code to cause the processor to:
   implement, via the processor, a hypergraph data structure where nodes represent concepts and hyperedges connect multiple nodes across domains;
   enable, via the processor and using the hypergraph data structure, fixed-time lookups for connected nodes; and
   maintain, via the processor, weight vectors within each hyperedge representing relationship strengths across different domains.

3. The non-transitory processor-readable medium of claim 2, further comprising code to cause the processor to:
   update, via the processor, the weight vectors through gradient descent with configurable learning rates; and
   calculate, via the processor, similarity scores using a multidimensional similarity matrix with dimensionality reduction preserving a minimum distance threshold between embedded concepts.

4. The non-transitory processor-readable medium of claim 1, further comprising code to cause the processor to:
   process, via the processor, incoming data through sliding window analysis using predetermined time intervals; and
   perform, via the processor, weighted averaging of data points within the sliding window analysis.

5. The non-transitory processor-readable medium of claim 1, further comprising code to cause the processor to:
   implement, via the processor, asynchronous processing queues for handling ontology updates; and
   maintain, via the processor, system responsiveness during the ontology updates.

6. The non-transitory processor-readable medium of claim 1, further comprising code to cause the processor to:
   implement, via the processor, vector-based comparison methods with configurable similarity thresholds for relationship detection.

7. The non-transitory processor-readable medium of claim 1, further comprising code to cause the processor to:
   maintain, via the processor, version history for ontological changes; and
   enable, via the processor, rollback capabilities for the ontological changes.

8. The non-transitory processor-readable medium of claim 1, further comprising code to cause the processor to:
   implement, via the processor, parallel processing for semantic similarity calculations across multiple domains.

9. The non-transitory processor-readable medium of claim 1, further comprising code to cause the processor to:
   buffer, via the processor, ontology updates using a staged update mechanism; and
   perform, via the processor, validation checks between stages of the staged update mechanism.

10. The non-transitory processor-readable medium of claim 1, further comprising code to cause the processor to:
    implement, via the processor, a conflict resolution protocol for handling contradictory relationships across domains.

11. The non-transitory processor-readable medium of claim 1, further comprising code to cause the processor to:
    maintain, via the processor, separate processing queues for different update types; and
    apply, via the processor, prioritization rules to the separate processing queues.

12. The non-transitory processor-readable medium of claim 1, further comprising code to cause the processor to:
    implement, via the processor, checkpointing mechanisms for maintaining consistency during updates.

13. The non-transitory processor-readable medium of claim 1, further comprising code to cause the processor to:
    calculate, via the processor, relationship strengths using configurable weighting factors across different relationship types.

14. The non-transitory processor-readable medium of claim 1, further comprising code to cause the processor to:
    implement, via the processor, distributed processing for parallel ontology updates across multiple nodes.

15. The non-transitory processor-readable medium of claim 1, further comprising code to cause the processor to:
    implement, via the processor, batched processing for bulk ontology updates; and
    perform, via the processor, consistency validation during the batched processing.

16. The non-transitory processor-readable medium of claim 1, further comprising code to cause the processor to:
    implement, via the processor, incremental update mechanisms for processing changes to the ontology.

17. The non-transitory processor-readable medium of claim 1, further comprising code to cause the processor to:
    maintain, via the processor, index structures for accelerating relationship queries across domains.

18. The non-transitory processor-readable medium of claim 1, further comprising code to cause the processor to:
    process, via the processor, incoming data through sliding window analysis with exponential decay functions;
    prioritize, via the processor, recent market trends; and
    maintain, via the processor, historical stability during the processing.

19. A computer-implemented system for providing explainable recommendations, comprising:
    an ontology management module implementing mechanisms for maintaining ontological consistency during updates while integrating cross-domain relationships;

an explainable AI framework implementing adjustment of explanation complexity based on predefined user expertise categories; and wherein the ontology management module is configured to:
- update and expand a multi-domain ontology using semantic similarity algorithms;
- integrate and reconcile ontologies across a plurality of industries; and
- provide updated ontological data to the explainable AI framework for enhancing recommendation accuracy and explanation generation.

20. A method for providing explainable recommendations, the method comprising:
- maintaining, via a processor, ontological consistency during updates by implementing mechanisms that integrate cross-domain relationships;
- adjusting, via the processor, explanation complexity based on predefined user expertise categories within an explainable AI framework;
- updating and expanding, via the processor, a multi-domain ontology using semantic similarity algorithms;
- integrating and reconciling, via the processor, ontologies across a plurality of industries;
- generating, via the processor, updated ontological data;
- providing, via the processor, the updated ontological data to the explainable AI framework; and
- enhancing, via the processor and using the updated ontological data, recommendation accuracy and explanation generation within the explainable AI framework.

* * * * *